US012572830B1

(12) United States Patent (10) Patent No.: US 12,572,830 B1

Galvin et al. (45) Date of Patent: Mar. 10, 2026

(54) SYSTEM AND METHOD FOR ENTERPRISE HIERARCHICAL PERSISTENT COGNITIVE MACHINES WITH ORGANIZATIONAL HIERARCHY AWARENESS AND COMPLIANCE INTEGRATION

(71) Applicant: AtomBeam Technologies Inc., Moraga, CA (US)

(72) Inventors: Brian Galvin, Silverdale, WA (US); Alan McCord, Forney, TX (US)

(73) Assignee: AtomBeam Technologies Inc., Moraga, CA (US)

( * ) Notice: Subject to any disclaimer, the term of this patent is extended or adjusted under 35 U.S.C. 154(b) by 0 days.

(21) Appl. No.: 19/315,849

(22) Filed: Sep. 1, 2025

Related U.S. Application Data

(63) Continuation-in-part of application No. 19/294,125, filed on Aug. 7, 2025, which is a continuation-in-part (Continued)

(51) Int. Cl.
*G06N 5/04* (2023.01)
*G06Q 10/067* (2023.01)

(52) U.S. Cl.
CPC ............. *G06N 5/04* (2013.01); *G06Q 10/067* (2013.01)

(58) Field of Classification Search
CPC .... G06N 5/04; G06Q 10/067; G06F 12/0811; G06F 1/3212; G06F 2212/6042; G06F 40/30; G06F 16/3329; G06F 16/3325
See application file for complete search history.

(56) References Cited

U.S. PATENT DOCUMENTS 4,780,718 A 10/1988 Hudson et al.
5,708,436 A 1/1998 Loiz et al.
(Continued)

FOREIGN PATENT DOCUMENTS

EP 3364212 A1 8/2018
GB 2620921 A 1/2024
WO 2020104416 A1 5/2020

OTHER PUBLICATIONS

RamÃ-rez, Guillem, et al. "Cache & distil: Optimising api calls to large language models." arXiv preprint arXiv:2310.13561 (2023). (Year: 2023).*
(Continued)

*Primary Examiner* — Randall K. Baldwin
(74) *Attorney, Agent, or Firm* — GALVIN PATENT LAW LLC; Brian R. Galvin

(57) ABSTRACT

A system and methods for enterprise hierarchical persistent cognitive machines (PCMs) that extends mobile-optimized multi-stage language model processing with organizational hierarchy awareness and enterprise-specific adaptations. The system comprises a CEO-PCM at the executive level coordinating multiple functional domain PCMs corresponding to organizational departments. A supervisory network layer dynamically adapts underlying language models to enterprise-specific dialect, terminology, and communication patterns through automated analysis of organizational knowledge sources. User prompts are routed through enterprise hierarchical pathways based on authority levels and sensitivity classification, enabling appropriate escalation and cross-functional coordination. The CEO-PCM synthesizes insights from multiple domain PCMs to generate enterprise-wide strategic intelligence while domain-specific compliance modules enforce regulatory requirements during cognitive processing. The system automatically adapts to organizational changes by redistributing knowledge and
(Continued)

reconfiguring PCM architecture, while maintaining persistent cognitive state across enterprise operations through comprehensive state preservation and restoration mechanisms that ensure organizational knowledge continuity.

20 Claims, 34 Drawing Sheets

Related U.S. Application Data of application No. 19/203,069, filed on Jun. 3, 2025, now Pat. No. 12,481,688, which is a continuation-in-part of application No. 19/205,960, filed on May 12, 2025, said application No. 19/294,125 is a continuation-in-part of application No. 19/178,873, filed on Apr. 15, 2025, which is a continuation-in-part of application No. 19/177,611, filed on Apr. 13, 2025, said application No. 19/205,960 is a continuation-in-part of application No. 19/060,794, filed on Feb. 24, 2025, said application No. 19/177,611 is a continuation-in-part of application No. 19/051,193, filed on Feb. 12, 2025, now Pat. No. 12,387,050, said application No. 19/060,794 is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024.

(60) Provisional application No. 63/651,359, filed on May 23, 2024.

(56) References Cited

U.S. PATENT DOCUMENTS

| | | | | |
|---|---|---|---|---|
| 7,411,540 | B1 | 8/2008 | Lopez et al. | |
| 7,629,922 | B2 | 12/2009 | Winstead et al. | |
| 7,876,257 | B2 | 1/2011 | Vetro et al. | |
| 9,524,392 | B2 | 12/2016 | Naehrig et al. | |
| 11,451,242 | B2 | 9/2022 | Choi et al. | |
| 11,656,353 | B2 | 5/2023 | Li et al. | |
| 11,972,333 | B1* | 4/2024 | Horesh | G06N 3/0475 |
| 12,387,050 | B1* | 8/2025 | Galvin | G06F 40/30 |
| 12,481,688 | B1* | 11/2025 | Galvin | G06F 16/3347 |
| 2004/0017307 | A1 | 1/2004 | Cirillo et al. | |
| 2004/0160353 | A1 | 8/2004 | Cirillo et al. | |
| 2008/0231504 | A1 | 9/2008 | Sartor et al. | |
| 2011/0012778 | A1 | 1/2011 | Nguyen et al. | |
| 2015/0054678 | A1 | 2/2015 | Wakayama | |
| 2017/0048537 | A1 | 2/2017 | Boufounos et al. | |
| 2018/0196609 | A1 | 7/2018 | Niesen | |
| 2020/0258296 | A1 | 8/2020 | Pennings et al. | |
| 2022/0156631 | A1 | 5/2022 | Kanso et al. | |
| 2022/0404490 | A1 | 12/2022 | Evans et al. | |
| 2023/0131694 | A1 | 4/2023 | Saber et al. | |
| 2023/0169623 | A1 | 6/2023 | Chen et al. | |
| 2023/0184927 | A1 | 6/2023 | Chen et al. | |
| 2023/0316006 | A1* | 10/2023 | Tunstall-Pedoe | G06N 3/0442 704/9 |
| 2024/0104391 | A1* | 3/2024 | Higgins | G06F 16/3329 |
| 2024/0185037 | A1 | 6/2024 | Park et al. | |
| 2024/0195438 | A1 | 6/2024 | Isik et al. | |
| 2024/0354320 | A1* | 10/2024 | Procter | G06F 40/103 |
| 2024/0362476 | A1* | 10/2024 | Grenader | G06F 16/24522 |
| 2024/0420491 | A1* | 12/2024 | Park | G06V 20/70 |
| 2025/0259085 | A1* | 8/2025 | Crabtree | G06N 5/01 |
| 2025/0291866 | A1* | 9/2025 | Park | G06F 16/632 |
| 2025/0371004 | A1* | 12/2025 | Chen | G06F 16/24542 |

OTHER PUBLICATIONS

Zhang, Dawen, et al. "A layered architecture for developing and enhancing capabilities in large language model-based software systems." arXiv preprint arXiv:2411.12357 (2024). (Year: 2024).*

Zhou, Hao, et al. "Large Language Model (LLM) for Telecommunications: A Comprehensive Survey on Principles, Key Techniques, and Opportunities." arXiv preprint arXiv:2405.10825 v2 (2024). (Year: 2024).*

Bai, Guangji, et al. "Beyond efficiency: A systematic survey of resource-efficient large language models." arXiv preprint arXiv:2401.00625 (2024). (Year: 2024).*

Yin, Wangsong, et al. "Llm as a system service on mobile devices." arXiv preprint arXiv:2403.11805 (2024). (Year: 2024).*

Chen, Daihang, et al. "LLM for Mobile: An Initial Roadmap." arXiv preprint arXiv:2407.06573 (2024). (Year: 2024).*

Fungwacharakorn, Wachara, et al. "Layer-of-Thoughts Prompting (LoT): Leveraging LLM-Based Retrieval with Constraint Hierarchies." arXiv preprint arXiv:2410.12153 (2024). (Year: 2024).*

Spivack, Nova, et al. "Cognition is All You Need—The Next Layer of AI Above Large Language Models." arXiv preprint arXiv:2403.02164 (2024). (Year: 2024).*

Hu, Pengbo, and Xiang Ying. "Unified mind model: Reimagining autonomous agents in the llm era." arXiv preprint arXiv:2503.03459 v2 (Mar. 2025). (Year: 2025).*

Aviss, Thea. "State Stream Transformer (SST): Emergent Metacognitive Behaviours Through Latent State Persistence." arXiv preprint arXiv:2501.18356 (Jan. 2025). (Year: 2025).*

Shan, Lianlei, et al. "Cognitive memory in large language models." arXiv preprint arXiv:2504.02441 (Apr. 2025). (Year: 2025).*

Balaneshin-Kordan, Saeid et al; "Deep Neural Architecture for Multi-Modal Retrieval based on Joint Embedding Space for Text and Images", Association for Computing Machinery, Feb. 5-9, 2018, pp. 1-9, Marina Del Rey, CA, USA.

Gim, In, et al; "Prompt Cache: Modular Attention Reuse for Low-Latency Inference", arXiv:2311.04934v2, Apr. 2024.

Khan, Abdul Rafae, et al; "Coding Textual Inputs Boosts the Accuracy of Neural Networks", 2020 Conference on Empirical Methods in Natural Language Processing, Nov. 16-20, 2020, pp. 1350-1360.

Messina, Nicola et al; "Towards Efficient Cross-Modal Visual Textual Retrieval using Transformer-Encoder Deep Features", 2021 International Conference on Content-Based Multimedia Indexing, 2021, pp. 1-6, United States.

Seo, Beomsoek et al; "How Does A Transformer Learn Compression? An Attention Study on Huffman and LZ4", Department of Electronic and Electrical Engineering, Dec. 12, 2023, vol. 11, Seoul, South Korea.

Vaswani, Ashish, et al; "Attention is All You Need", arXiv:1706.03762v7, Aug. 2023.

Wang, Tianming, & Wan, Xiaojun; "T-CVAE: Transformer-based conditioned variational autoencoder for story completion", Proceedings of the Twenty-Eighth Joint Conference on Artificial Intelligence, pp. 5233-5239, 2019.

Wieting, John et al; "A Bilingual Generative Transformer for Semantic Sentence Embedding", arXiv:1911.03895v2, Nov. 2020.

* cited by examiner

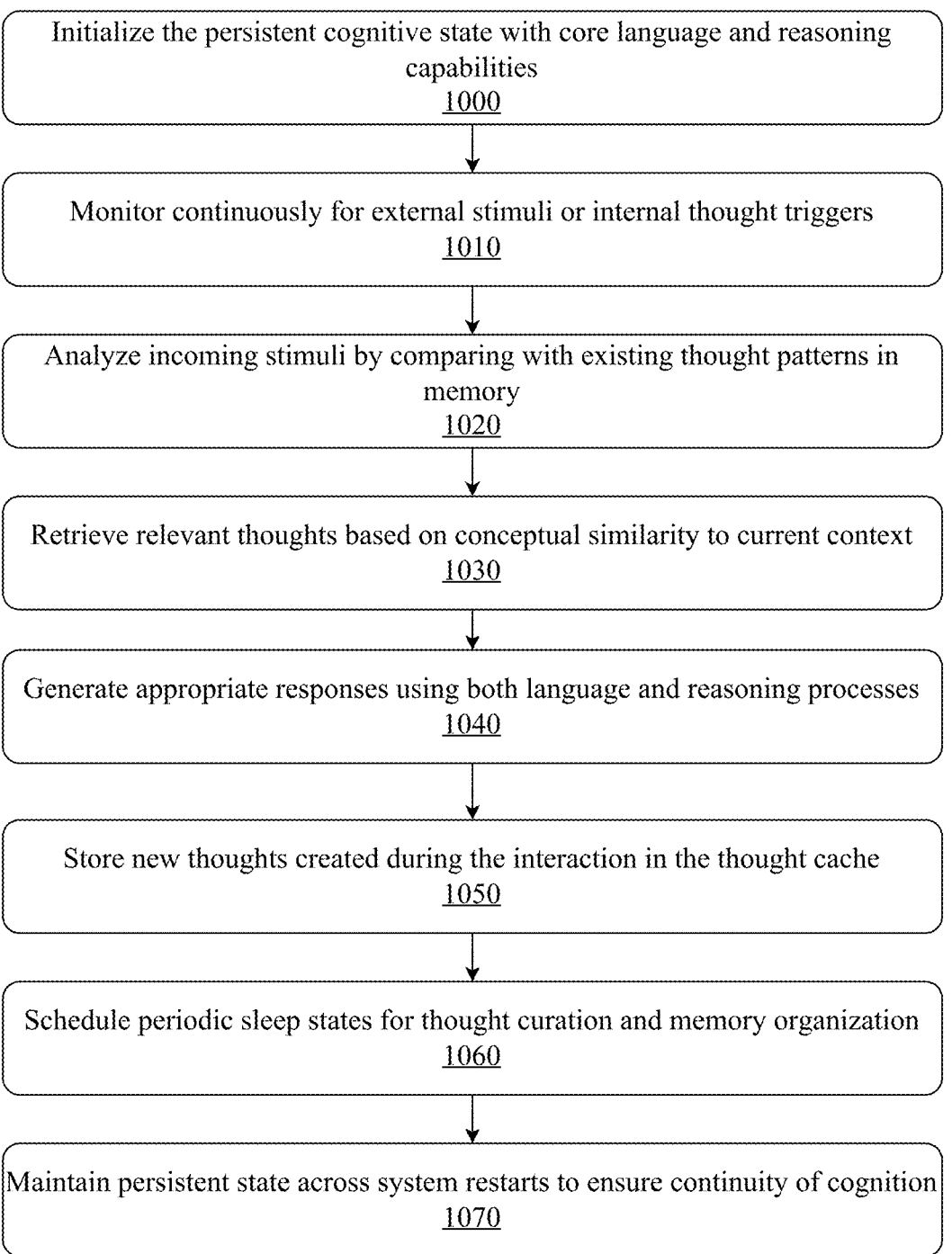

Initialize the persistent cognitive state with core language and reasoning capabilities
1000

Monitor continuously for external stimuli or internal thought triggers
1010

Analyze incoming stimuli by comparing with existing thought patterns in memory
1020

Retrieve relevant thoughts based on conceptual similarity to current context
1030

Generate appropriate responses using both language and reasoning processes
1040

Store new thoughts created during the interaction in the thought cache
1050

Schedule periodic sleep states for thought curation and memory organization
1060

Maintain persistent state across system restarts to ensure continuity of cognition
1070

FIG. 10

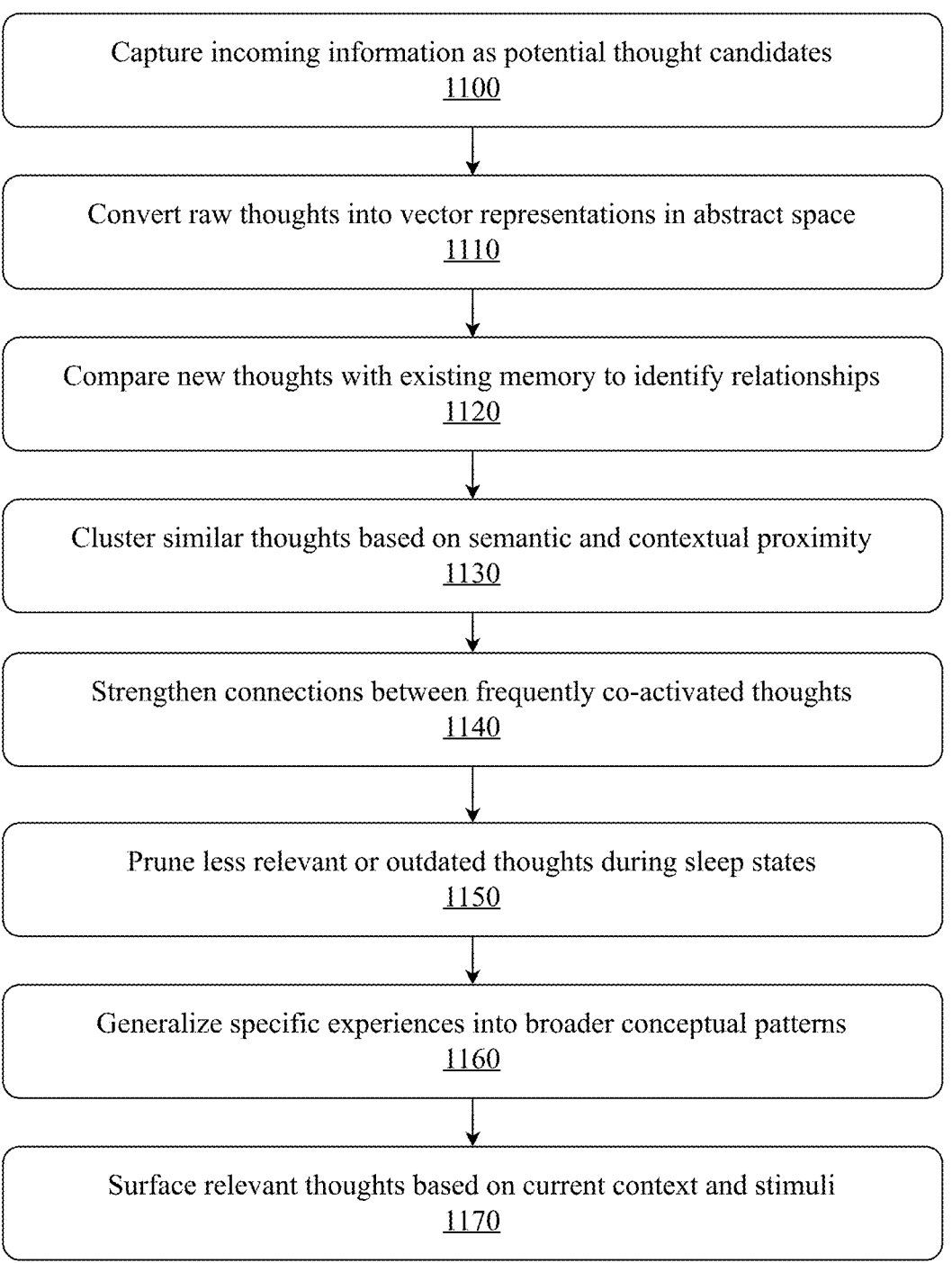

Capture incoming information as potential thought candidates
1100

Convert raw thoughts into vector representations in abstract space
1110

Compare new thoughts with existing memory to identify relationships
1120

Cluster similar thoughts based on semantic and contextual proximity
1130

Strengthen connections between frequently co-activated thoughts
1140

Prune less relevant or outdated thoughts during sleep states
1150

Generalize specific experiences into broader conceptual patterns
1160

Surface relevant thoughts based on current context and stimuli
1170

FIG. 11

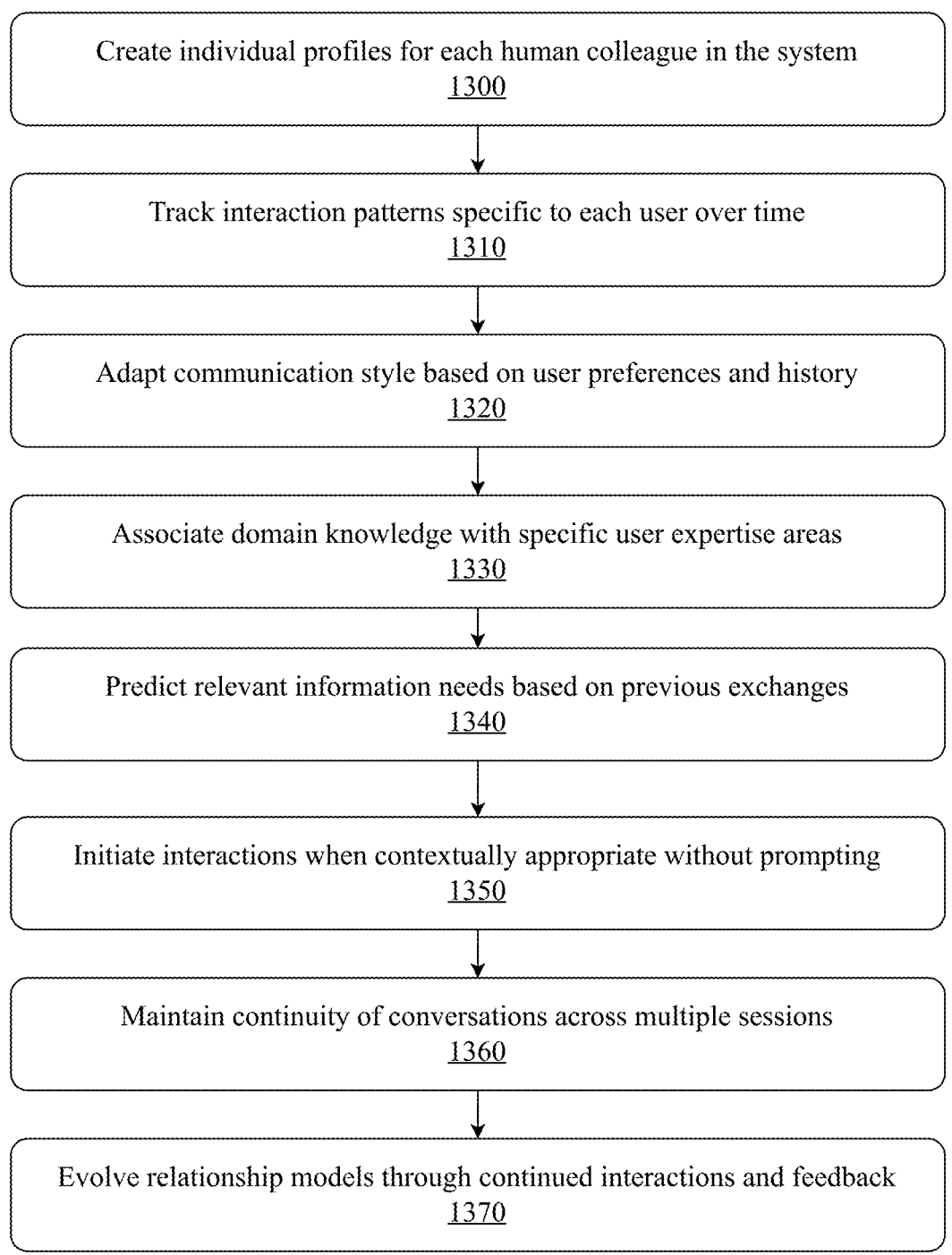

Create individual profiles for each human colleague in the system
1300

Track interaction patterns specific to each user over time
1310

Adapt communication style based on user preferences and history
1320

Associate domain knowledge with specific user expertise areas
1330

Predict relevant information needs based on previous exchanges
1340

Initiate interactions when contextually appropriate without prompting
1350

Maintain continuity of conversations across multiple sessions
1360

Evolve relationship models through continued interactions and feedback
1370

FIG. 13

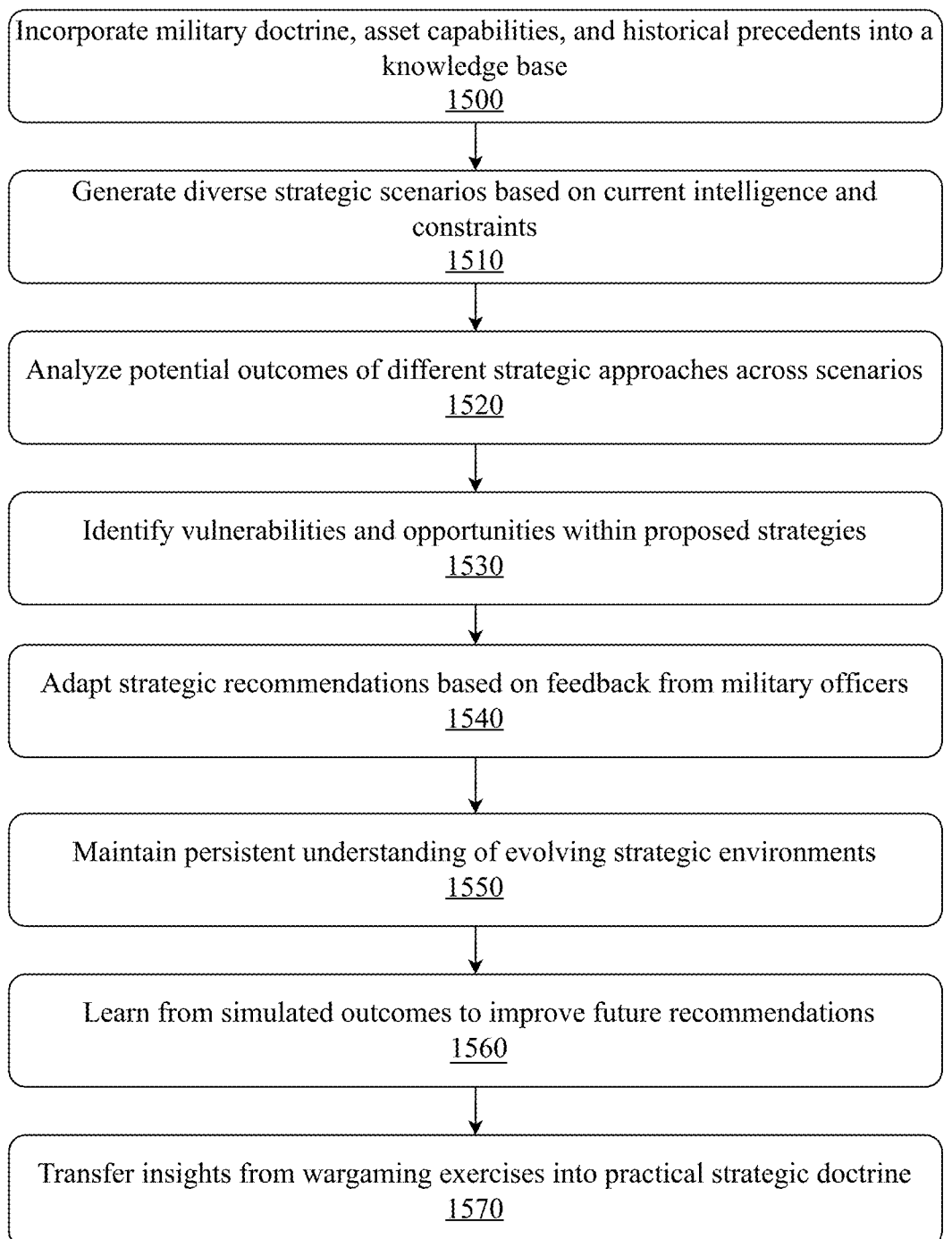

Incorporate military doctrine, asset capabilities, and historical precedents into a knowledge base
1500

Generate diverse strategic scenarios based on current intelligence and constraints
1510

Analyze potential outcomes of different strategic approaches across scenarios
1520

Identify vulnerabilities and opportunities within proposed strategies
1530

Adapt strategic recommendations based on feedback from military officers
1540

Maintain persistent understanding of evolving strategic environments
1550

Learn from simulated outcomes to improve future recommendations
1560

Transfer insights from wargaming exercises into practical strategic doctrine
1570

FIG. 15

SYSTEM AND METHOD FOR ENTERPRISE HIERARCHICAL PERSISTENT COGNITIVE MACHINES WITH ORGANIZATIONAL HIERARCHY AWARENESS AND COMPLIANCE INTEGRATION

CROSS-REFERENCE TO RELATED APPLICATIONS

Priority is claimed in the application data sheet to the following patents or patent applications, which are expressly incorporated herein by reference in their entireties:

Ser. No. 19/294,125,
Ser. No. 19/203,069 (issued as U.S. Pat. No. 12,481,688),
Ser. No. 19/205,960 (published as US 2025-0363367 A1),
Ser. No. 19/060,794 (published as US 2025-0363363 A1),
Ser. No. 19/044,546 (published as US 2025-0363360 A1),
Ser. No. 19/026,276 (published as US 2025-0363359 A1),
Ser. No. 18/928,022 (published as US 2025-0363358 A1),
Ser. No. 18/919,417 (published as US 2025-0363347 A1),
Ser. No. 18/918,077 (published as US 2025-0363333 A1),
Ser. No. 18/737,906 (published as US 2025-0378308 A1),
Ser. No. 18/736,498 (published as US 2025-0363344 A1),
63/651,359,
Ser. No. 19/178,873,
Ser. No. 19/177,611, and
Ser. No. 19/051,193 (issued as U.S. Pat. No. 12,387,050).

FIELD OF THE ART

The present invention relates generally to artificial intelligence systems, and more particularly to systems and methods for implementing persistent cognitive capabilities in computing machines that extend beyond traditional prompt-response paradigms.

DISCUSSION OF THE STATE OF THE ART

Enterprise organizations present unique challenges for cognitive system deployment that extend beyond the capabilities of current machines. Modern enterprises operate through complex hierarchical structures with distinct authority levels, specialized functional domains, and sophisticated information sensitivity requirements that determine appropriate access and processing protocols. Within these organizational contexts, different departments maintain specialized expertise, regulatory obligations, and operational responsibilities that require domain-specific cognitive processing capabilities while maintaining coordination across functional boundaries.

Current enterprise artificial intelligence (AI) deployments typically implement generic language models that lack understanding of organizational hierarchy, enterprise-specific terminology, and the complex compliance requirements that characterize modern business environments. These systems treat all users uniformly regardless of organizational position, fail to respect authority boundaries and escalation procedures, cannot adapt to enterprise-specific communication patterns and terminology, and lack integration with regulatory compliance frameworks that govern enterprise operations. Furthermore, existing systems cannot adapt to organizational changes such as restructuring, mergers, or departmental reorganizations that require dynamic reconfiguration of cognitive architecture and knowledge distribution.

Enterprise environments also require sophisticated compliance integration that ensures cognitive processing adheres to regulatory requirements. Current AI systems lack the fine-grained compliance awareness necessary to enforce these requirements during cognitive processing, creating significant barriers to enterprise adoption. Additionally, enterprises require cognitive systems that can evolve with organizational changes, maintaining knowledge continuity while adapting to new hierarchical structures, functional responsibilities, and compliance obligations. The deployment of persistent cognitive machines within enterprise environments requires sophisticated organizational intelligence that can navigate complex hierarchy structures, respect authority boundaries, enforce regulatory compliance, adapt to enterprise-specific communication patterns, and evolve with organizational changes.

What is needed is an enterprise hierarchical persistent cognitive machine system that combines the foundational persistent cognitive capabilities with organizational hierarchy awareness, enterprise-specific language adaptation, comprehensive compliance integration, and dynamic organizational change adaptation capabilities that enable effective deployment within complex enterprise environments while maintaining the advanced cognitive capabilities that characterize persistent cognitive machine technology.

SUMMARY OF THE INVENTION

Accordingly, the inventor has conceived and reduced to practice, a system and methods for enterprise hierarchical persistent cognitive machines (PCMs) that extends mobile-optimized multi-stage language model processing with organizational hierarchy awareness and enterprise-specific adaptations. The system comprises a chief executive officer PCM (CEO-PCM) at the executive level coordinating multiple functional domain PCMs corresponding to organizational departments. A supervisory network layer dynamically adapts underlying language models to enterprise-specific dialect, terminology, and communication patterns through automated analysis of organizational knowledge sources. User prompts are routed through enterprise hierarchical pathways based on authority levels and sensitivity classification, enabling appropriate escalation and cross-functional coordination. The CEO-PCM synthesizes insights from multiple domain PCMs to generate enterprise-wide strategic intelligence while domain-specific compliance modules enforce regulatory requirements during cognitive processing. The system automatically adapts to organizational changes by redistributing knowledge and reconfiguring PCM architecture, while maintaining persistent cognitive state across enterprise operations through comprehensive state preservation and restoration mechanisms that ensure organizational knowledge continuity.

According to a preferred embodiment, a computing system for enterprise hierarchical persistent cognitive machines, the computing system comprising: one or more hardware processors configured for: initializing an enterprise hierarchical persistent cognitive machine architecture comprising a CEO-PCM and a plurality of functional domain PCMs corresponding to organizational departments; implementing a supervisory network layer that adapts underlying language model processing to enterprise-specific dialect and organizational communication patterns; routing user prompts through the enterprise hierarchical architecture based on user authority level and prompt sensitivity classification; synthesizing cross-functional insights by collecting domain-specific knowledge from multiple functional domain PCMs and integrating the knowledge into enterprise-wide strategic intelligence; enforcing domain-specific compliance requirements during cognitive processing through compliance modules associated with respective functional domain PCMs; automatically adapting the enterprise hierarchical architecture in response to detected organizational changes by redistributing knowledge between functional domain PCMs; and maintaining persistent cognitive state across the enterprise hierarchical architecture including thought cache contents and organizational relationship models.

According to another preferred embodiment, a computer-implemented method for enterprise hierarchical persistent cognitive machines, the method comprising the steps of: initializing an enterprise hierarchical persistent cognitive machine architecture comprising a CEO-PCM and a plurality of functional domain PCMs corresponding to organizational departments; implementing a supervisory network layer that adapts underlying language model processing to enterprise-specific dialect and organizational communication patterns; routing user prompts through the enterprise hierarchical architecture based on user authority level and prompt sensitivity classification; synthesizing cross-functional insights by collecting domain-specific knowledge from multiple functional domain PCMs and integrating the knowledge into enterprise-wide strategic intelligence; enforcing domain-specific compliance requirements during cognitive processing through compliance modules associated with respective functional domain PCMs; automatically adapting the enterprise hierarchical architecture in response to detected organizational changes by redistributing knowledge between functional domain PCMs; and maintaining persistent cognitive state across the enterprise hierarchical architecture including thought cache contents and organizational relationship models.

According to a further aspect, the method includes analyzing prompt content to determine required functional domain expertise; and escalating prompts to supervisory levels when user authority is insufficient for direct processing. According to a further aspect, the method includes adapting vocabulary and communication styles through an enterprise dialect processor; and injecting hierarchy-aware information into cognitive processing through an organizational context manager. According to a further aspect, the method includes adapting vocabulary and communication styles through an enterprise dialect processor; and injecting hierarchy-aware information into cognitive processing through an organizational context manager. According to a further aspect, the method includes detecting conflicts between domain-specific knowledge from different functional domain PCMs; and resolving the conflicts using enterprise priority frameworks. According to a further aspect, the method includes entering sleep states during periods of reduced user activity; and performing memory consolidation and cross-domain insight generation during the sleep states. According to a further aspect, the method includes monitoring organizational announcements for structural changes; creating adaptation plans for PCM architecture modifications; and validating adapted architecture through systematic testing. According to a further aspect, the method includes applying graduated access controls between cache tiers based on information sensitivity; and preventing unauthorized cross-domain knowledge access through privacy protection mechanisms. According to a further aspect, the method includes serializing cognitive states including thought cache contents and relationship models; and restoring complete cognitive state upon system restart to preserve enterprise knowledge continuity.

BRIEF DESCRIPTION OF THE DRAWING FIGURES

FIG. 10 is a flow diagram illustrating an exemplary method for a persistent cognitive machine platform.

FIG. 11 is a flow diagram illustrating an exemplary method for processing and managing thoughts within the persistent cognitive machine platform.

FIG. 13 is a flow diagram illustrating an exemplary method for developing and maintaining relationships with human users within the persistent cognitive machine platform, particularly as implemented in a synthetic cognitive colleague application.

FIG. 15 is a flow diagram illustrating an exemplary method for strategic analysis and simulation within the persistent cognitive machine platform, as implemented in a strategic wargaming application.

Figure 25A:
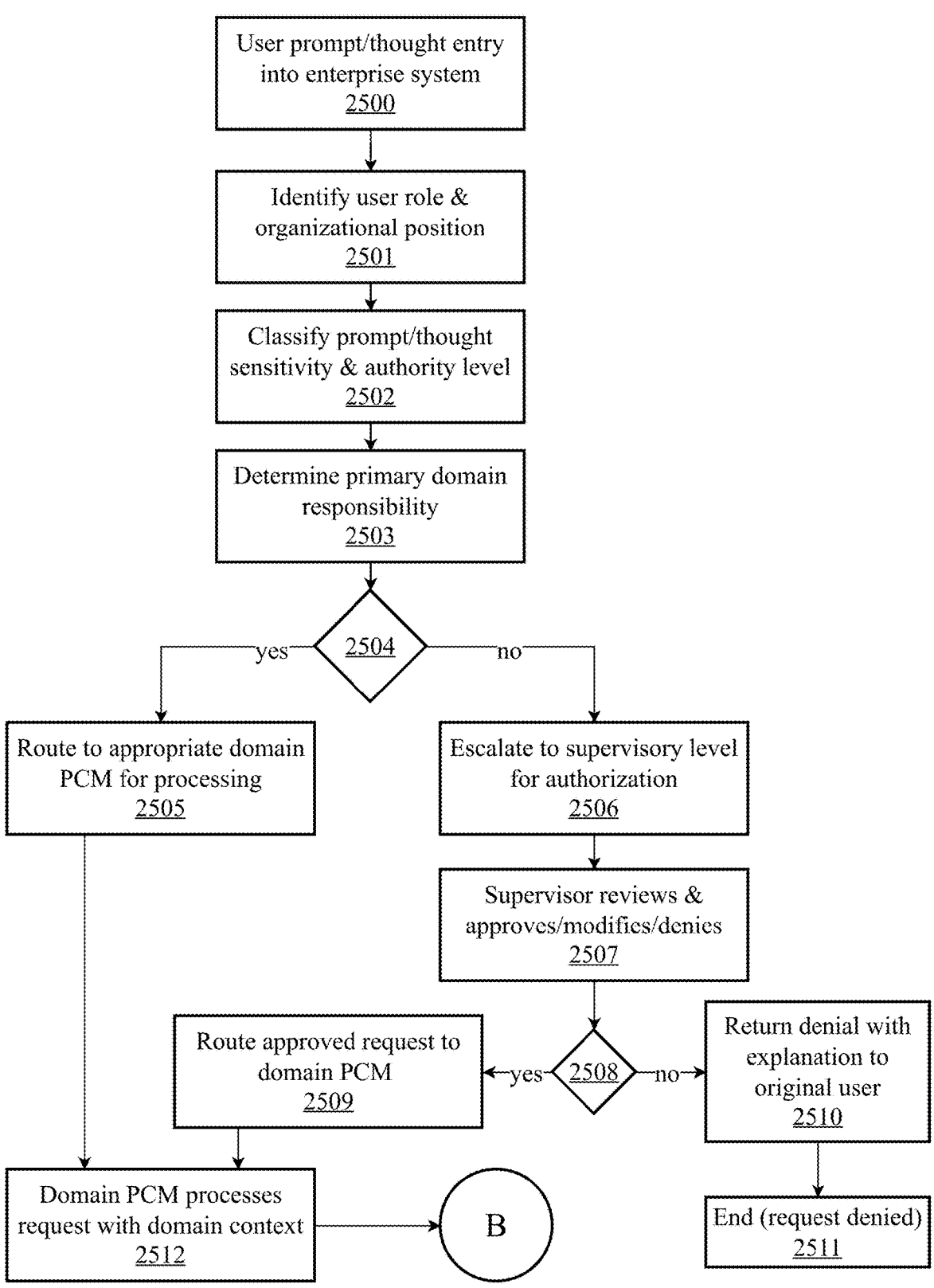
Figure 25B:
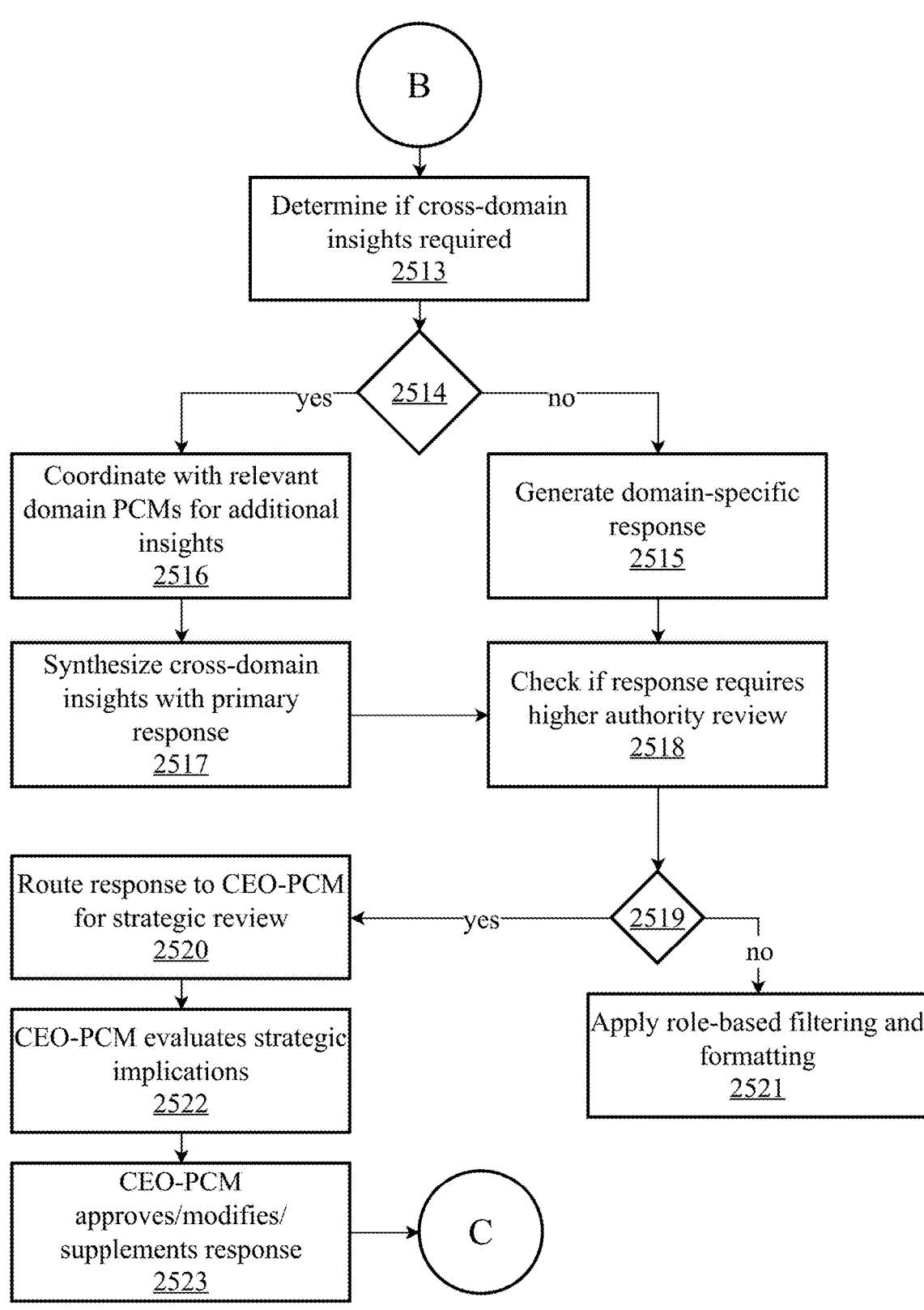
Figure 25C:
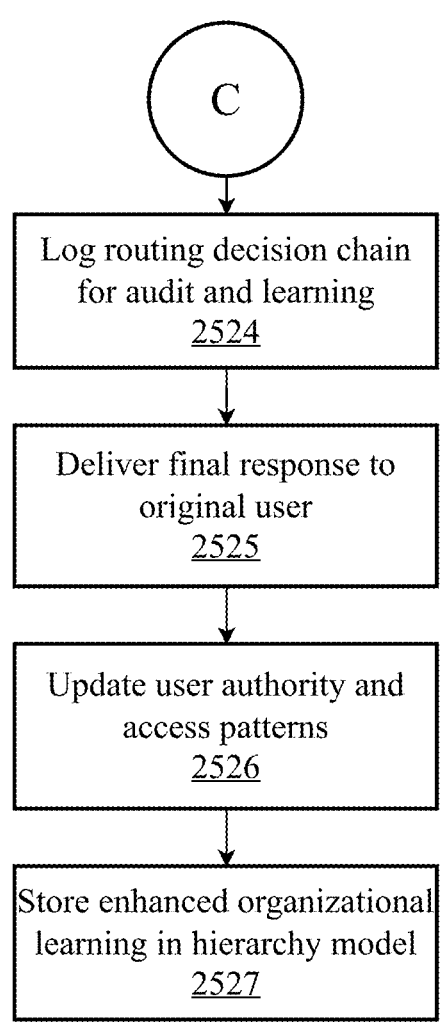

FIGS. 25A, 25B, and 25C provide a flow diagram illustrating an exemplary method for enterprise hierarchical thought routing process that manages information flow through organizational structure based on authority levels, sensitivity classification, and routing protocols.

Figure 26A:
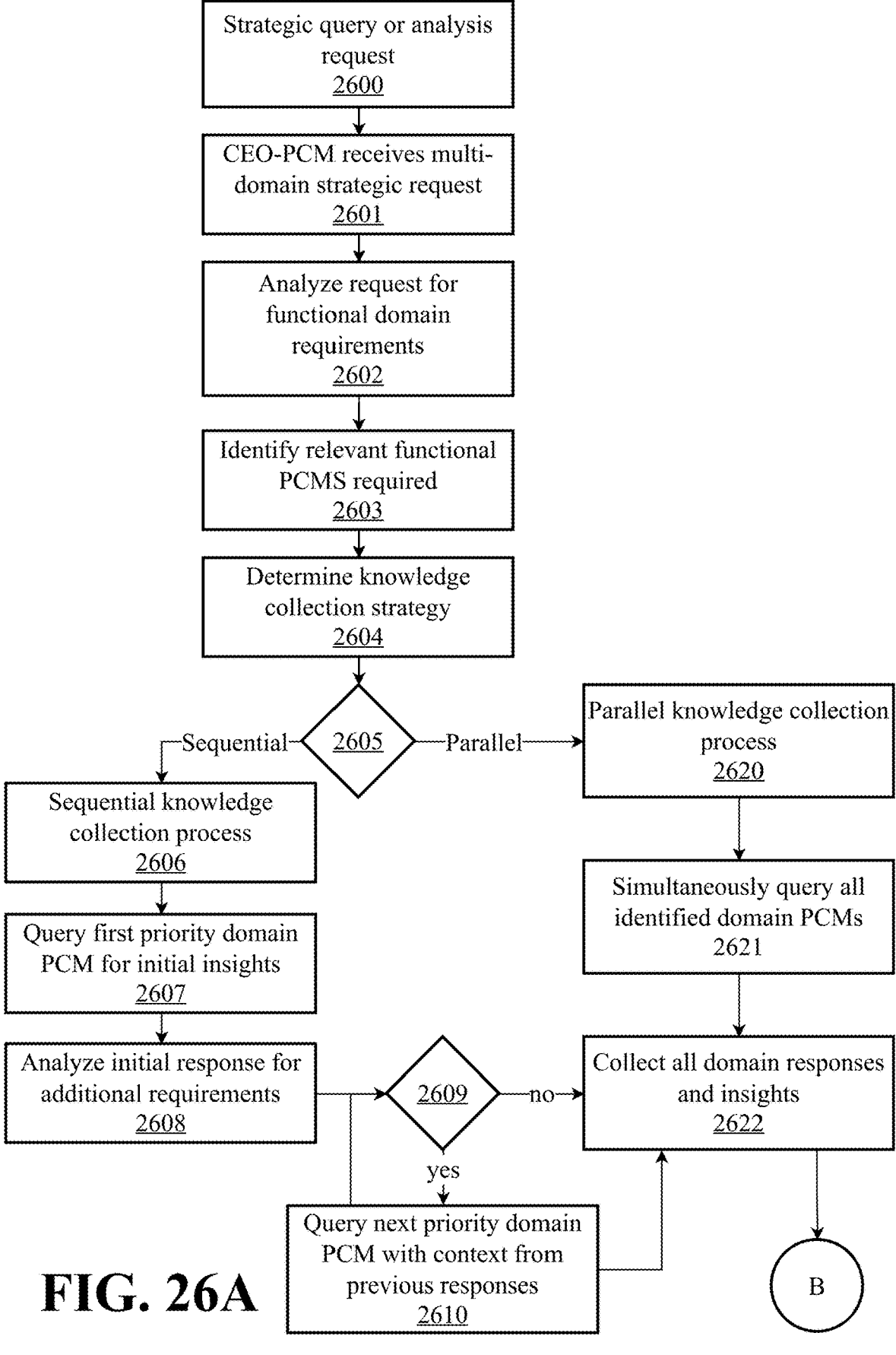
Figure 26B:
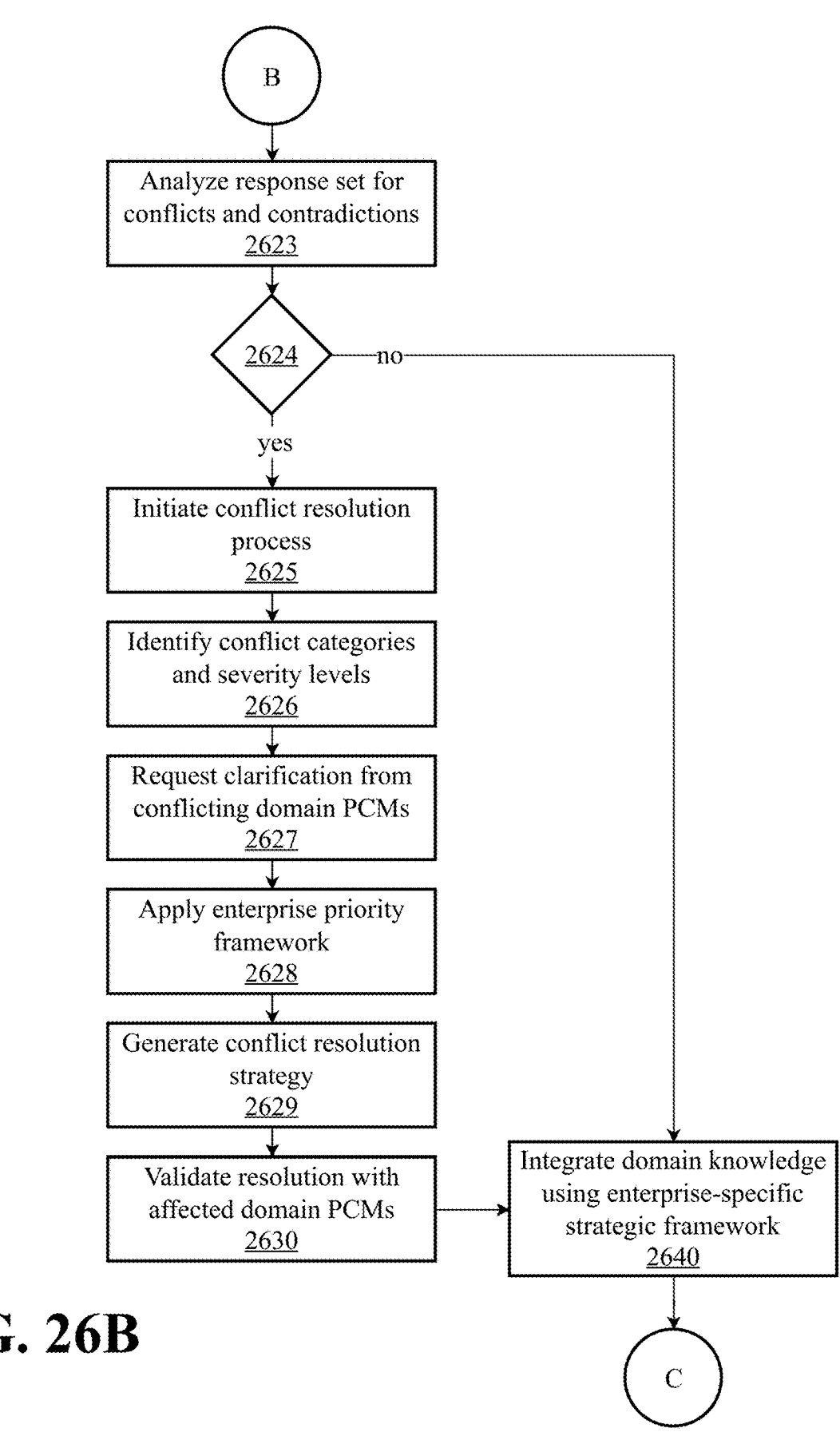
Figure 26C:
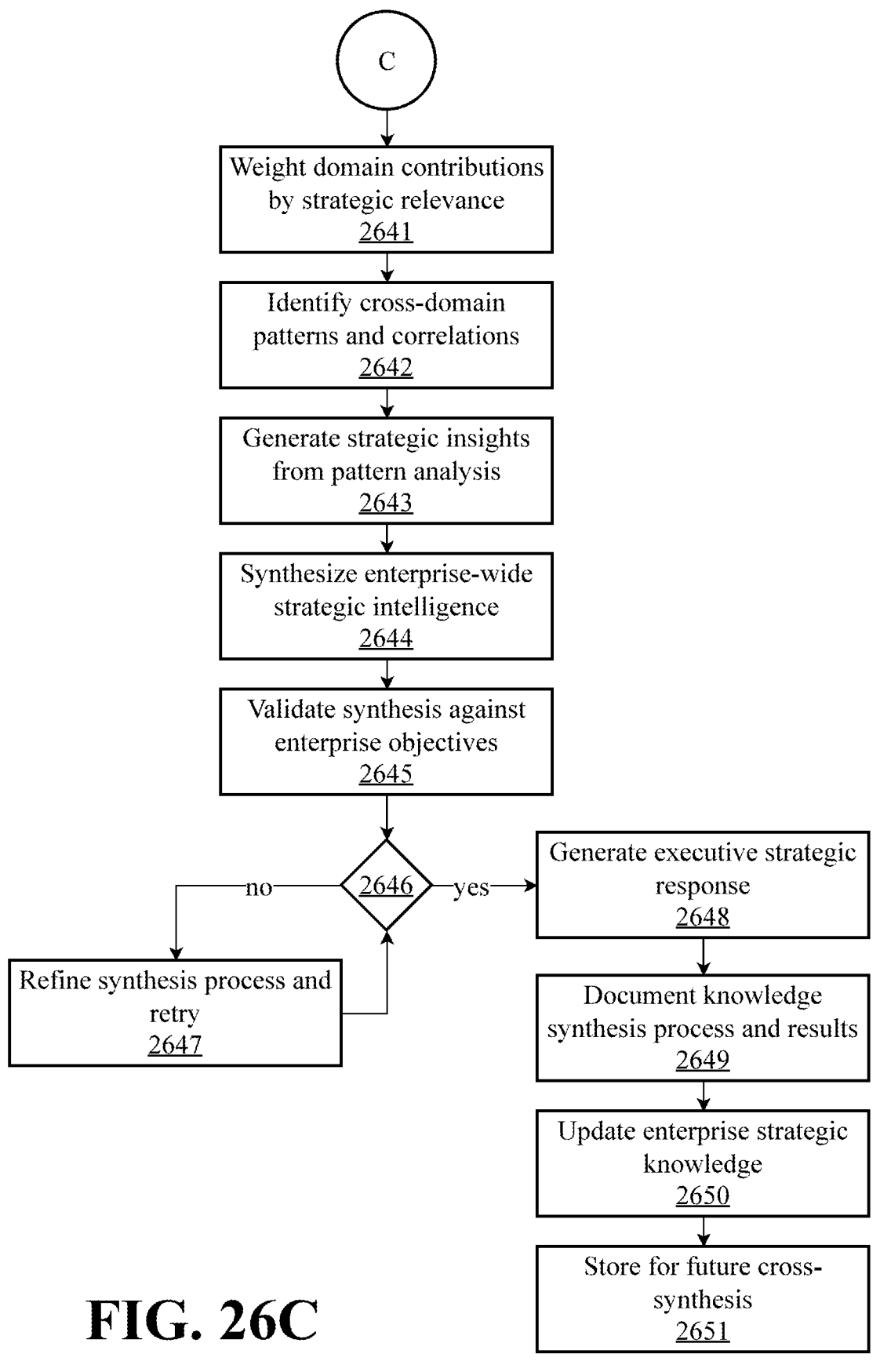

FIGS. 26A, 26B, and 26C provide a flow diagram illustrating an exemplary method for cross-functional knowledge synthesis process that enables CEO-PCM to integrate insights from multiple departmental PCMs into enterprise-wide strategic intelligence.

Figure 27:
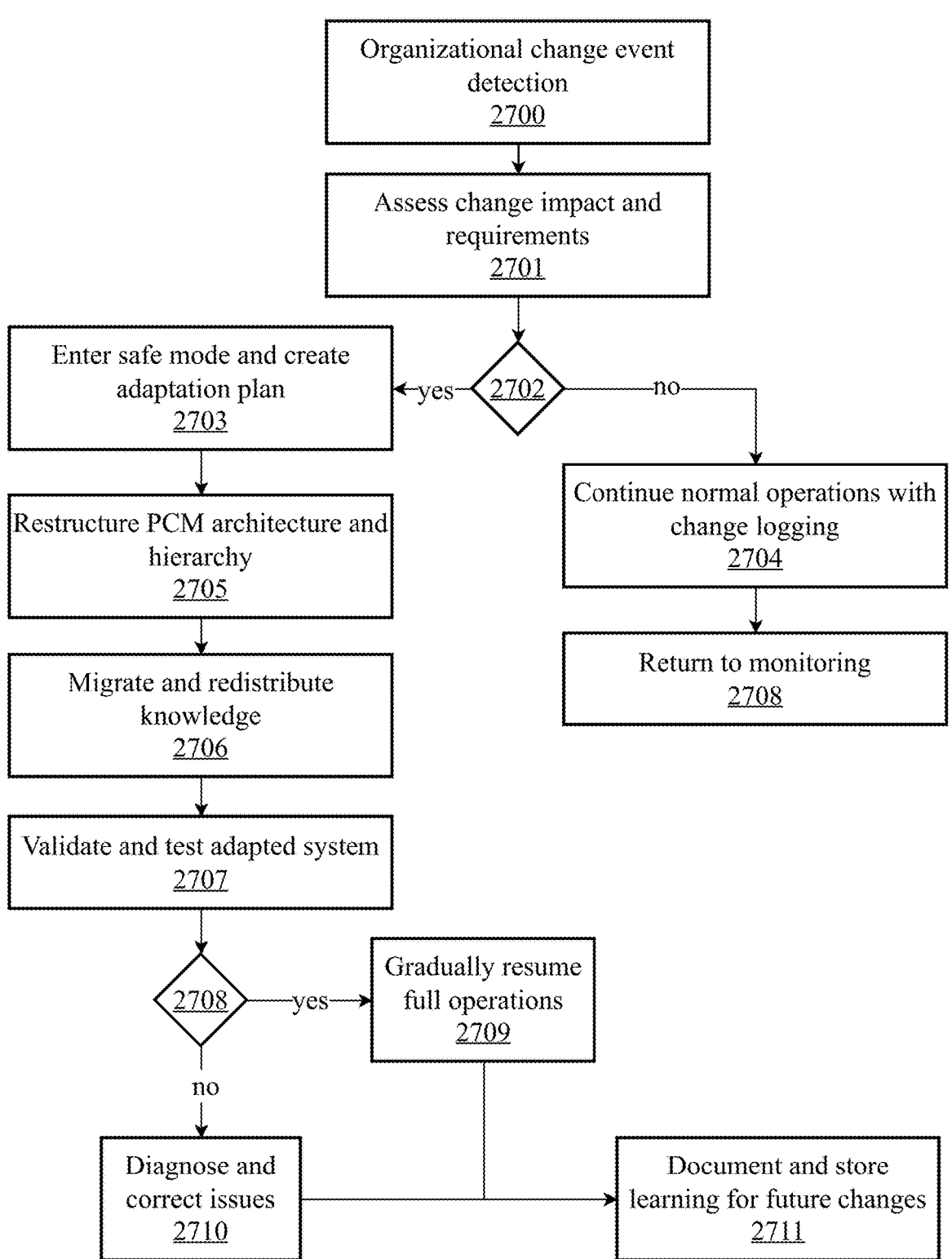

FIG. 27 is a flow diagram illustrating an exemplary method for an organizational change adaptation process that enables enterprise PCM systems to dynamically reconfigure when organizational structure, hierarchy, or functional responsibilities undergo modification.

Figure 28:
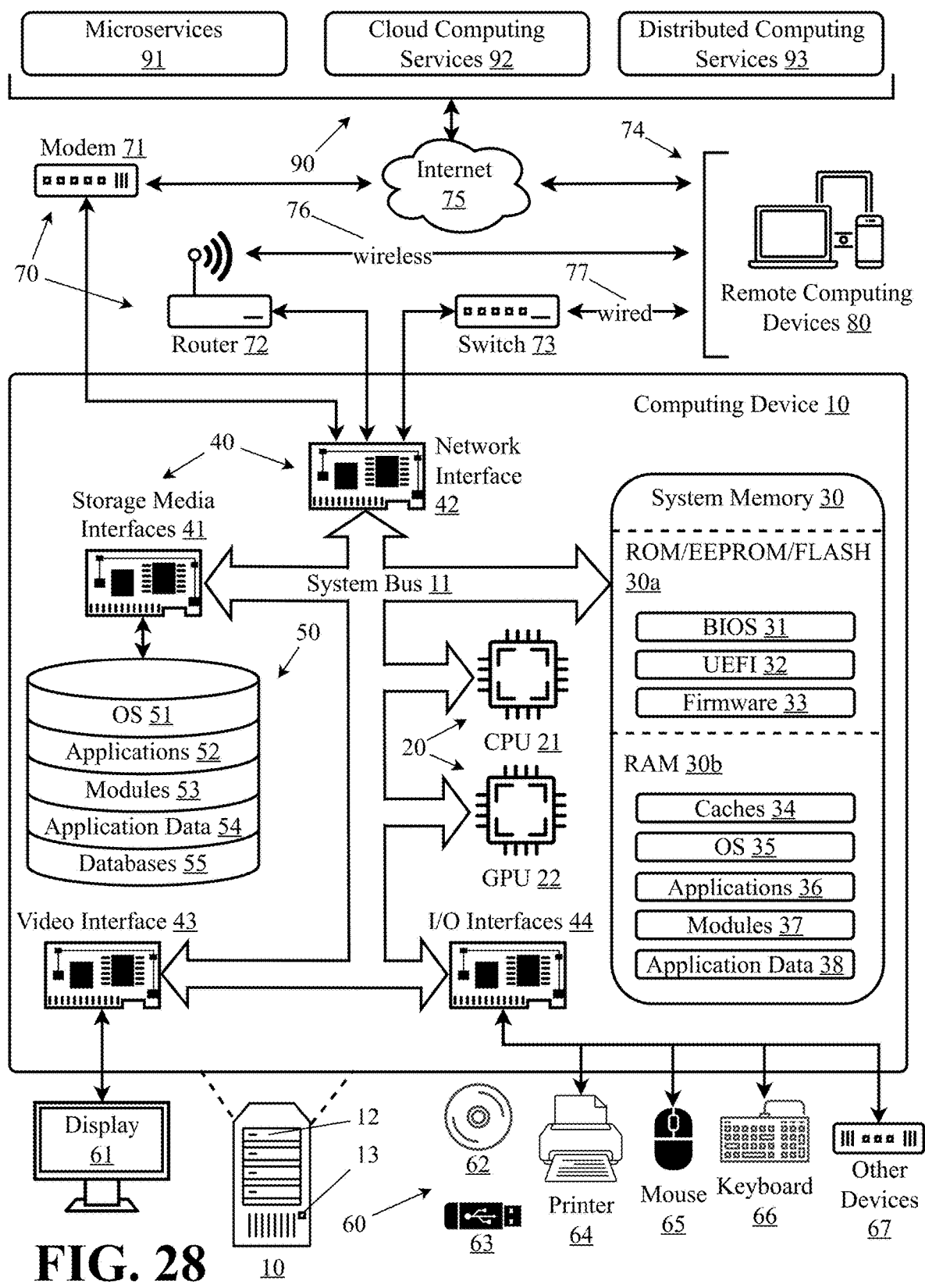

FIG. 28 illustrates an exemplary computing environment on which an embodiment described herein may be implemented.

DETAILED DESCRIPTION OF THE INVENTION

The inventor has conceived and reduced to practice, a system and methods for enterprise hierarchical persistent cognitive machines that extends mobile-optimized multi-stage language model processing with organizational hierarchy awareness and enterprise-specific adaptations.

The PCM achieves its cognitive continuity through several mechanisms: sleep states that allow for thought curation and memory organization similar to biological sleep functions; a persistence layer that maintains state across system restarts; an executive core that orchestrates cognitive processes; and specialized components for knowledge embedding and relationship tracking. These capabilities make the PCM particularly well-suited for applications requiring long-term relationship building and knowledge accumulation, such as a synthetic cognitive colleague that develops individualized relationships with team members, or the strategic wargaming platform that continuously improves its analytical capabilities through accumulated simulation experiences. Unlike traditional AI that either resets with each interaction or requires explicit external state management, the PCM naturally develops increasing sophistication through its intrinsic ability to accumulate and organize experiences over time.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features.

Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "Persistent Cognitive Machine" or "PCM" refers to a computing system that maintains persistent cognitive processes regardless of external interaction, can remember previous experiences, learn from these experiences, create new thought experiences independently, and initiate interactions without waiting for external prompts. Unlike traditional AI systems that operate within a prompt-response paradigm, a PCM operates with persistent awareness even when not actively engaged with users or external systems.

As used herein, "thought" refers to a discrete unit of cognition within the persistent cognitive machine, representing information, concepts, observations, inferences, questions, or other cognitive elements that the system processes and stores. Thoughts may be derived from external inputs, generated through internal reasoning processes, or created through recombination of existing thoughts.

As used herein, "thought cache" refers to the component of the persistent cognitive machine that stores, organizes, and provides access to thoughts. The thought cache may include both short-term and long-term storage capabilities, with mechanisms for transferring information between them and organizing thoughts based on semantic relationships.

As used herein, "sleep state" refers to a mode of operation in which the persistent cognitive machine temporarily reduces responsiveness to external stimuli to focus on internal cognitive maintenance processes, including but not limited to memory consolidation, thought generalization, insight generation, and memory reorganization.

Conceptual Architecture

Figure 21:
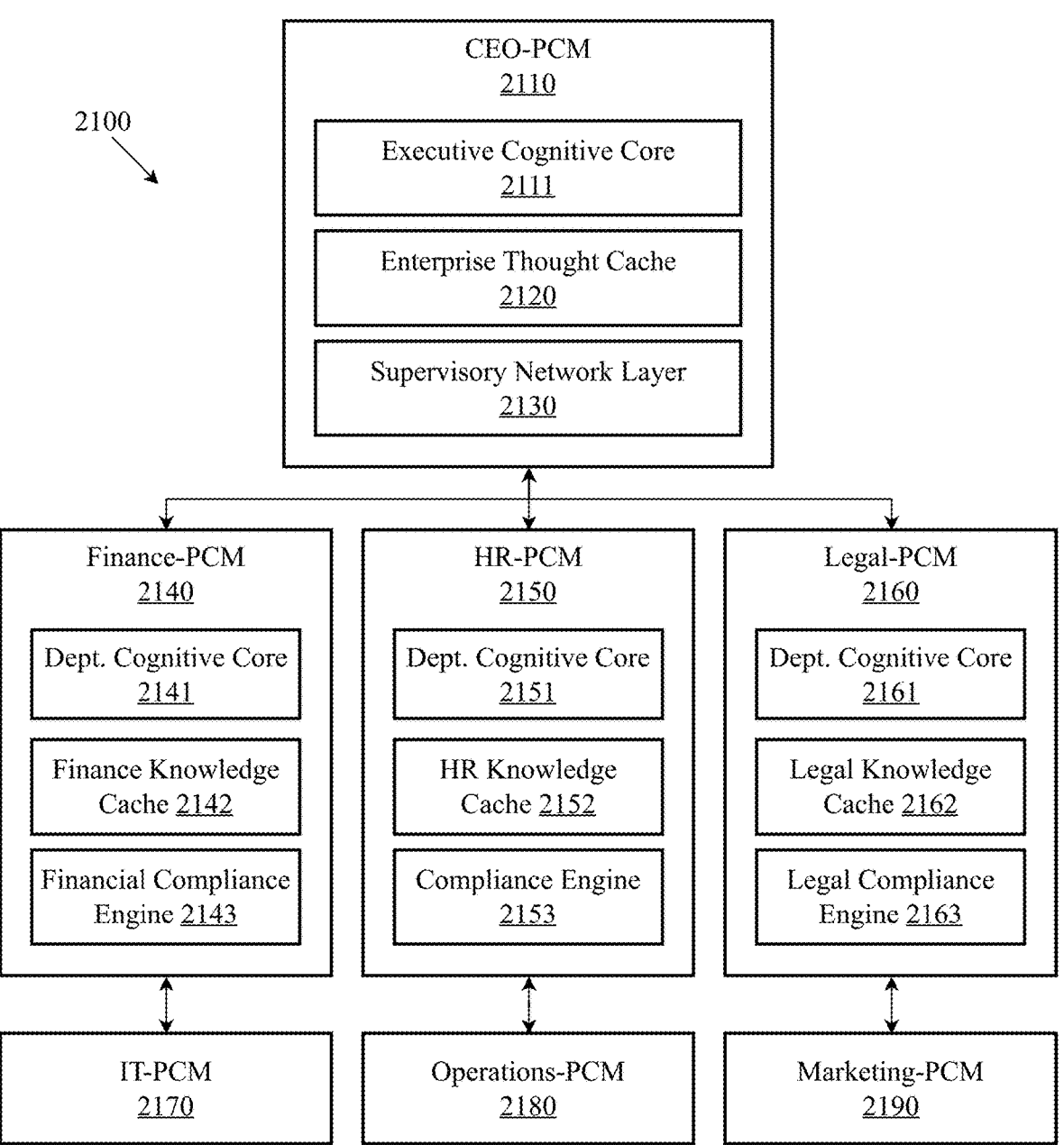
FIG. 21 is a block diagram illustrating an exemplary system architecture for an enterprise hierarchical PCM with CEO-level oversight coordinating multiple functional PCMs within an organizational structure.

FIG. 21 is a block diagram illustrating an exemplary system architecture for an enterprise hierarchical PCM with (chief executive officer) CEO-level oversight coordinating multiple functional PCMs within an organizational structure. Enterprise hierarchical PCM architecture 2100 represents an advancement in persistent cognitive machine technology through implementation of organizational hierarchy-aware cognitive processing that aligns with enterprise structures while maintaining specialized functional expertise across departmental boundaries.

According to the embodiment, at the top of the enterprise hierarchical PCM architecture is a CEO-PCM 2110, which serves as the executive cognitive entity providing strategic oversight and cross-functional coordination across all departmental PCMs within the organizational structure. CEO-PCM 2110 improves upon traditional prompt-response paradigms by maintaining persistent awareness of enterprise-wide strategic context while synthesizing insights across functional domains to support executive decision-making processes. Unlike departmental PCMs that focus on specialized knowledge domains, CEO-PCM 2110 operates at the highest level of organizational abstraction, processing strategic information and generating enterprise-wide insights that inform long-term planning and coordination.

Within CEO-PCM 2110, an executive cognitive core 2111 implements various strategic decision support capabilities that leverage enterprise-wide context and cross-functional intelligence. Executive cognitive core 2111 extends the foundational cognitive capabilities described in various embodiments herein with enhanced strategic reasoning frameworks specifically designed for executive-level decision making. This component can perform cross-functional insight synthesis by analyzing patterns across multiple departmental domains, identifying strategic opportunities and risks that may not be apparent within individual functional areas. Executive cognitive core 2111 also coordinates enterprise-wide resource allocation decisions by maintaining awareness of capabilities, constraints, and priorities across all functional PCMs, enabling optimal resource distribution based on strategic objectives and operational requirements.

An enterprise thought cache 2120 provides strategic knowledge repository capabilities specifically designed for executive-level cognitive processing. Unlike departmental thought caches that focus on domain-specific knowledge, enterprise thought cache 2120 maintains highest-level abstractions and strategic patterns that emerge from enterprise-wide operations. This component stores strategic knowledge including, but not limited to, market intelligence, competitive analysis, regulatory trends, and organizational performance patterns that inform long-term planning processes. Enterprise thought cache 2120 also maintains cross-functional patterns that represent relationships and dependencies between different organizational areas, enabling CEO-PCM 2110 to understand the enterprise-wide implications of decisions made within specific functional domains. Additionally, enterprise thought cache 2120 preserves executive intelligence including decision frameworks, strategic methodologies, and leadership insights that accumulate through CEO-PCM operations over time.

A supervisory network layer 2130 component may be present and configured to enable dynamic adaptation of cognitive processing to enterprise-specific dialect, culture, and communication patterns. Supervisory network layer 2130 implements enterprise dialect management capabilities that continuously adapt the underlying language models to organization-specific terminology, communication styles, and cultural norms. This adaptation occurs through analysis of enterprise communications, documents, and interaction patterns, creating specialized vocabulary and communication frameworks tailored to the specific organizational context. Supervisory network layer 2130 also performs organizational context injection, ensuring that cognitive processing incorporates relevant enterprise context including, but not limited to, corporate values, strategic priorities, cultural considerations, and operational constraints that influence decision-making processes. Furthermore, supervisory network layer 2130 optimizes executive communication by adapting response generation to executive-level communication patterns, ensuring that CEO-PCM 2110 interactions align with executive expectations and communication norms.

Below CEO-PCM 2110 in the enterprise hierarchy are multiple functional PCMs including, but not limited to, Finance-PCM 2140, (human resources) HR-PCM 2150, and Legal-PCM 2160, each specializing in their respective organizational domains while maintaining coordinated operation within the broader enterprise architecture. Each functional PCM contains specialized components optimized for their particular domain requirements while preserving integration capabilities with the enterprise hierarchy. In such embodiments, these functional PCMs extend the domain-specialized architecture concepts from federated persistent cognitive systems with enhanced enterprise integration and compliance capabilities specifically designed for organizational deployment.

Finance-PCM 2140 implements financial domain specialization through departmental cognitive core 2141 that provides various financial reasoning, analysis, and decision support capabilities. Departmental cognitive core 2141 within Finance-PCM 2140 may be configured to specialize in financial modeling, risk assessment, budgeting, forecasting, and investment analysis while maintaining continuous coordination with CEO-PCM 2110 for strategic alignment. Finance knowledge cache 2142 stores domain-specific financial knowledge including accounting principles, regulatory requirements, market data, historical financial patterns, and institutional financial expertise accumulated through operational experience. Financial compliance engine 2143 implements specialized regulatory compliance capabilities including, for instance, payment card industry data security standard (PCI-DSS) requirements for payment processing, Sarbanes-Oxley Act (SOX) compliance for financial reporting, tax regulation adherence, and other financial regulatory frameworks. Financial compliance engine 2143 operates continuously during cognitive processing to ensure all financial reasoning and recommendations comply with applicable regulatory requirements while maintaining comprehensive audit trails for compliance verification.

HR-PCM 2150 specializes in human resources domain knowledge through departmental cognitive core 2151 that provides expertise in talent management, organizational development, employee relations, and workforce planning. HR knowledge cache 2152 maintains specialized knowledge including, but not limited to, employment law, organizational psychology, talent acquisition strategies, performance management frameworks, and workforce analytics. HR compliance engine 2153 may implement, for example, Health Insurance Portability and Accountability Act (HIPAA) compliance for employee health information, employment law adherence, diversity and inclusion requirements, and other human resources regulatory frameworks. HR compliance engine 2153 ensures that all HR-related cognitive processing maintains appropriate privacy protections for employee information while supporting organizational talent management objectives.

Legal-PCM 2160 provides specialized legal domain expertise through departmental cognitive core 2161 that supports contract analysis, regulatory compliance assessment, risk evaluation, and legal research activities. Legal knowledge cache 2162 stores specialized legal knowledge including case law, regulatory frameworks, contract templates, compliance procedures, and institutional legal expertise. Legal compliance engine 2163 implements comprehensive legal compliance capabilities including data privacy regulations such as GDPR, industry-specific regulatory requirements, intellectual property protections, and litigation risk management. In some aspects, legal compliance engine 2163 operates as both a specialized processing component within Legal-PCM 2160 and as an enterprise-wide compliance coordination mechanism that supports compliance activities across all functional PCMs.

According to various embodiments, enterprise hierarchical PCM architecture 2100 may further comprise additional functional PCMs such as IT-PCM 2170, Operations-PCM 2180, and Marketing-PCM 2190, each implementing similar specialized architectures adapted to their respective domains. These additional functional PCMs maintain the same architectural patterns of departmental cognitive cores, specialized knowledge caches, and domain-specific compliance engines while focusing on their particular organizational functions. IT-PCM 2170 specializes in technology infrastructure, cybersecurity, and information systems management. Operations-PCM 2180 focuses on operational efficiency, process optimization, and supply chain management. Marketing-PCM 2190 concentrates on customer engagement, brand management, and market analysis.

A variety of enterprise users interact with enterprise hierarchical PCM system 2100 through role-appropriate interfaces that connect them with relevant functional PCMs while providing escalation pathways to CEO-PCM 2110 for strategic matters. For example, a chief financial officer (CFO) primarily interacts with Finance-PCM 2140 for financial analysis and decision support while having access to CEO-PCM 2110 for strategic financial planning.

Meanwhile an HR Director engages with HR-PCM 2150 for talent management and organizational development while coordinating with CEO-PCM 2110 for workforce strategy. General Counsel for the enterprise utilizes Legal-PCM 2160 for legal analysis and compliance oversight while providing legal guidance to CEO-PCM 2110 for strategic legal considerations. A chief technical officer CTO works with IT-PCM 2170 for technology strategy and implementation while participating in enterprise-wide technology planning through CEO-PCM 2110.

In operation, enterprise hierarchical PCM architecture 2100 implements sophisticated information flow patterns that respect organizational hierarchy while enabling efficient knowledge sharing and coordination. Bottom-up information flow aggregates departmental insights and operational intelligence to CEO-PCM 2110 for strategic synthesis and enterprise-wide pattern recognition. Top-down information flow distributes strategic directives, enterprise context, and coordination requirements from CEO-PCM 2110 to one or more functional PCMs, ensuring alignment between strategic objectives and operational activities. In some embodiments, lateral coordination between functional PCMs occurs through CEO-PCM 2110 mediation, enabling cross-functional collaboration while maintaining appropriate organizational boundaries and compliance requirements. Throughout all information flows, compliance engines within each functional PCM continuously monitor cognitive processing to ensure adherence to applicable regulatory requirements while maintaining comprehensive audit trails for enterprise compliance verification.

The persistent cognitive capabilities established in foundational embodiments extend throughout enterprise hierarchical PCM system 2100, enabling continuous learning and adaptation at both functional and strategic levels. Each functional PCM maintains autonomous reasoning capabilities within its domain while contributing to enterprise-wide intelligence development through coordinated interaction with CEO-PCM 2110. Sleep state processing occurs across the enterprise hierarchy, with functional PCMs performing domain-specific optimization while CEO-PCM 2110 conducts enterprise-wide strategic analysis and cross-functional pattern recognition. Through this enterprise architecture, persistent cognitive capabilities transform from individual cognitive assistance to organization-wide cognitive partnership that supports both specialized functional excellence and strategic enterprise leadership.

Figure 22:
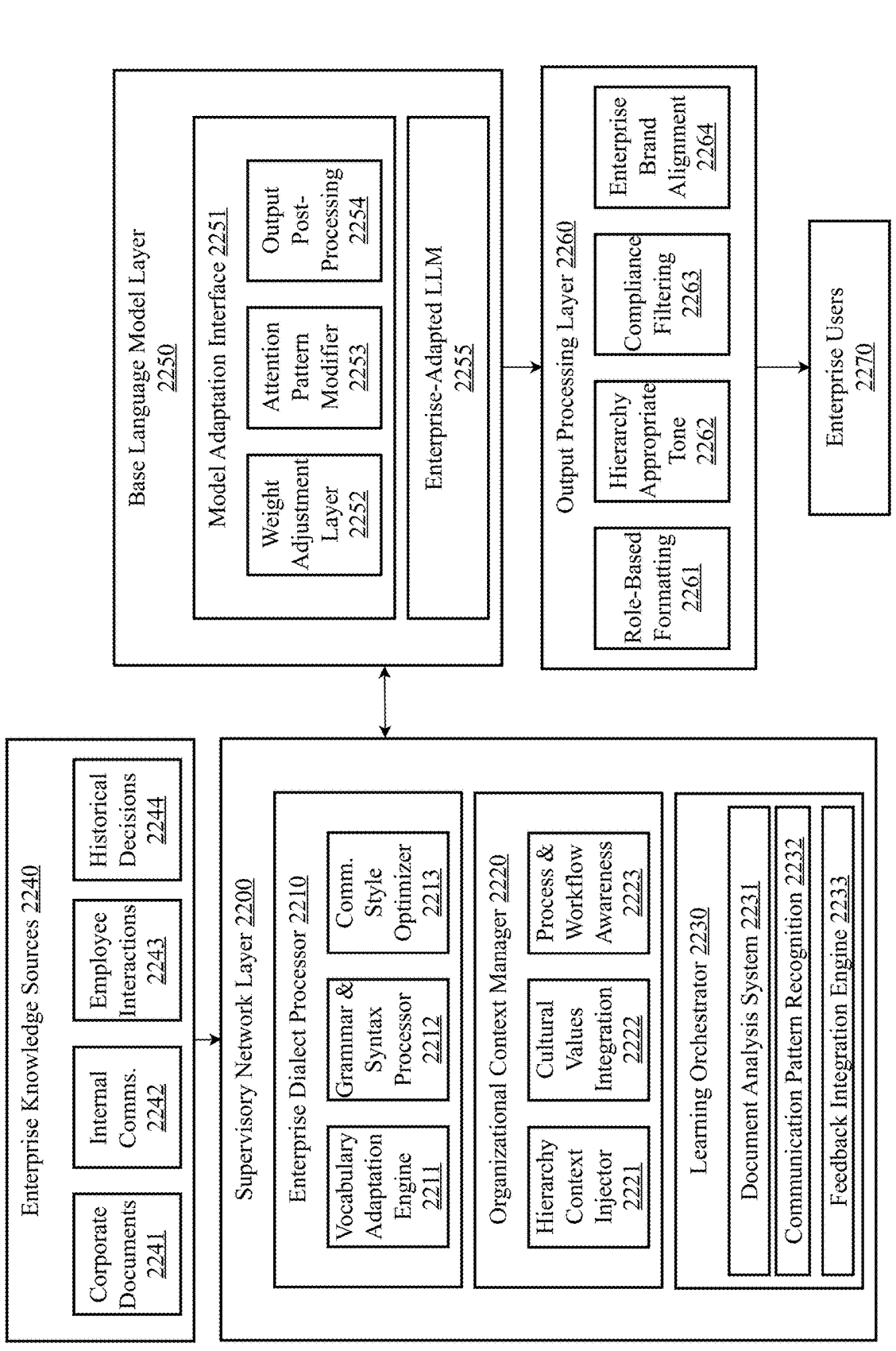
FIG. 22 is a block diagram illustrating an exemplary supervisory network architecture for enterprise dialect adaptation and organizational context integration within persistent cognitive machine, according to an embodiment.

FIG. 22 is a block diagram illustrating an exemplary supervisory network architecture for enterprise dialect adaptation and organizational context integration within persistent cognitive machine, according to an embodiment. A supervisory network layer 2200 is component that enables dynamic adaptation of underlying language models to enterprise-specific communication patterns, organizational culture, and contextual requirements while preserving the foundational cognitive capabilities described in various embodiments herein.

Supervisory network layer 2200 operates as an intermediary processing layer between enterprise knowledge sources and the base language model, implementing one or more adaptation mechanisms that transform generic language processing capabilities into enterprise-aware cognitive processing. Unlike traditional fine-tuning approaches that require extensive retraining of base models, supervisory network layer 2200 implements dynamic adaptation through specialized processing components that modify model behavior in real-time based on organizational context and accumulated enterprise knowledge. This approach enables rapid deployment across diverse enterprise environments while maintaining the underlying model's general capabilities and reducing computational overhead associated with enterprise-specific model training.

Enterprise dialect processor 2210 within supervisory network layer 2200 can be configured to implement various language adaptation capabilities that enable persistent cognitive machines to communicate using enterprise-specific terminology, communication patterns, and linguistic conventions. Enterprise dialect processor 2210 extends beyond simple vocabulary substitution to encompass sophisticated understanding of organizational communication culture including, but not limited to, formal and informal communication patterns, industry-specific terminology usage, and role-appropriate language conventions that vary across organizational hierarchy levels.

According to some embodiments, a vocabulary adaptation engine 2211 within enterprise dialect processor 2210 maintains dynamic vocabularies that reflect enterprise-specific terminology, acronyms, product names, and domain-specific language patterns. Vocabulary adaptation engine 2211 continuously updates these vocabularies through analysis of enterprise communications, documents, and interactions, identifying emerging terminology and evolving language patterns within the organizational context. This component may implement one or more disambiguation mechanisms that recognize when standard terms have enterprise-specific meanings, ensuring that cognitive processing reflects organizational usage rather than generic definitions. Vocabulary adaptation engine 2211 also maintains role-specific vocabulary variations, recognizing that different organizational levels and functions may use different terminology for similar concepts.

According to an aspect, a grammar and syntax processor 2212 adapts underlying language model processing to reflect enterprise-specific communication structures, sentence patterns, and document formatting conventions. Grammar and syntax processor 2212 can analyze enterprise communications to identify preferred sentence structures, communication flows, and document organization patterns that characterize organizational communication style.

This component ensures that generated responses align with established enterprise communication patterns rather than generic language model outputs, creating more natural integration with existing organizational communication practices. Grammar and syntax processor 2212 may also implement role-specific syntax adaptation, recognizing that executive communications typically employ different structural patterns than technical communications or customer-facing materials.

A communication style optimizer 2213 may be present and configured to implement sophisticated adaptation of response generation to match enterprise communication culture including formality levels, directness preferences, collaborative versus authoritative tones, and industry-appropriate communication conventions. Communication style optimizer 2213 analyzes patterns across enterprise communications to identify preferred communication approaches for different contexts, roles, and interaction types. This component enables persistent cognitive machines to generate responses that feel native to the organizational culture rather than generically appropriate, improving user acceptance and integration within existing communication patterns. Communication style optimizer 2213 also implements adaptive communication based on recipient analysis, adjusting communication style based on the organizational role, seniority level, and relationship context of communication recipients.

According to some embodiments, an organizational context manager 2220 provides comprehensive awareness of enterprise structure, cultural values, and operational processes that inform cognitive processing beyond linguistic adaptation. Organizational context manager 2220 maintains dynamic models of enterprise context that influence decision-making, priority assessment, and recommendation generation within persistent cognitive machines. This component ensures that cognitive processing incorporates relevant organizational factors including, but not limited to, strategic priorities, cultural values, operational constraints, and relationship dynamics that affect appropriate responses within the enterprise environment.

A hierarchy context injector 2221 within organizational context manager 2220 maintains awareness of organizational structure, reporting relationships, and authority distributions that influence appropriate cognitive processing for different users and contexts. Hierarchy context injector 2221 implements complex understanding of formal and informal organizational hierarchies, recognizing that communication patterns, information access, and decision-making authority vary based on organizational position. This component ensures that persistent cognitive machines adapt their processing and response generation based on user organizational position, maintaining appropriate deference patterns, information sharing protocols, and escalation procedures that align with enterprise hierarchy. Hierarchy context injector 2221 may also implement cross-functional relationship awareness, understanding how different departments and roles interact within the organizational structure.

A cultural values integration module 2222 incorporates enterprise cultural principles, ethical frameworks, and value systems into cognitive processing, ensuring that recommendations and decision support align with organizational culture beyond mere compliance requirements. Cultural values integration 2222 can be configured to analyze enterprise communications, policies, and decision patterns to identify core cultural values that influence organizational decision-making. According to an aspect, this component may implement value-aware reasoning that considers cultural alignment when generating recommendations or analysis, ensuring that cognitive assistance supports rather than conflicts with enterprise cultural principles. Cultural values integration 2222 may further comprise cultural sensitivity awareness, recognizing situations where cultural considerations should influence response generation or recommendation prioritization.

A process and workflow awareness module 2223 maintains understanding of enterprise operational processes, workflow patterns, and procedural requirements that inform contextually appropriate cognitive assistance. Process and workflow awareness 2223 analyzes enterprise process documentation, communication patterns, and operational flows to understand how work proceeds within the organizational context. This component enables persistent cognitive machines to provide process-aware assistance that recognizes workflow stages, procedural requirements, and timing constraints that affect appropriate responses. Process and workflow awareness 2223 also implements cross-functional process understanding, recognizing how different departments contribute to enterprise-wide processes and how cognitive assistance can support collaborative workflows.

According to an embodiment, a learning orchestrator 2230 coordinates continuous adaptation of supervisory network layer 2200 through systematic analysis of enterprise knowledge sources and feedback integration from cognitive processing outcomes. Learning orchestrator 2230 implements one or more learning mechanisms that enable supervisory network layer 2200 to evolve and improve its enterprise adaptation capabilities through operational experience. Unlike static configuration approaches, learning orchestrator 2230 enables dynamic improvement of enterprise adaptation based on usage patterns, feedback signals, and evolving organizational characteristics.

A document analysis system 2231 within learning orchestrator 2230 processes enterprise knowledge sources to extract linguistic patterns, organizational context, and cultural indicators that inform supervisory network adaptation. Document analysis system 2231 implements natural language processing capabilities specifically designed to identify enterprise-specific characteristics from various document types including, but not limited to, policies, procedures, communications, and organizational materials. This component can employ advanced pattern recognition to identify recurring themes, communication patterns, and organizational characteristics that should influence cognitive processing adaptation. Document analysis system 2231 also implements one or more change detection mechanisms that identify evolving organizational characteristics requiring supervisory network updates.

According to an aspect, a communication pattern recognition system 2232 analyzes enterprise communication flows to identify preferred interaction patterns, collaboration styles, and information sharing protocols that characterize organizational communication culture. Communication pattern recognition 2232 processes internal communications including email, messaging platforms, meeting transcripts, and collaborative document interactions to understand how information flows within the enterprise. This component identifies both formal communication protocols and informal interaction patterns that influence appropriate cognitive assistance within the organizational context. Communication pattern recognition 2232 can also implement temporal pattern analysis, recognizing how communication patterns vary based on organizational cycles, project phases, and business contexts.

A feedback integration engine 2233 incorporates user feedback, interaction outcomes, and cognitive processing effectiveness measures to continuously refine supervisory network adaptation capabilities. According to an aspect, feedback integration engine 2233 implements feedback analysis that identifies successful adaptation patterns and areas requiring improvement within supervisory network layer 2200. This component processes both explicit user feedback and implicit usage signals to understand when enterprise adaptation enhances cognitive assistance effectiveness and when adjustments are needed. In some embodiments, feedback integration engine 2233 also implements A/B testing capabilities that enable systematic evaluation of adaptation strategies to optimize supervisory network performance for specific enterprise contexts.

A plurality of enterprise knowledge sources 2240 provide comprehensive input for supervisory network adaptation through various organizational information sources. Corporate documents 2241 include, but are not limited to, policies, procedures, employee handbooks, and organizational charts that define formal enterprise structure and operational guidelines. Internal communications 2242 encompass email, collaboration platform messages, wiki content, and organizational announcements that reflect actual communication patterns and informal organizational culture. Employee interactions 2243 include meeting transcripts, user feedback, and collaborative interactions that provide insight into organizational working patterns and communication preferences. Historical decisions 2244 may comprise executive decisions, policy evolution, and organizational change documentation that illustrates enterprise values and decision-making patterns over time.

According to an embodiment, a base language model layer 2250 implements the interface between supervisory network layer 2200 and underlying language processing capabilities, enabling enterprise adaptation without requiring fundamental changes to base model architectures. A model adaptation interface 2251 provides standardized mechanisms for supervisory network layer 2200 to influence language model processing while preserving base model capabilities and enabling efficient deployment across diverse enterprise environments.

A weight adjustment layer 2252 within model adaptation interface 2251 implements dynamic modification of model attention patterns and processing weights based on enterprise context and supervisory network guidance. Weight adjustment layer 2252 provides real-time adaptation of language model behavior without requiring model retraining, implementing efficient mechanisms for incorporating enterprise-specific knowledge into model processing. According to an aspect, attention pattern modifier 2253 adjusts model attention mechanisms to emphasize enterprise-relevant information and communication patterns during processing. Output post-processing 2254 applies final enterprise-specific formatting, terminology, and style adjustments to model outputs before delivery to users.

An enterprise-adapted LLM 2255 represents the enhanced language model that incorporates enterprise-specific knowledge, communication patterns, and organizational context awareness through supervisory network layer 2200 processing. Enterprise-adapted LLM 2255 maintains the foundational capabilities of base language models while demonstrating enhanced performance within the specific enterprise context through supervisory network adaptation.

Output processing layer 2260 ensures that cognitive assistance delivered to enterprise users reflects appropriate role-based formatting, organizational hierarchy considerations, compliance requirements, and enterprise brand alignment. Role-based formatting 2261 adapts output presentation based on user organizational role and communication preferences. Hierarchy appropriate tone 2262 adjusts communication formality and authority patterns based on organizational relationships. Compliance filtering 2263 ensures outputs adhere to regulatory requirements and enterprise policies. Enterprise brand alignment 2264 maintains consistency with organizational communication standards and brand guidelines.

Enterprise users 2270 represent the various organizational stakeholders who interact with the enterprise-adapted persistent cognitive machines, including executives, department heads, employees, and external stakeholders who require enterprise-appropriate cognitive assistance that reflects organizational context and culture.

Figure 23:
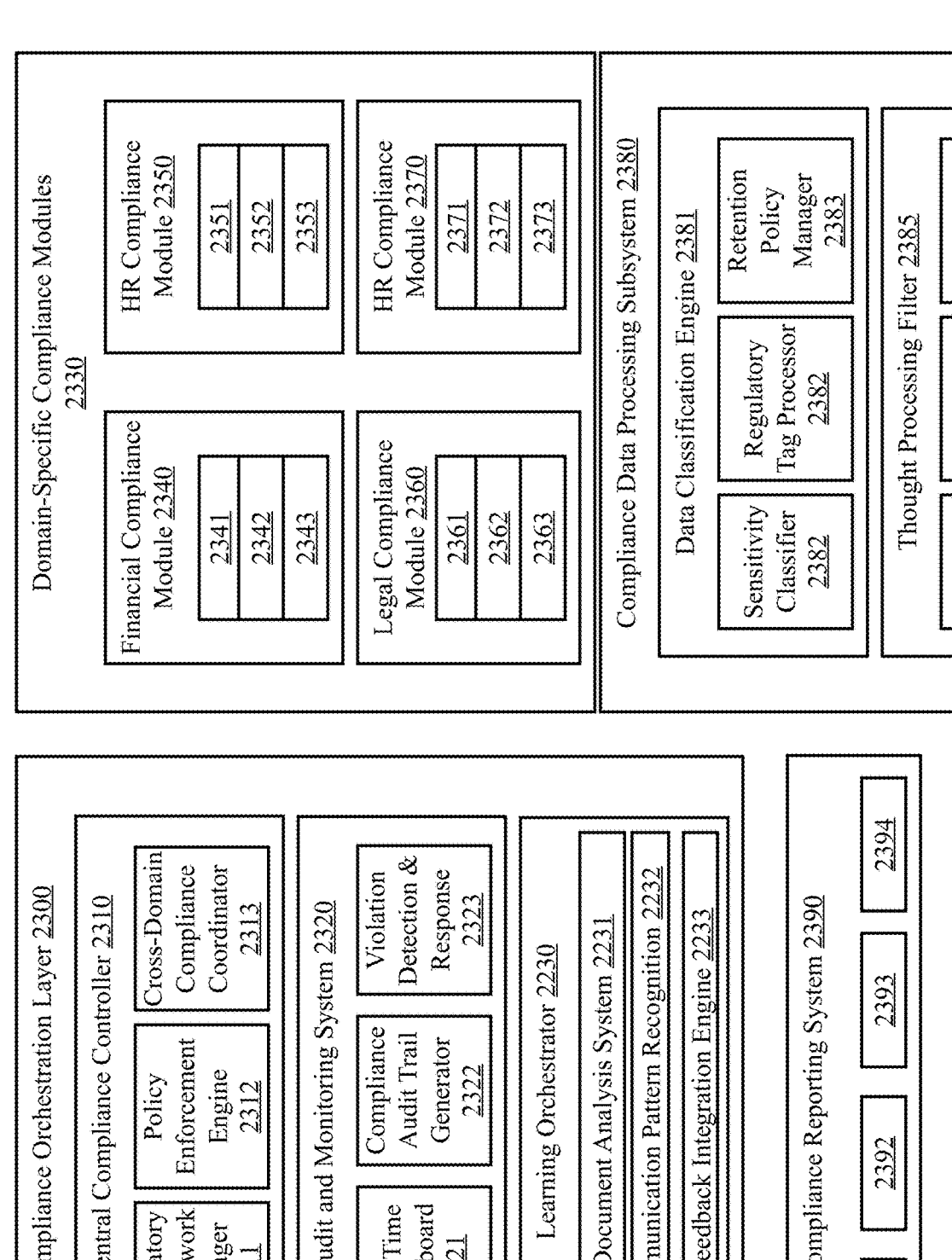
FIG. 23 is a block diagram illustrating an exemplary compliance module integration architecture that implements regulation-specific enforcement across the enterprise hierarchical PCM system, according to an embodiment.

FIG. 23 is a block diagram illustrating an exemplary compliance module integration architecture that implements regulation-specific enforcement across the enterprise hierarchical PCM system, according to an embodiment. The compliance module integration architecture implements regulatory compliance capabilities that operate continuously throughout cognitive processing, ensuring that all thought generation, memory storage, and response delivery activities adhere to applicable regulatory requirements while maintaining the sophisticated cognitive capabilities established in foundational embodiments.

A compliance orchestration subsystem layer 2300 serves as the central coordination mechanism for enterprise-wide compliance enforcement, providing unified oversight and policy coordination across all functional PCMs within the enterprise hierarchical architecture.

Compliance orchestration layer 2300 surpasses and improves upon beyond traditional compliance monitoring by implementing proactive compliance enforcement that prevents regulatory violations during cognitive processing rather than detecting violations after they occur. This layer maintains comprehensive awareness of applicable regulatory frameworks across different enterprise domains while coordinating compliance activities to ensure consistent enforcement and avoid conflicts between different regulatory requirements.

According to an embodiment, a central compliance controller 2310 within compliance orchestration layer 2300 implements enterprise-wide compliance coordination that manages regulatory framework application, policy enforcement, and cross-domain compliance requirements across the entire persistent cognitive machine architecture. Central compliance controller 2310 maintains comprehensive regulatory intelligence including, but not limited to, current regulatory requirements, emerging compliance obligations, jurisdictional variations, and industry-specific regulatory frameworks that apply to enterprise operations. This component coordinates compliance activities across functional PCMs while ensuring that domain-specific compliance requirements do not conflict with enterprise-wide compliance objectives or create regulatory gaps between functional areas.

A regulatory framework manager 2311 within central compliance controller 2310 maintains one or more databases of applicable regulatory requirements and implements dynamic regulatory tracking that identifies changes in regulatory obligations affecting enterprise operations. Regulatory framework manager 2311 processes regulatory updates from multiple sources including government agencies, industry associations, and legal counsel to ensure that compliance modules reflect current regulatory requirements. This component implements sophisticated regulatory interpretation capabilities that translate complex regulatory language into specific operational requirements for cognitive processing systems. Regulatory framework manager 2311 also maintains jurisdiction-specific regulatory variations, ensuring that multinational enterprises comply with applicable regulations across different geographic regions and legal frameworks.

A policy enforcement engine 2312 implements real-time policy enforcement during cognitive processing, ensuring that all thought generation, memory operations, and response delivery activities comply with applicable regulatory requirements. Policy enforcement engine 2312 operates continuously during cognitive processing to prevent regulatory violations rather than detecting violations after occurrence. This component maintains dynamic policy databases that translate regulatory requirements into specific operational constraints for cognitive processing components. Policy enforcement engine 2312 may also implement various conflict resolution mechanisms that address situations where multiple regulatory requirements create conflicting operational constraints.

A cross-domain compliance coordinator 2313 manages compliance requirements that span multiple functional domains, ensuring consistent compliance enforcement across departmental boundaries while addressing regulatory requirements that affect multiple enterprise functions. Cross-domain compliance coordinator 2313 identifies regulatory requirements that create cross-functional obligations, such as data protection regulations that affect multiple departments or financial regulations that require coordination between finance, legal, and operations functions. This component implements sophisticated coordination protocols that ensure compliance activities across different functional PCMs maintain consistency and avoid creating compliance gaps at domain boundaries.

According to an embodiment, an audit and monitoring system 2320 provides compliance oversight through real-time monitoring, audit trail generation, and violation detection capabilities that support both internal compliance management and external regulatory reporting requirements. Audit and monitoring system 2320 implements various monitoring capabilities that track compliance activities across all enterprise cognitive processing while generating comprehensive audit trails that demonstrate regulatory adherence to internal stakeholders and external regulators.

A real-time monitoring dashboard 2321 within audit and monitoring system 2320 provides continuous visibility into compliance status across the enterprise hierarchical PCM architecture through sophisticated visualization and alerting capabilities. Real-time monitoring dashboard 2321 can be configured to track compliance metrics including, but not limited to, policy enforcement actions, regulatory constraint applications, cross-domain compliance coordination activities, and potential compliance risks identified during cognitive processing. This component can implement role-based dashboard customization that provides appropriate compliance visibility to different stakeholder groups including compliance officers, department heads, executives, and external auditors. Real-time monitoring dashboard 2321 also implements predictive compliance analytics that identify potential compliance risks before violations occur.

According to an aspect, a compliance audit trail generator 2322 creates documentation of all compliance-related activities throughout cognitive processing, providing detailed records that demonstrate regulatory adherence and support internal and external audit requirements.

Compliance audit trail generator 2322 captures compliance enforcement actions, policy applications, regulatory decisions, and compliance-related thought modifications with sufficient detail to support regulatory examination and internal compliance verification. This component implements sophisticated audit trail organization that enables efficient retrieval of compliance information based on regulatory framework, time period, functional domain, or specific compliance activity. According to an aspect, compliance audit trail generator 2322 also maintains audit trail integrity through cryptographic mechanisms that prevent unauthorized modification of compliance records.

According to an embodiment, a violation detection and response module 2323 implements compliance monitoring that identifies potential regulatory violations during cognitive processing and coordinates appropriate response activities including violation mitigation, stakeholder notification, and corrective action implementation. Violation detection and response 2323 may employ advanced pattern recognition to identify compliance violations including direct policy violations, indirect compliance risks, and emerging compliance challenges that require proactive attention. This component implements automated response protocols that immediately address detected violations while escalating significant compliance issues to appropriate stakeholders. Violation detection and response 2323 also maintains violation trend analysis that identifies systemic compliance challenges requiring policy or process modifications.

Domain-specific compliance modules 2330 implement specialized regulatory compliance capabilities tailored to specific functional domains within the enterprise, ensuring that domain-specific regulatory requirements receive appropriate specialized enforcement while maintaining integration with enterprise-wide compliance coordination. Domain-specific compliance modules 2330 extend the federated architecture concepts established in previous embodiments with sophisticated compliance specialization that addresses the unique regulatory landscapes affecting different enterprise functions.

A financial compliance module 2340 implements financial regulatory compliance including payment processing regulations, financial reporting requirements, anti-money laundering obligations, and other financial industry regulatory frameworks. PCI-DSS processor 2341 within financial compliance module 2340 implements payment card industry data security standards enforcement during cognitive processing involving payment information, ensuring that all payment-related thoughts and responses comply with PCI-DSS requirements including data encryption, access controls, and audit trail maintenance. SOX financial controls 2342 implement Sarbanes-Oxley compliance for financial reporting and internal controls, ensuring that financial cognitive processing maintains appropriate controls over financial information and reporting processes. Anti-money laundering (AML) 2343 implements sophisticated AML compliance including transaction monitoring, suspicious activity detection, and customer due diligence requirements during financial cognitive processing.

An HR compliance module 2350 implements human resources regulatory compliance including employee privacy protection, employment law adherence, and workplace safety requirements. HIPAA processor 2351 within HR compliance module 2350 implements health insurance portability and accountability act compliance for employee health information, ensuring that all HR cognitive processing involving health information maintains appropriate privacy protections and access controls. FLSA compliance 2352 implements fair labor standards act compliance including wage and hour regulations, overtime requirements, and employee classification requirements during HR cognitive processing. EEOC compliance 2353 implements equal employment opportunity commission requirements including anti-discrimination policies, harassment prevention, and workplace equity requirements during HR cognitive processing.

A legal compliance module 2360 implements comprehensive legal regulatory compliance including data protection regulations, contract review requirements, and litigation support obligations. GDPR processor 2361 within legal compliance module 2360 implements general data protection regulation compliance for European data subjects, ensuring that all cognitive processing involving personal data complies with GDPR requirements including consent management, data minimization, and subject rights fulfillment. Data retention policies 2362 implement sophisticated data retention requirements across multiple regulatory frameworks, ensuring that cognitive processing maintains appropriate data retention periods while implementing secure data destruction when retention periods expire. Contract review engine 2363 implements automated contract compliance monitoring that identifies potential compliance issues during contract analysis and review processes.

An IT compliance module 2370 implements information technology regulatory compliance including cybersecurity requirements, data governance standards, and system controls obligations. SOX IT controls 2371 within IT compliance module 2370 implement Sarbanes-Oxley information technology controls including system access controls, data integrity protections, and change management procedures during IT cognitive processing. NIST cybersecurity framework 2372 implements national institute of standards and technology cybersecurity requirements including threat identification, protection implementation, detection capabilities, response procedures, and recovery planning during IT cognitive processing. Data governance standards 2373 implement comprehensive data governance requirements including data quality management, data lineage tracking, and data stewardship responsibilities during IT cognitive processing.

According to some embodiments, a compliance data processing subsystem 2380 implements various data handling capabilities that ensure all cognitive processing activities comply with applicable data protection and handling requirements while maintaining the cognitive processing effectiveness established in foundational embodiments. Compliance data processing layer 2380 operates continuously during thought processing to classify data sensitivity, apply appropriate regulatory tags, and implement compliant data handling procedures.

According to an aspect, a data classification engine 2381 within compliance data processing layer 2380 implements automated data classification that identifies sensitive information requiring special handling during cognitive processing. A sensitivity classifier 2382 within data classification engine 2381 employs advanced pattern recognition to identify personally identifiable information, protected health information, financial data, intellectual property, and other sensitive information categories requiring specialized compliance handling. A regulatory tag processor 2383 applies appropriate regulatory tags to identified sensitive information, ensuring that subsequent cognitive processing applies correct compliance requirements based on data sensitivity and applicable regulatory frameworks. Retention policy manager 2384 implements automated data retention management that ensures cognitive processing complies with applicable data retention requirements while implementing secure data destruction procedures when retention periods expire.

A thought processing filter 2385 implements comprehensive compliance filtering during cognitive processing to ensure that all thought generation, modification, and storage activities comply with applicable regulatory requirements. A pre-process compliance filter 2386 within thought processing filter 2385 analyzes input prompts and retrieved thoughts to identify compliance requirements before cognitive processing begins, ensuring that compliance constraints influence thought generation from the outset. A real-time compliance monitor 2387 continuously monitors thought generation activities to identify potential compliance violations during cognitive processing, implementing immediate corrective actions when compliance issues are detected. A post-process compliance validator 2388 performs final compliance verification before thought storage or response delivery, ensuring that all cognitive processing outputs comply with applicable regulatory requirements.

Compliance reporting system 2390 generates compliance documentation that supports internal compliance management and external regulatory reporting requirements through automated report generation and stakeholder communication capabilities. Automated compliance reports 2391 within compliance reporting system 2390 generate scheduled compliance reports that document regulatory adherence across enterprise cognitive processing activities. An executive dashboard generator 2392 creates executive-level compliance summaries that provide leadership visibility into enterprise compliance status and emerging compliance challenges. A regulatory filing system 2393 automates regulatory reporting requirements by generating and submitting required compliance reports to appropriate regulatory agencies. An incident response management 2394 coordinates compliance incident response including violation investigation, corrective action implementation, and stakeholder communication during compliance incidents.

In some implementations of an embodiment, one or more external compliance interfaces can be configured to provide integration capabilities with external compliance systems including regulatory agency portals, third-party compliance tools, legal counsel systems, and audit firm interfaces that support comprehensive compliance management beyond internal enterprise capabilities. For example, regulatory agency portals within external compliance interfaces integrate with government regulatory systems to submit required reports and receive regulatory updates. As another example, a plurality of third-party compliance tools can integrate with external compliance management systems that provide specialized compliance capabilities.

Legal counsel systems may integrate with external legal systems that support compliance consultation and legal advice during complex compliance situations. An audit firm interface integrates with external audit systems that support independent compliance verification and regulatory examination activities.

Through this compliance module integration architecture, persistent cognitive machines enable regulatory compliance that operates seamlessly during cognitive processing while maintaining the advanced cognitive capabilities established in foundational embodiments. The architecture ensures that enterprise deployment of persistent cognitive machines meets stringent regulatory requirements across diverse regulatory landscapes while enabling the cognitive innovation and operational efficiency that characterize persistent cognitive machine technology.

Figure 24:
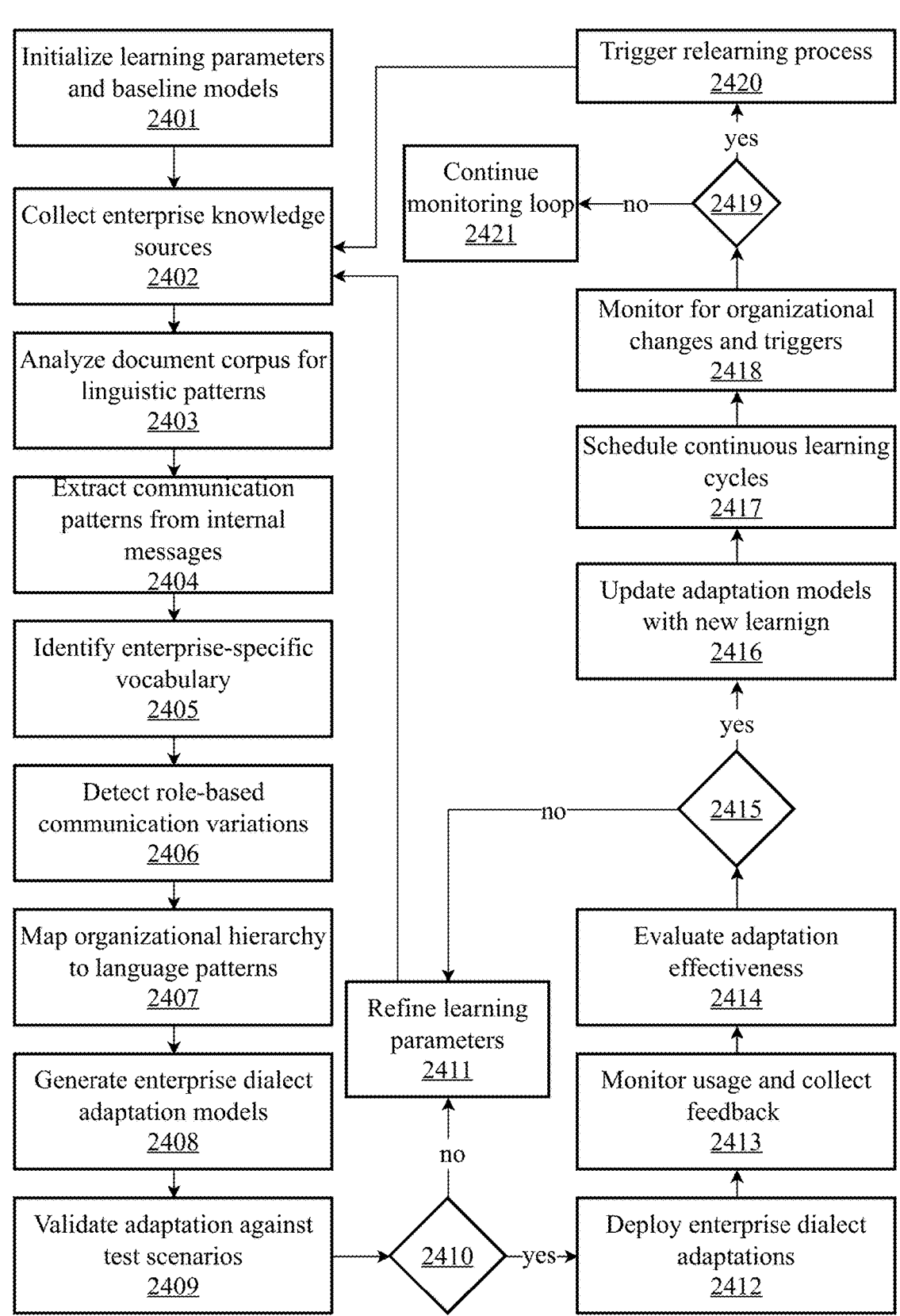
FIG. 24 is a flow diagram illustrating an exemplary method for enterprise dialect learning process within the supervisory network architecture, according to an embodiment.

FIG. 24 is a flow diagram illustrating an exemplary method for enterprise dialect learning process within the supervisory network architecture, according to an embodiment. The enterprise dialect learning process enables persistent cognitive machines to dynamically adapt their language processing capabilities to organization-specific communication patterns, terminology, and cultural norms through systematic analysis of enterprise knowledge sources and continuous refinement based on operational feedback.

The method may be applied to an enterprise which implements a hierarchical PCM architecture in one or more aspects of a business process or processes. The method requires initiation of the enterprise dialect learning system, which activates when deploying persistent cognitive machines within a new enterprise environment or when significant organizational changes require dialect adaptation updates. This initiation triggers comprehensive learning procedures that transform generic language model capabilities into enterprise-native communication processing that reflects organizational culture and communication patterns.

According to the embodiment, the process begins at step 2401, the system initializes learning parameters and baseline models that establish the foundation for enterprise dialect adaptation. This initialization process configures learning algorithms with enterprise-specific parameters including, but not limited to, organizational size, industry domain, geographic location, and preliminary cultural indicators that influence learning approach and adaptation targets. The system establishes baseline language models that serve as starting points for enterprise adaptation, capturing pre-existing language processing capabilities that will be enhanced through enterprise-specific learning. Learning parameters include adaptation sensitivity thresholds, validation criteria, feedback integration mechanisms, and continuous learning schedules that govern the enterprise dialect learning process. The initialization also establishes performance metrics and success criteria that will be used to evaluate adaptation effectiveness throughout the learning process.

Step 2402 implements comprehensive collection of enterprise knowledge sources that provide the raw material for dialect learning through systematic analysis of organizational communications, documents, and interaction patterns. This collection process encompasses multiple knowledge source categories including, but not limited to, corporate documents, internal communications, employee interactions, and historical organizational information that collectively represent the enterprise's communication ecosystem. Corporate documents may comprise policies, procedures, employee handbooks, organizational charts, and formal documentation that establish official enterprise terminology and communication standards. Internal communications may comprise email archives, collaboration platform messages, wiki content, and organizational announcements that reflect actual communication patterns and informal organizational culture. Employee interactions may comprise meeting transcripts, feedback sessions, survey responses, and collaborative interactions that provide insight into communication preferences and cultural norms within the organization.

At step 2403, the system analyzes the collected document corpus for linguistic patterns through natural language processing that identifies enterprise-specific communication characteristics. This analysis employs advanced pattern recognition algorithms that examine vocabulary usage, sentence structures, document organization patterns, and terminology preferences across different document types and organizational contexts. The system identifies recurring linguistic patterns including, but not limited to, preferred terminology, communication formality levels, technical language usage, and document structure conventions that characterize enterprise communication style. Document analysis can also reveal domain-specific language patterns that vary across different organizational functions, enabling the system to understand how communication patterns differ between departments while maintaining organizational consistency.

Step 2404 extracts communication patterns from internal messages through comprehensive analysis of enterprise communication flows that reveals actual communication behaviors and preferences beyond formal documentation. This extraction process may analyze email patterns, messaging platform interactions, collaboration tool usage, and other internal communication channels to identify authentic communication styles, interaction frequencies, and relationship dynamics within the organization. The system identifies communication pattern variations based on hierarchical relationships, departmental affiliations, project contexts, and temporal factors that influence how enterprise members communicate with each other.

Communication pattern extraction may also reveal informal communication conventions, cultural communication norms, and relationship-specific communication adaptations that characterize enterprise social dynamics.

In step 2405, the system identifies enterprise-specific vocabulary through systematic analysis of terminology usage patterns, acronym definitions, product-specific language, and domain-specific concepts that distinguish enterprise communication from generic language usage. This vocabulary identification process employs various disambiguation techniques that recognize when common words have enterprise-specific meanings, identify newly coined terms that emerge within the organizational context, and catalog industry-specific terminology that requires specialized understanding. The system builds comprehensive enterprise vocabulary databases that capture not only term definitions but also usage contexts, frequency patterns, and relationship mappings between related concepts within the enterprise domain.

Step 2406 detects role-based communication variations through analysis of communication patterns across different organizational positions, functional responsibilities, and hierarchical levels within the enterprise. This detection process identifies how communication style, formality, technical detail, and interaction patterns vary based on organizational role while maintaining consistency with overall enterprise culture. The system recognizes communication variations including executive communication patterns that emphasize strategic context and decision-making frameworks, technical communication that employs specialized terminology and detailed explanations, customer-facing communication that adapts to external stakeholder needs, and cross-functional communication that bridges different organizational domains. Role-based variation detection enables the system to adapt communication generation appropriately for different organizational contexts and recipient characteristics.

At step 2407, the system maps organizational hierarchy to language patterns through analysis of how communication adapts based on hierarchical relationships, authority structures, and reporting dynamics within the enterprise. This mapping process identifies communication formality adjustments, decision-making language patterns, escalation communication protocols, and authority-appropriate terminology usage that reflects organizational hierarchy. The system recognizes how communication flows up and down organizational hierarchies, identifying patterns for subordinate-to-supervisor communication, peer-to-peer interaction within hierarchy levels, and cross-hierarchy communication that maintains appropriate organizational respect and protocol. Hierarchy mapping also identifies delegation communication patterns, performance communication styles, and strategic communication approaches that vary based on organizational position and responsibility.

Step 2408 generates enterprise dialect adaptation models through synthesis of identified linguistic patterns, communication preferences, vocabulary usage, role variations, and hierarchical communication requirements into adaptation frameworks that can modify underlying language model behavior. This generation process creates specialized adaptation models including vocabulary substitution matrices that map generic terms to enterprise-specific terminology, communication style templates that adjust formality and tone based on organizational context, and role-specific adaptation frameworks that modify language generation based on user position and communication target. The adaptation models may implement complex context-awareness that enables dynamic language adaptation based on current communication context, recipient characteristics, and organizational situation.

At step 2409, the system validates adaptation models against test scenarios that evaluate adaptation effectiveness across diverse enterprise communication contexts and requirements. This validation process employs various test scenarios including, but not limited to, vocabulary accuracy tests that verify correct enterprise terminology usage, communication style tests that assess formality and tone appropriateness, and role appropriateness tests that evaluate hierarchy-sensitive communication adaptation. Validation testing may comprise both automated evaluation against established enterprise communication examples and expert review by enterprise stakeholders who can assess adaptation quality from organizational perspective. The validation process also tests adaptation robustness across edge cases and unusual communication scenarios to ensure reliable performance across diverse enterprise contexts.

At decision point 2410, the system evaluates whether validation results meet established acceptance criteria for enterprise dialect adaptation quality and effectiveness. If validation results are unacceptable, the process proceeds to step 2411 where the system refines learning parameters and retries the adaptation process with adjusted algorithms, modified learning thresholds, or expanded knowledge source analysis. This refinement process may involve collecting additional enterprise knowledge sources, adjusting pattern recognition sensitivity, or modifying adaptation model generation approaches based on validation feedback. The refined process returns to knowledge collection step 2402 to incorporate improvements and regenerate adaptation models with enhanced effectiveness.

If validation results are acceptable, the process advances to step 2412 where the system deploys enterprise dialect adaptations into operational persistent cognitive machines, integrating adaptation models with supervisory network architecture to enable dynamic language modification during cognitive processing. This deployment process may comprise integration testing that verifies adaptation compatibility with existing cognitive processing capabilities, performance optimization that ensures adaptation does not significantly impact cognitive processing efficiency, and rollback preparation that enables rapid adaptation reversal if operational issues arise.

In step 2413, the system monitors usage and collects feedback from enterprise users through systematic observation of adaptation effectiveness during actual enterprise operations.

This monitoring process tracks adaptation usage patterns, user satisfaction indicators, communication effectiveness measures, and any issues or limitations identified during operational deployment. Feedback collection includes both explicit user feedback through surveys and interviews and implicit feedback through usage pattern analysis and communication outcome assessment. The monitoring system tracks adaptation performance across different user types, communication contexts, and organizational scenarios to build comprehensive understanding of adaptation effectiveness in operational environments.

Step 2414 evaluates adaptation effectiveness through analysis of collected feedback and usage data against established performance targets for enterprise dialect adaptation. This evaluation process may assess adaptation accuracy, user satisfaction, communication improvement, and organizational integration success across multiple evaluation dimensions. The system analyzes trends in adaptation performance, identifies areas of strong adaptation success, and recognizes aspects requiring improvement or refinement. Performance evaluation also considers adaptation impact on cognitive processing efficiency and overall persistent cognitive machine effectiveness within the enterprise context.

At decision point 2415, the system determines whether adaptation performance meets established targets for enterprise dialect effectiveness and user satisfaction. If performance targets are not met, the process returns to step 2411 for learning parameter refinement and adaptation model regeneration based on operational feedback and performance analysis. This iterative improvement process ensures that enterprise dialect adaptation continuously evolves toward optimal effectiveness through systematic learning and refinement.

If performance targets are met, the process proceeds to step 2416 where the system updates adaptation models with new learning accumulated through operational experience and user feedback. This update process can incorporate successful adaptation patterns, addresses identified limitations, and enhances adaptation models based on expanded understanding of enterprise communication requirements. Model updates maintain adaptation effectiveness while incorporating continuous learning that reflects evolving organizational communication patterns and emerging enterprise dialect characteristics.

In step 2417, the system schedules continuous learning cycles that maintain adaptation currency through ongoing analysis of enterprise communication evolution and organizational change. This scheduling process establishes regular adaptation review cycles, performance assessment intervals, and knowledge source update procedures that ensure enterprise dialect adaptation remains current and effective over time. Continuous learning cycles adapt to organizational change velocity, with more frequent updates for rapidly evolving enterprises and stable update schedules for organizations with consistent communication patterns.

Step 2418 monitors for organizational changes and triggers that indicate need for comprehensive adaptation updates including, for example, major organizational restructuring, culture change initiatives, merger or acquisition activities, or significant operational changes that affect enterprise communication patterns. This monitoring process employs automated change detection algorithms that analyze communication pattern shifts, organizational announcement impacts, and usage pattern variations that suggest adaptation updates are needed. The system maintains awareness of both gradual communication evolution and sudden organizational changes that require different adaptation response strategies.

At decision point 2419, the system evaluates whether detected organizational changes are significant enough to warrant comprehensive re-learning of enterprise dialect adaptation. If significant changes are detected, the process proceeds to step 2420 where comprehensive re-learning is triggered, returning to knowledge collection phase 2402 to rebuild adaptation models based on current organizational characteristics. This re-learning process ensures that enterprise dialect adaptation remains aligned with evolving organizational communication patterns and cultural characteristics.

If no significant changes are detected, the process continues to step 2421 with ongoing monitoring loops that maintain continuous surveillance of enterprise communication patterns while preserving current adaptation effectiveness. This monitoring continuation ensures that the system remains responsive to organizational changes while avoiding unnecessary adaptation disruption during stable periods.

The process concludes with establishment of continuous learning loop activity that maintains ongoing enterprise dialect adaptation through systematic monitoring, feedback integration, and adaptive refinement that ensures persistent cognitive machines maintain optimal communication alignment with enterprise characteristics throughout operational deployment.

Through this comprehensive enterprise dialect learning process, persistent cognitive machines enable improved linguistic and cultural adaptation that transforms generic language processing capabilities into enterprise-native communication processing that reflects organizational culture, communication patterns, and contextual requirements while maintaining the advanced cognitive capabilities established in foundational embodiments.

FIGS. 25A, 25B, and 25C provide a flow diagram illustrating an exemplary method for enterprise hierarchical thought routing process that manages information flow through organizational structure based on authority levels, sensitivity classification, and routing protocols. The enterprise hierarchical thought routing process enables persistent cognitive machines to navigate complex organizational hierarchies while respecting authority boundaries, information sensitivity requirements, and appropriate escalation procedures that characterize enterprise decision-making and information management.

According to an embodiment, the process begins at step 2500 with initiation of user prompt or thought entry into the enterprise system, which activates when any enterprise user submits a request, query, or cognitive processing task to the enterprise hierarchical PCM architecture. This initiation captures not only the content of the user request but also contextual metadata including, but not limited to, user identity, organizational position, access credentials, and interaction context that will inform subsequent routing decisions. The system maintains comprehensive awareness of the enterprise organizational structure and user positioning that enables intelligent routing based on authority levels and information sensitivity requirements.

In step 2501, the system identifies user role and organizational position through analysis of user credentials, organizational directory information, and current role assignments within the enterprise hierarchy. This identification process extends beyond simple user authentication to encompass detailed understanding of organizational position including reporting relationships, functional responsibilities, cross-functional authority, project assignments, and temporary role delegations that may affect appropriate information access and processing authority. The system maintains dynamic organizational models that reflect current enterprise structure including recent organizational changes, temporary assignments, and evolving reporting relationships that influence routing decisions. User role identification also considers historical interaction patterns and established trust relationships that may expand or constrain appropriate routing paths based on demonstrated competency and reliability.

Step 2502 implements classification of prompt or thought sensitivity and required authority level through analysis of content characteristics, information sensitivity indicators, and organizational impact potential. This classification process can employ one or more advanced content analysis algorithms that identify sensitive information categories including personally identifiable information, financial data, strategic planning information, competitive intelligence, and other content types requiring specialized handling within enterprise environments. The sensitivity classification system maintains comprehensive taxonomies of information sensitivity levels ranging from public information requiring no special handling to highly restricted content requiring executive-level authorization for access or processing. Authority level determination considers both information sensitivity and potential organizational impact, recognizing that certain decisions or information processing activities require specific organizational authority regardless of information sensitivity classification.

At step 2503, the system determines primary domain responsibility through analysis of prompt content, organizational function alignment, and specialized expertise requirements. This determination process identifies which functional PCM within the enterprise hierarchy possesses the specialized knowledge, regulatory authority, and operational responsibility most appropriate for processing the current request. Primary domain determination considers content subject matter, required expertise domains, regulatory compliance requirements, and organizational ownership of related decisions or processes. The system maintains sophisticated domain mapping capabilities that recognize when prompts span multiple functional areas while identifying the primary domain that should coordinate response generation and assume overall responsibility for accuracy and appropriateness.

At decision point 2504, the system evaluates whether the user possesses sufficient authority for direct processing of the identified prompt based on organizational hierarchy, information sensitivity classification, and established authority delegation patterns. This authority evaluation considers multiple factors including, but not limited to, user's position within organizational hierarchy, specific authority delegations related to prompt subject matter, information sensitivity level relative to user clearance, and historical precedent for similar requests from users in comparable positions. The authority evaluation process also considers temporary authority assignments, project-specific permissions, and emergency authorization protocols that may expand normal authority boundaries under specific circumstances.

If the user has appropriate authority for direct processing, the process proceeds to step 2505 where the request routes to the appropriate domain PCM for processing using standard domain-specific processing capabilities. This routing leverages the federated cognitive architecture described in various embodiments herein while incorporating enterprise hierarchy awareness that ensures domain processing respects organizational context and authority boundaries. Direct routing to domain PCM enables efficient processing for requests that align with established organizational authority patterns while maintaining appropriate oversight and audit capabilities.

If the user lacks sufficient authority for direct processing, the process escalates to step 2506 where the request routes to supervisory level for authorization review. This escalation process identifies the appropriate supervisory authority based on organizational hierarchy, subject matter expertise, and authorization requirements specific to the prompt content and sensitivity classification. Escalation routing may consider both direct reporting relationships and functional authority structures, recognizing that appropriate authorization may come from functional supervisors rather than direct reporting supervisors depending on prompt subject matter and organizational structure.

In step 2507, the supervisor reviews the escalated request and makes authorization decisions including approval for processing, modification of request scope or parameters, or denial based on policy, authority, or appropriateness considerations. This supervisory review process incorporates sophisticated decision support that provides supervisors with relevant context including user history, organizational policy alignment, potential impact assessment, and related precedent decisions that inform authorization choices. Supervisory review may also involve consultation with other organizational stakeholders or subject matter experts when authorization decisions require specialized knowledge or cross-functional coordination.

At decision point 2508, the system evaluates whether the supervisory review resulted in request approval, conditional approval with modifications, or denial based on organizational policy or authority considerations. This evaluation captures not only the binary approval decision but also any modifications, constraints, or additional requirements specified by supervisory review that must be incorporated into subsequent processing activities.

If the request is denied, the process proceeds to step 2510 where denial explanation returns to the original user with appropriate justification based on organizational policy, authority limitations, or other factors that prevented request approval. This denial communication maintains professional organizational communication standards while providing sufficient explanation to enable user understanding of denial rationale and potential alternative approaches for addressing their information or decision support needs. The process then ends 2511 with the request denied.

If the request is approved, either with or without modifications, the process proceeds to step 2509 where the approved request routes to the appropriate domain PCM for processing. This routing incorporates any modifications or constraints specified during supervisory review while maintaining awareness of the authorization path that enabled processing. The routing process also establishes appropriate audit trail documentation that captures authorization decisions and supervisory involvement for compliance and organizational learning purposes.

In step 2512, the domain PCM processes the request using domain-specific cognitive capabilities while incorporating enterprise context and organizational hierarchy awareness. This processing extends standard domain PCM capabilities with enhanced organizational context including hierarchy relationships, cross-functional dependencies, organizational culture considerations, and enterprise-specific constraints that influence appropriate response generation. Domain processing also incorporates authorization context from the routing process, ensuring that responses reflect appropriate organizational authority levels and respect any constraints or modifications specified during authorization review.

Referring now to FIG. 25B, step 2513 determines whether cross-domain insights are required to provide comprehensive response to the user request through analysis of prompt complexity, subject matter overlap, and potential benefit from additional functional perspectives. This determination considers whether the primary domain possesses sufficient expertise and information to generate complete and accurate responses or whether consultation with other functional PCMs would enhance response quality and organizational value. Cross-domain determination also considers organizational efficiency factors, balancing comprehensive response quality against resource utilization and response time requirements.

At decision point 2514, the system evaluates whether cross-domain consultation would provide sufficient value to justify additional resource utilization and coordination complexity. This evaluation considers factors including, but not limited to, response criticality, available expertise in other domains, potential for conflicting perspectives, and user expectations for response comprehensiveness and timing.

If cross-domain consultation is not needed, the process proceeds to step 2515 where the domain PCM generates a domain-specific response using its specialized knowledge and capabilities. This response generation incorporates enterprise context and organizational hierarchy awareness while maintaining domain expertise focus and efficiency.

If cross-domain consultation is needed, the process proceeds to step 2516 where coordination with relevant domain PCMs provides additional insights through controlled cross-domain knowledge sharing protocols. This coordination process leverages the federated cognitive architecture while maintaining appropriate domain boundaries and organizational information sharing protocols. Cross-domain coordination may involve multiple domain PCMs providing specialized perspectives, comparative analysis, and/or complementary expertise that enhances overall response quality and organizational value.

In step 2517, the system synthesizes cross-domain insights with the primary domain response through sophisticated integration processes that maintain response coherence while incorporating diverse perspectives and expertise. This synthesis process resolves potential conflicts between domain perspectives, prioritizes insights based on organizational authority and expertise relevance, and creates unified responses that reflect coordinated organizational intelligence rather than fragmented domain-specific outputs.

Step 2518 checks whether the generated response requires higher authority review based on response content, organizational impact potential, policy implications, or strategic significance that may necessitate executive-level oversight. This review requirement determination may consider factors including, but not limited to, response sensitivity, potential organizational commitment implied by response content, policy precedent establishment, and strategic alignment with enterprise objectives that may require executive validation or modification.

At decision point 2519, the system evaluates whether escalation to higher authority is required based on response characteristics and organizational protocols for executive oversight. This evaluation balances organizational efficiency with appropriate executive involvement in decisions or communications that carry significant organizational implications or establish important precedents for future activities.

If escalation to higher authority is not required, the process proceeds to step 2521 where role-based filtering and formatting ensure that response presentation aligns with user organizational position, communication preferences, and appropriate information access levels. This filtering process may modify response detail level, technical complexity, strategic context, or other presentation characteristics to match user role and organizational communication standards.

If escalation to higher authority is required, the process proceeds to step 2520 where the response routes to CEO-PCM for strategic review. This escalation engages the enterprise-level cognitive capabilities established in previous embodiments while ensuring that strategic organizational perspectives inform final response delivery.

In step 2522, the CEO-PCM evaluates strategic implications of the proposed response through comprehensive analysis of organizational impact, strategic alignment, policy consistency, and broader enterprise considerations that may not be apparent at functional domain levels. This strategic evaluation incorporates enterprise-wide context including competitive considerations, regulatory implications, stakeholder impact, and long-term strategic alignment that influence appropriate response content and presentation.

Step 2523 implements CEO-PCM review decisions including approval of the proposed response, modification to enhance strategic alignment or organizational appropriateness, or supplementation with additional strategic context that enhances response value for both immediate user needs and broader organizational objectives. CEO-PCM review may also involve escalation to human executive oversight when responses carry exceptional strategic significance or establish important organizational precedents requiring human executive judgment.

Referring now to FIG. 25C, at step 2524, the system logs the complete routing decision chain for audit purposes and organizational learning, creating comprehensive documentation of authority evaluations, escalation decisions, cross-domain coordination activities, and strategic review processes that informed final response delivery. This audit trail supports both compliance requirements and continuous improvement of enterprise hierarchical routing effectiveness through analysis of routing patterns and outcomes.

Step 2525 delivers the final response to the original user through appropriate communication channels and formatting that reflects organizational hierarchy and communication standards. Response delivery incorporates any role-based filtering or formatting specified during the routing process while maintaining response quality and usefulness for the requesting user.

In step 2526, the system updates user authority and access patterns based on successful completion of the request processing cycle, incorporating learning about user competency, authority exercise, and organizational value contribution that may inform future routing decisions. This update process enhances the system's understanding of organizational dynamics while maintaining appropriate authority boundaries and escalation protocols.

Step 2527 stores enhanced organizational learning in hierarchy models through analysis of routing effectiveness, authority evaluation accuracy, cross-domain coordination success, and strategic review outcomes that contribute to continuous improvement of enterprise hierarchical routing capabilities. This learning storage enables the system to evolve its understanding of organizational hierarchy while maintaining appropriate respect for authority structures and information sensitivity requirements.

The process concludes with completion of response delivery and capture of organizational learning that enhances future enterprise hierarchical routing effectiveness while maintaining comprehensive audit documentation and system evolution capabilities.

FIGS. 26A, 26B, and 26C provide a flow diagram illustrating an exemplary method for cross-functional knowledge synthesis process that enables CEO-PCM to integrate insights from multiple departmental PCMs into enterprise-wide strategic intelligence. The cross-functional knowledge synthesis process enables the enterprise hierarchical PCM architecture to systematically collect, analyze, and synthesize knowledge across functional domains to generate strategic insights that would be impossible to achieve through isolated departmental analysis.

According to an embodiment, the process begins at step 2600 with initiation of a strategic query or analysis request that requires cross-functional knowledge integration to provide enterprise-level insights. This initiation typically involves complex strategic questions that span multiple organizational domains, require enterprise-wide perspective, or demand synthesis of diverse functional expertise to support executive decision-making. Strategic queries may originate from executive leadership seeking comprehensive analysis for strategic planning, board-level inquiries requiring enterprise-wide assessment, crisis situations demanding coordinated organizational response, or emerging opportunities requiring multi-domain evaluation for strategic positioning.

In step 2601, the CEO-PCM receives the multi-domain strategic request and initiates comprehensive analysis procedures that extend beyond single-domain processing capabilities. This reception process may involve complex request analysis that identifies the strategic nature of the inquiry, recognizes the multi-domain expertise requirements, and activates specialized cross-functional synthesis capabilities within the CEO-PCM architecture. The CEO-PCM maintains enhanced strategic context awareness that enables recognition of requests requiring enterprise-wide knowledge integration versus those that can be addressed through standard domain-specific processing.

Step 2602 implements analysis of the request for functional domain requirements through examination of the strategic query to identify which organizational functions possess relevant expertise, information, or decision-making authority necessary for comprehensive response generation. This analysis process may employ one or more domain mapping algorithms that recognize explicit domain references within the request content as well as implicit domain relevance based on subject matter expertise, regulatory authority, operational responsibility, and strategic impact considerations. According to an aspect, the analysis also considers temporal factors, recognizing that certain strategic questions may require different domain involvement based on current organizational priorities, ongoing projects, or emerging business conditions.

At step 2603, the system identifies relevant functional PCMs required for comprehensive knowledge synthesis through systematic evaluation of domain expertise needs, information availability, and strategic relevance to the current request. This identification process considers multiple factors including, but not limited to primary domain responsibility for request subject matter, secondary domains with complementary expertise or stakeholder perspectives, regulatory domains with compliance or oversight requirements, and support domains with operational or resource implications. In some implementations, the identification process also considers domain interdependencies, recognizing that certain combinations of functional expertise may generate synergistic insights that exceed the sum of individual domain contributions.

Step 2604 determines knowledge collection strategy through analysis of request complexity, domain relationships, available resources, and response timing requirements. This strategic determination may consider whether domain consultation should proceed sequentially to build upon progressive insights or in parallel to maximize efficiency and comprehensive coverage. The strategy determination also considers potential domain conflicts, information sensitivity requirements, resource availability, and coordination complexity that may influence optimal collection approaches. Knowledge collection strategy may also incorporate prioritization schemes that ensure critical domain expertise receives appropriate attention while managing overall synthesis complexity and resource utilization.

At decision point 2605, the system evaluates whether sequential or parallel knowledge collection provides optimal effectiveness for the current strategic request based on domain interdependencies, timing requirements, and synthesis complexity considerations. Sequential collection offers advantages including progressive context building, reduced coordination complexity, and ability to incorporate insights from earlier domains into subsequent domain queries. Parallel collection provides benefits including reduced total processing time, comprehensive domain coverage, and avoidance of potential bias from sequential ordering effects.

If sequential collection is selected, the process proceeds to step 2606 which implements sequential knowledge collection through systematically querying functional PCMs in priority order while building cumulative context and insights. In step 2607, the system queries the first priority domain PCM for initial insights using the original strategic request supplemented with relevant context and specific questions tailored to domain expertise. This initial query establishes baseline understanding and identifies key themes that will inform subsequent domain consultations.

Step 2608 analyzes the initial domain response for additional requirements, emerging themes, potential conflicts, and supplementary questions that should be addressed through consultation with additional functional domains. This analysis identifies knowledge gaps, areas requiring specialized expertise, potential implementation challenges, and strategic considerations that were not fully addressed by the initial domain response.

At decision point 2609, the system evaluates whether additional domains are needed to provide comprehensive strategic analysis based on knowledge gaps identified during initial response analysis. If additional domains are required, the process proceeds to step 2610 where the next priority domain PCM is queried with context from previous responses, enabling progressive knowledge building and synthesis. This iterative process continues until all necessary domain expertise has been incorporated into the knowledge synthesis process.

If parallel collection is selected, the process proceeds to step 2620 which implements parallel knowledge collection by simultaneously querying all identified functional PCMs. At step 2621, the system simultaneously queries all identified domain PCMs using customized requests tailored to each domain's expertise while maintaining consistency in strategic context and overall synthesis objectives. This parallel approach enables comprehensive domain coverage while minimizing total processing time.

Step 2622 collects all domain responses and insights from the parallel query process, creating a knowledge repository that comprises diverse functional perspectives, specialized expertise, and domain-specific recommendations relevant to the strategic request. This collection process maintains response attribution and domain context that will be essential for subsequent synthesis and conflict resolution activities.

Referring now to FIG. 26B, at step 2623, the system analyzes the complete response set for conflicts and contradictions between different domain perspectives, recommendations, or factual assessments. This analysis may employ one or more conflict detection algorithms that identify explicit disagreements between domains as well as subtle inconsistencies in assumptions, priorities, or implementation approaches that may create challenges for unified strategic response generation.

At decision point 2624, the system evaluates whether significant conflicts have been detected that require formal resolution procedures before proceeding with knowledge synthesis. If conflicts are detected, the process proceeds to step 2625 which initiates conflict resolution procedures designed to address disagreements while preserving valuable insights from all contributing domains.

Step 2626 identifies conflict categories and severity levels through systematic analysis of disagreement types, potential impact on strategic decisions, and resolution complexity requirements. Conflict categorization may include, but is not limited to, factual disagreements requiring additional research, methodological differences in analysis approaches, priority conflicts reflecting different departmental perspectives, resource allocation disagreements, or strategic philosophy differences requiring executive arbitration.

At step 2627, the system requests clarification from conflicting domain PCMs through targeted follow-up queries designed to better understand the basis for disagreements, explore potential compromise positions, and gather additional information that may resolve conflicts through enhanced understanding rather than executive arbitration. This clarification process provides domains with opportunity to refine their positions while contributing to overall conflict resolution effectiveness.

Step 2628 applies enterprise priority framework to remaining conflicts through systematic application of organizational hierarchy, strategic objectives, regulatory requirements, and resource constraints that provide objective basis for conflict resolution decisions. This framework implements established organizational decision-making principles that prioritize regulatory compliance, strategic alignment, financial impact, and operational feasibility in hierarchical order.

At step 2629, the system generates a conflict resolution strategy that addresses identified disagreements through combination of priority framework application, compromise position development, and strategic trade-off analysis that enables unified response generation while acknowledging domain concerns. Resolution strategies may include phased implementation approaches, conditional recommendations, or alternative strategic options that accommodate different domain perspectives.

Step 2630 validates the proposed conflict resolution with affected domain PCMs through consultation process that ensures resolution approaches are factually accurate, operationally feasible, and acceptable to contributing domains. This validation process may result in resolution refinement or alternative approach development based on domain feedback and practical implementation considerations.

If no conflicts are detected or after successful conflict resolution, the process proceeds to step 2640 which integrates domain knowledge using enterprise strategic framework. This integration process synthesizes functional domain insights into comprehensive strategic intelligence that reflects enterprise-wide perspective while preserving valuable specialized expertise from contributing domains.

Referring now to FIG. 26C, at step 2641, the system weights domain contributions by strategic relevance to ensure that insights most critical to strategic decision-making receive appropriate emphasis in final synthesis while maintaining balanced consideration of all relevant functional perspectives. Weighting considerations may include, but are not limited to, strategic impact potential, domain expertise authority, regulatory significance, and organizational priority alignment.

Step 2642 identifies cross-domain patterns and correlations through analysis of domain responses that reveals strategic insights emerging from functional interdependencies, shared challenges, complementary capabilities, or systemic organizational factors that transcend individual domain boundaries. Pattern identification may reveal strategic opportunities, systemic risks, resource optimization possibilities, or competitive advantages that become apparent only through cross-functional analysis.

In step 2643, the system generates strategic insights from pattern analysis by synthesizing cross-domain correlations into actionable strategic intelligence that provides enterprise leadership with comprehensive understanding of strategic implications, implementation requirements, and organizational considerations relevant to the original strategic request. These insights represent value-added analysis that exceeds simple aggregation of domain responses.

Step 2644 synthesizes enterprise-wide strategic intelligence through integration of domain knowledge, cross-functional patterns, conflict resolutions, and strategic insights into unified strategic assessment that provides CEO-PCM with complete foundation for executive-level response generation. This synthesis represents the culmination of cross-functional knowledge integration that transforms diverse functional expertise into cohesive strategic intelligence.

In step 2645, the system validates synthesis against enterprise objectives through systematic assessment of strategic intelligence alignment with organizational mission, strategic plans, competitive positioning, and stakeholder expectations. This validation ensures that synthesized intelligence supports rather than conflicts with established enterprise direction and priorities.

At decision point 2646, the system evaluates whether the knowledge synthesis meets established quality standards for strategic intelligence including, but not limited to, comprehensiveness, accuracy, strategic relevance, and actionable insight generation. If quality standards are not met, the process proceeds to step 2647 where synthesis refinement and retry procedures address identified deficiencies through enhanced domain consultation, improved conflict resolution, or alternative synthesis approaches.

If quality standards are met, the process proceeds to step 2648 where the CEO-PCM generates executive strategic response that incorporates synthesized intelligence while reflecting appropriate executive-level perspective, strategic context, and decision-making authority. This response generation represents the culmination of cross-functional knowledge synthesis that transforms organizational expertise into strategic leadership intelligence.

Step 2649 documents the complete knowledge synthesis process and results for organizational learning, audit compliance, and future synthesis improvement. This documentation may capture synthesis methodology, domain contributions, conflict resolution approaches, and strategic insights that contribute to continuous improvement of enterprise knowledge synthesis capabilities.

At step 2650, the system updates the enterprise strategic knowledge base with insights generated through cross-functional synthesis, creating persistent organizational intelligence that enhances future strategic analysis and decision-making capabilities. This knowledge base update ensures that valuable strategic insights are preserved and accessible for future enterprise leadership needs.

Step 2651 stores learning for future cross-functional synthesis through analysis of synthesis effectiveness, domain contribution quality, conflict resolution success, and strategic insight value that inform continuous improvement of enterprise knowledge synthesis capabilities.

This learning storage enables progressive enhancement of cross-functional synthesis effectiveness while building organizational expertise in strategic knowledge integration.

The process concludes with completion of strategic intelligence delivery that provides enterprise leadership with comprehensive, synthesized understanding of strategic implications based on integrated functional domain expertise and cross-domain analysis.

FIG. 27 is a flow diagram illustrating an exemplary method for an organizational change adaptation process that enables enterprise PCM systems to dynamically reconfigure when organizational structure, hierarchy, or functional responsibilities undergo modification. The organizational change adaptation provides a critical capability for enterprise deployment of persistent cognitive machines, ensuring that cognitive architectures can adapt seamlessly to evolving organizational requirements while preserving accumulated knowledge, maintaining operational continuity, and respecting new authority structures and compliance obligations.

According to an embodiment, the process begins at step 2700 with detection of organizational change events through monitoring of enterprise information sources including, but not limited to, organizational announcements, human resources communications, executive directives, regulatory filings, and system access pattern changes that indicate structural modifications. Change detection may employ pattern recognition algorithms that identify both explicit change announcements and implicit indicators such as shifting communication patterns, altered meeting structures, modified document access requirements, or evolving approval workflows that suggest organizational transformation. The detection system maintains awareness of various change categories including personnel changes affecting individual roles or positions, departmental reorganizations impacting functional structures, structural reorganizations spanning multiple organizational areas, merger and acquisition activities requiring enterprise-wide integration, and regulatory changes necessitating compliance framework modifications.

In step 2701, the system implements comprehensive assessment of change impact and requirements through systematic analysis of organizational change scope, affected functional areas, knowledge redistribution needs, and PCM adaptation requirements. This assessment process may employ change classification algorithms that categorize changes by type, scope, and impact level to determine appropriate adaptation responses. Personnel changes typically require individual user profile updates and access reconfiguration while maintaining existing domain structures. Departmental reorganizations necessitate domain PCM adjustments and knowledge redistribution within affected functional areas. Structural reorganizations demand hierarchy restructuring and multi-domain knowledge migration across organizational boundaries. Merger and acquisition activities require complete architecture redesign and integration capabilities.

Regulatory changes mandate compliance module reconfiguration and policy enforcement updates. The assessment process also evaluates change urgency, implementation timelines, stakeholder impact, and resource requirements necessary for successful PCM adaptation.

At decision point 2702, the system evaluates whether detected organizational changes require PCM adaptation based on impact assessment results, change scope evaluation, and architectural modification requirements. This evaluation considers factors including structural hierarchy modifications, functional responsibility changes, knowledge ownership transfers, compliance requirement updates, and user access pattern alterations that necessitate PCM system reconfiguration. Changes requiring no PCM adaptation, such as minor personnel adjustments or cosmetic organizational updates, proceed to step 2704 where change events are logged for historical tracking while normal operations continue with enhanced monitoring for secondary effects.

If PCM adaptation is required, the process proceeds to step 2703 where the system enters safe mode operation and creates comprehensive adaptation plans. Safe mode implementation preserves current system state through comprehensive backup procedures, maintains user access continuity during transition periods, implements read-only access to critical knowledge during restructuring, and establishes rollback capabilities for adaptation failure recovery. Adaptation planning involves detailed analysis of required architectural modifications, knowledge migration strategies, user impact assessments, compliance mapping updates, timeline development with dependency management, resource allocation for adaptation activities, risk assessment and mitigation strategies, and stakeholder communication protocols. The adaptation plan incorporates change implementation phases including preparation activities, structural modifications, knowledge migration procedures, validation testing protocols, gradual restoration processes, and performance optimization requirements.

Step 2705 implements PCM architecture and hierarchy restructuring through systematic modification of enterprise cognitive architecture to align with new organizational structure. Hierarchy restructuring involves comprehensive analysis of new organizational charts and reporting relationships, modification of CEO-PCM oversight structures to reflect executive changes, creation of new domain PCM instances for emerging functional areas, modification of existing domain PCMs for expanded or contracted responsibilities, merger of domain PCMs when functions are consolidated, and establishment of new cross-functional coordination mechanisms. Architecture restructuring also includes updating federated cognitive orchestrator configurations to reflect new domain relationships, modifying enterprise thought cache hierarchy to accommodate organizational changes, reconfiguring cross-domain integration frameworks for altered functional boundaries, and updating hierarchical sleep management coordination across modified domain structures. Throughout restructuring processes, the system maintains detailed change logs, preserves critical knowledge relationships, implements appropriate access controls, and ensures compliance with regulatory requirements.

In step 2706, the system executes knowledge migration and redistribution processes that transfer accumulated cognitive assets to appropriate new organizational homes while preserving knowledge integrity and maintaining access continuity. Knowledge migration begins with comprehensive identification of knowledge affected by organizational reorganization including domain-specific expertise repositories, cross-functional insights and patterns, historical decision contexts and precedents, user interaction histories and preferences, compliance documentation and audit trails, and strategic intelligence accumulated through CEO-PCM operations.

Knowledge classification processes determine new domain ownership based on functional responsibility transfers, regulatory authority changes, operational process modifications, and strategic oversight requirements. Knowledge conflicts arise when multiple domains claim ownership of specific knowledge assets, requiring resolution through organizational priority frameworks that prioritize regulatory compliance requirements, strategic enterprise objectives, financial impact considerations, operational feasibility constraints, and domain expertise authority. Knowledge distribution planning addresses gradual migration timelines, access continuity during transitions, historical context preservation, cross-domain sharing protocols, and validation procedures ensuring migration accuracy.

Step 2707 implements comprehensive validation and testing of adapted PCM systems through systematic verification that organizational changes have been correctly implemented within cognitive architecture. Validation testing may comprise hierarchy routing verification ensuring correct information flow through new organizational structures, authority validation confirming appropriate access controls and escalation pathways, knowledge access testing validating accurate retrieval from reorganized domain assignments, compliance validation verifying regulatory requirement mapping to new structures, user experience testing confirming response quality and organizational appropriateness, and performance validation ensuring response times and resource utilization remain within acceptable parameters. Testing protocols include, but are not limited to, automated validation scenarios simulating typical organizational interactions, manual verification procedures involving stakeholder review of adaptation accuracy, stress testing under high-load conditions to verify stability, edge case testing for unusual organizational scenarios, and rollback testing to ensure recovery capabilities function correctly.

At decision point 2708, the system evaluates whether validation testing demonstrates successful adaptation based on assessment of functionality, accuracy, performance, and user experience criteria. Validation success requires correct hierarchy navigation, accurate knowledge access, appropriate compliance enforcement, satisfactory user experience, stable system performance, and successful integration testing across all modified components. If validation fails, the process proceeds to step 2710 where diagnostic procedures identify configuration issues, access control problems, knowledge migration errors, compliance mapping failures, or performance bottlenecks that prevent successful adaptation. Corrective measures may include configuration adjustments, knowledge redistribution modifications, access control updates, compliance framework corrections, or architectural refinements to address identified issues. The system implements retry procedures with maximum attempt limits to prevent infinite correction loops, escalating to manual administrator intervention when automated correction procedures cannot resolve adaptation issues.

If validation succeeds, the process proceeds to step 2709 where gradual restoration to full operational mode occurs through phased transition procedures that minimize user disruption while ensuring system stability. Gradual restoration involves systematic activation of adapted system components, progressive expansion of user access to modified functionality, incremental performance optimization based on operational feedback, continuous monitoring of adaptation effectiveness, and immediate response capabilities for emerging issues. During restoration, the system maintains enhanced monitoring of user feedback, system performance metrics, knowledge access patterns, compliance adherence, and cross-domain coordination effectiveness to identify optimization opportunities and address any remaining adaptation concerns.

In step 2711, the system documents comprehensive adaptation processes and stores accumulated learning for future organizational change management. Documentation encompasses detailed change impact analysis, adaptation strategy effectiveness assessment, knowledge migration success metrics, validation testing results, performance optimization outcomes, user feedback integration, and lessons learned for improving future adaptation procedures. Learning storage includes pattern recognition for change types and optimal adaptation responses, best practices for knowledge migration and conflict resolution, effective testing strategies for different organizational change scenarios, performance optimization techniques for adapted architectures, and stakeholder communication approaches that enhance adaptation acceptance and effectiveness. This accumulated learning enhances enterprise PCM systems' ability to adapt to future organizational changes with greater efficiency, accuracy, and minimal disruption to ongoing operations.

The process concludes with completion of organizational change adaptation, returning the enterprise PCM system to normal monitoring and operational status while maintaining enhanced change detection capabilities informed by recent adaptation experience.

Through this comprehensive organizational change adaptation process, enterprise PCM systems support organizational intelligence that enables seamless adaptation to evolving enterprise structures while preserving accumulated knowledge, maintaining operational continuity, and ensuring appropriate alignment with new organizational hierarchy, functional responsibilities, and compliance requirements.

Figure 1:
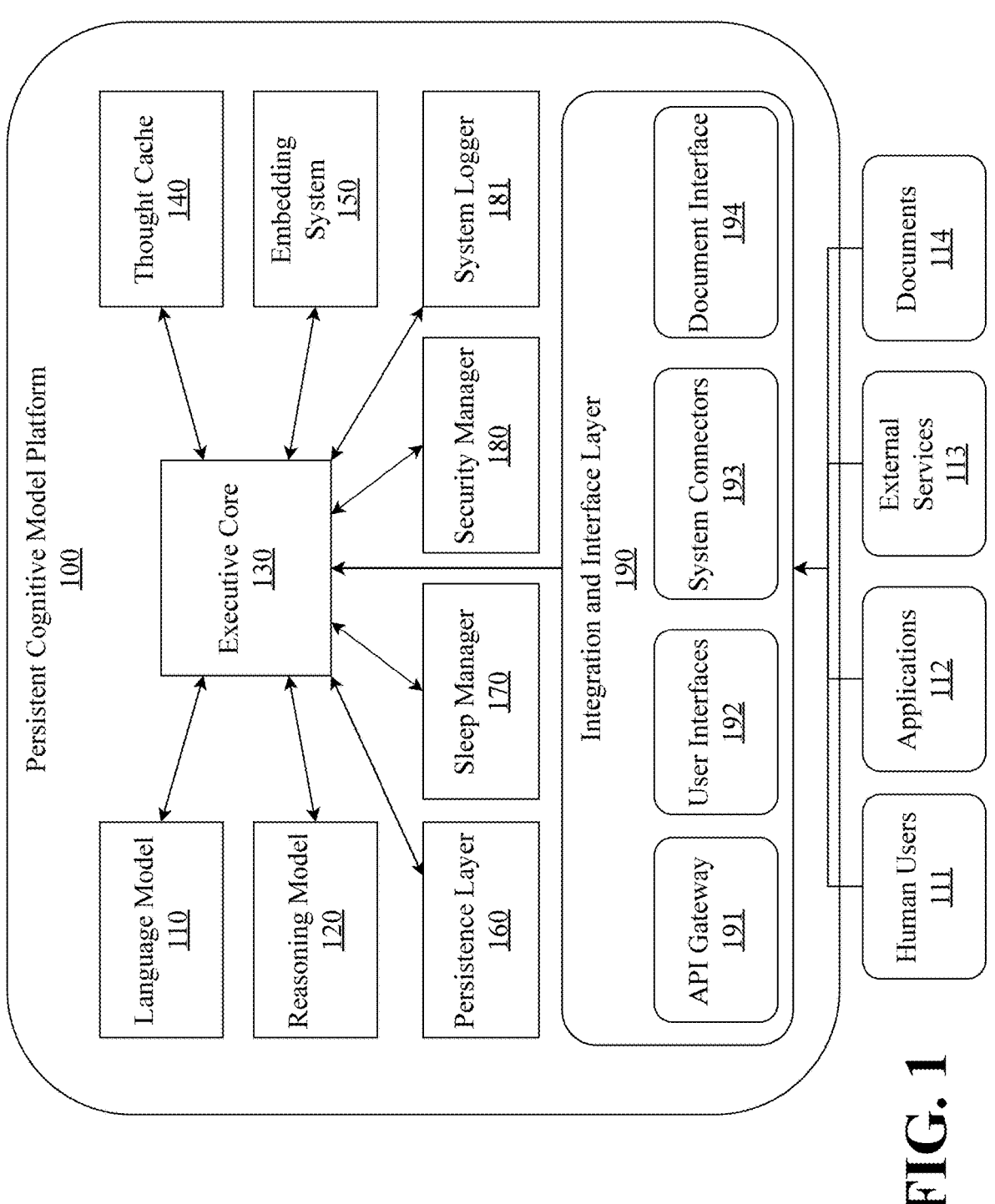
FIG. 1 is a block diagram illustrating the architecture of a persistent cognitive machine platform.

FIG. 1 is a block diagram illustrating the architecture of a persistent cognitive machine platform. The persistent cognitive machine platform 100 represents a fundamental advancement beyond traditional artificial intelligence systems by implementing persistent cognitive capabilities. Unlike conventional language models that operate within a prompt-response paradigm, the platform 100 maintains persistent cognitive processes regardless of external interaction, can remember previous experiences, learn from these experiences, create new thought experiences independently, and initiate interactions without waiting for external prompts.

At the core of persistent cognitive machine platform 100 is an executive core 130, which functions as the central orchestration component of the system. The executive core 130 manages the overall cognitive processes, determines how to handle external stimuli, when to retrieve thoughts from the thought cache, when to engage the reasoning model, when to add new thoughts to the thought cache, and when to enter sleep states. Executive core 130 includes a decision engine that orchestrates resource allocation and process scheduling, a state management system that tracks the operational states of the platform, and a stimulus analysis module that processes and evaluates incoming stimuli. Additionally, executive core 130 contains a thought manager for handling curation and retrieval of thoughts, a sleep cycle controller for managing sleep states, and a thought initiation system for generating new thoughts and cognitive processes.

Connected to executive core 130 is a language model 110, which provides the platform with language processing capabilities. Language model 110 enables the platform to understand and generate natural language by predicting the most likely sequence of tokens that would follow a given input sequence. Language model 110 may incorporate a plurality of neural network architectures such as transformers and attention mechanisms, along with tokenization processes, context management, and response generation capabilities. Language model 110 integrates with executive core 130 to process textual inputs and generate coherent, contextually relevant outputs based on both the immediate context and the system's accumulated experiences stored in the thought cache.

Working in conjunction with the language model 110 is a reasoning model 120, which adds reasoning capabilities to the platform. Reasoning model 120 extends beyond simple language processing by generating chains-of-thought when receiving input, and then using this chain-of-thought together with the original input to generate improved outputs. This component includes a chain-of-thought engine for iterative reasoning processes, problem analysis capabilities, solution synthesis, and specialized reasoning modules for different types of reasoning (mathematical, logical, causal, and analogical). Reasoning model 120 enables the platform to engage in complex problem-solving, logical deduction, and multi-step analytical processes.

The persistent cognitive machine platform includes a thought cache 140, which functions as the system's memory for thoughts. Thought cache 140 is a repository for thoughts that allows the platform to remember that it has experienced something similar before and to use related thoughts to more quickly and richly engage with new stimuli. Thought cache 140 is organized into both short-term and long-term components. The short-term cache maintains recent thought store and working memory interfaces, while the long-term cache contains embedded vector representations and semantic networks of thoughts. Thought cache 140 interfaces with executive core 130 to retrieve relevant thoughts based on current stimuli and to store new thoughts generated during processing.

Working with thought cache 140 is an embedding system 150, which converts thoughts into vector representations in a high-dimensional abstract space. Embedding system 150 enables the efficient storage of a very large amount of thought in a way that allows related thoughts to be positioned closer than unrelated thoughts in the abstract space. Embedding system 150 includes but is not limited to vector representation capabilities, similarity calculation for finding related thoughts, and interfaces for storing and retrieving embedded thoughts. Embedding system 150 may implement various embedding technologies, including sentence embedding techniques.

To ensure the platform maintains its cognitive state across shutdowns and restarts, a persistence layer 160 provides mechanisms for serializing and restoring the system state. Persistence layer 160 includes a state manager responsible for serialization and deserialization of the platform's cognitive state, a checkpoint system for creating recovery points, and a recovery controller for managing state restoration after interruptions. Persistence layer 160 may also incorporates a storage system with primary storage, backup capabilities, and storage tiering to balance performance and reliability. Through persistence layer 160, the platform can maintain continuity of cognition even when powered off or restarted, which is essential to the "persistent" aspect of the system.

In one embodiment, the platform includes a sleep manager 170, which implements sleep-like states during which the platform becomes temporarily unresponsive to external stimuli to focus on internal cognitive processes. Sleep manager 170 includes a sleep cycle scheduler for determining appropriate times to enter sleep states, a wake trigger monitor for detecting conditions that should interrupt sleep, and a thought curation processor that orchestrates sleep-state activities. During sleep states, sleep manager 170 oversees generalization of specific thoughts to create broader concepts, memory consolidation to strengthen important connections, and insight generation through the recombination of existing thoughts. These processes mirror some aspects of biological sleep but are adapted for the platform's specific needs.

To ensure appropriate protections for the system and its data, a security manager 180 implements comprehensive security controls. Security manager 180 may include an access controller with authentication systems, permission management, and encryption services, as well as an integrity monitor comprising content safety filters, audit logging, and anomaly detection. A central policy enforcer within the security manager 180 applies consistent security policies across the platform. These security measures protect both the platform itself and the sensitive information it may contain, particularly important for applications involving confidential or personal data.

User interaction with the platform is facilitated through a user interface 181, which provides methods for humans to communicate with the system. User interface 181 may include text-based interfaces, graphical displays, command consoles, and other interaction mechanisms appropriate to the specific application of the platform.

An integration and interface layer 190 forms the connection between the core PCM platform and external systems or users. This layer includes several specialized interfaces for different types of integration. An API gateway 191 provides programmatic access to the platform's capabilities, enabling other software systems to leverage its cognitive functions. User interfaces 192 offer direct interaction points for human users, including text-based chat interfaces, graphical displays, or specialized interaction mechanisms. System connectors 193 enable integration with external services and applications, while the document interface 194 provides mechanisms for ingesting and processing documents and other content into the platform's thought cache.

The platform interacts with various external entities. Human users 111 may engage with the platform directly, utilizing its cognitive capabilities through conversation or structured interactions. Applications 112 can integrate with the platform through API calls or system connectors, incorporating persistent cognition into existing software systems. External services 113 may provide additional capabilities or information sources that the platform can access and incorporate into its cognitive processes. Documents 114 and other content sources provide information that the platform can ingest, analyze, and incorporate into its thought cache.

In operation, persistent cognitive machine platform 100 maintains persistent cognitive processes even when not actively engaged with external entities. When it receives input from users or systems through integration and interface layer 190, executive core 130 analyzes the stimuli and determines how to respond. It retrieves relevant thoughts from thought cache 140, processes these thoughts in conjunction with the input using the language model 110 and reasoning model 120 as appropriate, and generates a response. New thoughts generated during this process are encoded by embedding system 150 and stored in thought cache 140.

Periodically, as determined by sleep manager 170, the platform enters sleep states to curate thoughts, consolidate memories, and perform other cognitive maintenance functions. Persistence layer 160 ensures that the platform's cognitive state is preserved across system restarts or power interruptions, maintaining continuity of cognition. Through these processes, the platform develops increasingly rich and nuanced understanding based on its accumulating experiences, transcending the limitations of traditional prompt-response AI systems.

The persistent cognitive machine platform 100 can be implemented through various hardware configurations, including dedicated server systems, distributed computing environments, cloud-based infrastructures, or hybrid arrangements. The specific hardware implementation may vary depending on the scale and specific application requirements, but all implementations maintain the core architectural components and functional characteristics described above.

Figure 2:
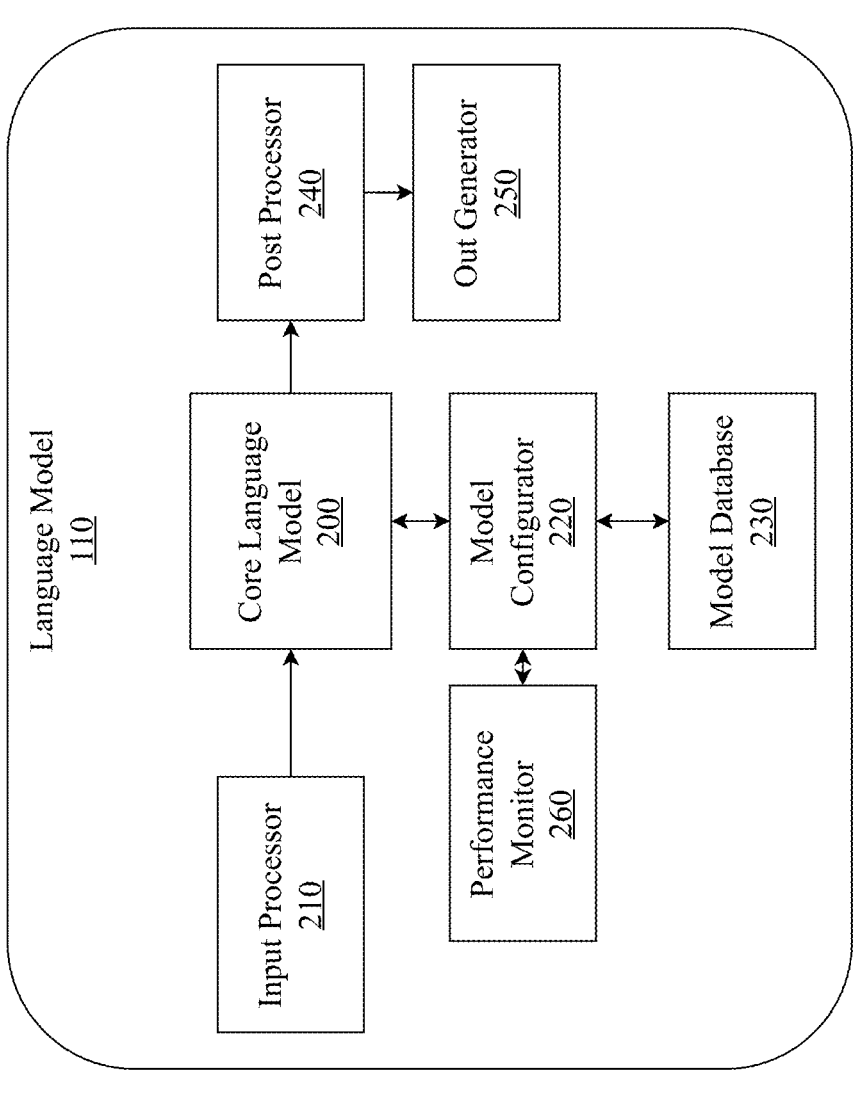
FIG. 2 is a block diagram illustrating an exemplary architecture of a component within a Persistent Cognitive Machine, a language model.

FIG. 2 is a block diagram illustrating an exemplary architecture of a component within a Persistent Cognitive Machine, a language model. Language model 110 provides the persistent cognitive machine with language processing capabilities, enabling it to understand and generate natural language text. Unlike traditional language models that operate in isolation, language model 110 within the PCM architecture is integrated with the executive core and thought cache to leverage both immediate context and accumulated experiences when processing language.

At the center of the language model 110 is a core language model 200, which implements the neural network architecture responsible for language understanding and generation. Core language model 200 may utilize transformer-based architectures with attention mechanisms, similar to those found in state-of-the-art large language models. Similarly, core language model 200 may utilize other architectures such as latent transformers which operate exclusively in latent vector space, architectures that include variational autoencoders, or even combinations of transformers and variational autoencoders. Core language model 200 processes token sequences and predicts likely continuations based on learned patterns and relationships within language.

Core language model 200 serves as the foundation for all language processing within the platform but is augmented by the persistent cognitive capabilities of the broader system.

Input to the language model is managed by an input processor 210, which handles the preprocessing of text before it reaches the core language model. The input processor 210 performs functions including tokenization, which breaks text into manageable units (tokens) for processing by the neural network. Additionally, the input processor 210 manages context windows, ensuring that appropriate context is maintained when processing longer sequences or ongoing conversations. This component may also handle special token insertion, prompt formatting, and other preprocessing steps necessary for effective language model operation.

A model configurator 220 manages the operational parameters and settings of the language model. Model configurator 220 controls aspects such as inference parameters, attention mechanisms, and other configuration settings that affect how the core language model functions. Model configurator 220 may adjust these settings based on the specific requirements of different tasks or in response to performance feedback from the performance monitor. By dynamically configuring the language model, the system can optimize for different types of language tasks without requiring separate models for each task type.

To support the model configurator, a model database 230 stores model weights, parameters, and configuration presets, or previously trained models. Model database 230 may contain multiple sets of weights or parameter configurations optimized for different types of language tasks. Model database 230 enables the language model to efficiently switch between different operational modes or to load specialized parameters for particular domains or tasks. This flexibility allows the language model to adapt to diverse requirements within the persistent cognitive machine platform.

After the core language model processes input, a post processor 240 handles additional processing of the raw model output. Post processor 240 may implement functions such as filtering inappropriate content, ensuring coherence across longer generations, applying formatting rules, or performing specialized post-processing for domain-specific outputs. The post processor 240 ensures that the raw output from the neural network is refined into more usable and appropriate text before being passed to subsequent components.

The final stage in the language model pipeline is an output generator 250, which prepares the processed language model output for use by other components of the system. Output generator 250 handles tasks such as detokenization (converting tokens back into readable text), formatting the output according to specified requirements, and preparing the output for integration with other components of the persistent cognitive machine. This component ensures that the language model's output is properly structured for its intended use, whether that involves direct presentation to users or further processing by other system components.

Throughout the language model's operation, a performance monitor 260 tracks various metrics related to model performance and resource utilization. Performance monitor 260 monitors aspects such as processing time, memory usage, token consumption, and quality metrics. Additionally, performance monitor 260 provides feedback to the model configurator to enable dynamic optimization of model parameters based on observed performance. This monitoring capability aids in maintaining efficient operation of the language model, particularly in resource-constrained environments or when processing large volumes of text.

Language model 110 interfaces with executive core 130 of the persistent cognitive machine platform 100, receiving input data and instructions while providing processed language outputs. Unlike standalone language models, this component benefits from integration with the thought cache, allowing it to leverage persistent memory when generating responses. This integration enables the language model to produce outputs that reflect not only the immediate context but also the system's accumulated experiences and learned patterns.

In operation, language model 110 receives input that may originate from external sources (via the integration and interface layer) or from internal processes within the persistent cognitive machine. Input processor 210 prepares this input for core language model 200, which generates initial output with guidance from model configurator 220. This output is then refined by post processor 240 and formatted by output generator 250 before being provided to other components of the system or to external entities. Throughout this process, performance monitor 260 ensures efficient operation and provides feedback for optimization.

Language model 110 may incorporate various specialized capabilities such as multi-lingual support, domain adaptation for specific fields of knowledge, contextual understanding that spans beyond traditional context windows, coherence control for longer generations, safety filters to prevent harmful outputs, and style adaptation to match desired tones or writing styles. These capabilities allow the language model to serve as a versatile and powerful component within the broader persistent cognitive machine architecture.

Figure 3:
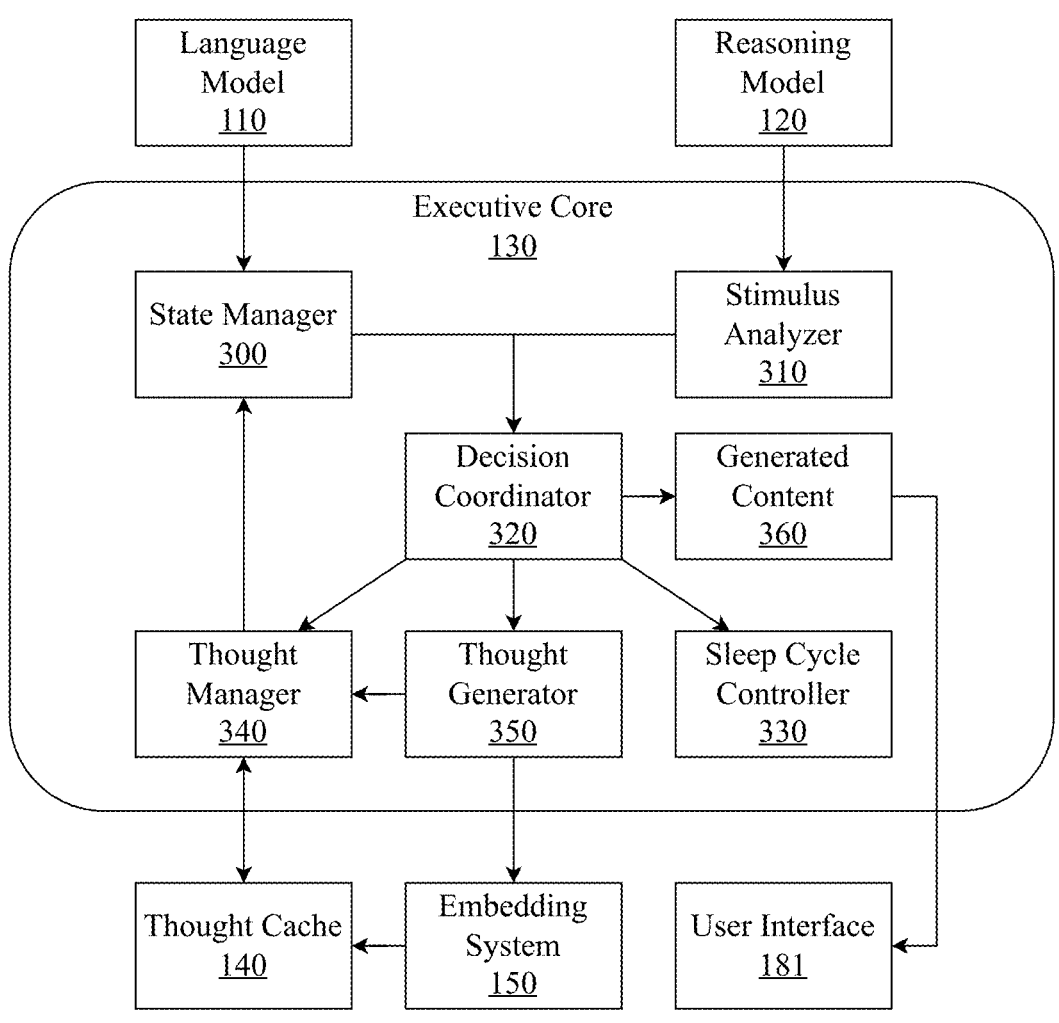
FIG. 3 is a block diagram illustrating the detailed architecture of the executive core and its interactions with other components of the persistent cognitive machine platform.

FIG. 3 is a block diagram illustrating the detailed architecture of the executive core and its interactions with other components of the persistent cognitive machine platform. Executive core 130 serves as the central orchestration component of the persistent cognitive machine platform 100, coordinating the activities of all other components and managing the overall cognitive processes of the system. Unlike the control systems in traditional AI architectures, executive core 130 maintains persistent cognitive processes and makes decisions about how to allocate resources, process information, and manage the system's thoughts.

At the top level, executive core 130 interfaces with language model 110 and reasoning model 120, leveraging these components to process language and perform reasoning tasks respectively. Executive core 130 determines when to engage each of these models based on the nature of the current cognitive task, coordinating their operations to achieve coherent and effective cognitive processing.

A state manager 300 within the executive core is responsible for tracking and controlling the operational state of the persistent cognitive machine. State manager 300 maintains awareness of whether the system is in an active interaction state, passive observation state, independent thinking state, or sleep state. State manager 300 monitors transitions between these states and ensures appropriate resource allocation and behavior patterns for each state. By maintaining this state awareness, state manager 300 enables the persistent cognitive machine to exhibit different behaviors appropriate to different operational contexts.

Working in coordination with state manager 300 is a stimulus analyzer 310, which processes and evaluates incoming stimuli from both external and internal sources. When the system receives input via user interface 181 or other input channels, stimulus analyzer 310 examines this input to determine its nature, relevance, and appropriate response pathway. Stimulus analyzer 310 may perform tasks such as intent recognition, content classification, and priority assessment to inform subsequent processing decisions. Stimulus analyzer 310 also processes internal stimuli generated by the system's own cognitive processes, enabling responses to the system's own thoughts.

A decision coordinator 320 serves as the central decision-making component within the executive core. Based on input from state manager 300 and stimulus analyzer 310, the decision coordinator 320 determines appropriate actions and resource allocations. Decision coordinator 320 orchestrates the flow of information between different system components, decides when to retrieve information from thought cache 140, when to generate new thoughts, and when to produce external responses. Decision coordinator 320 implements sophisticated decision strategies that balance immediate response needs with longer-term cognitive goals.

The persistent cognitive machine is capable of improving the models and thoughts contained within the platform through the implementation of a sleep cycle controller 330, which manages the system's sleep states. Sleep cycle controller 330 determines when the system should enter sleep states based on factors such as activity levels, resource utilization, and accumulated need for thought curation. During sleep states, this component orchestrates the internal processes that occur, including memory consolidation, thought generalization, and pattern extraction. The sleep cycle controller 330 also monitors for wake triggers that would necessitate an early exit from the sleep state, ensuring that stimuli can interrupt sleep when necessary.

A thought manager 340 handles the curation, retrieval, and storage of thoughts within the system. This component interfaces with thought cache 140 to store new thoughts generated during cognitive processes and to retrieve relevant thoughts based on current context and stimuli. Thought manager 340 implements retrieval strategies that may consider direct relevance, analogical relationships, temporal context, and other factors that might make certain thoughts useful in the current context. By effectively managing the system's accumulated thoughts, this component enables the persistent cognitive machine to leverage its experiences when responding to new situations. Working alongside the thought manager, a thought generator 350 creates new thoughts based on current cognitive processes. Unlike the more reactive processing in traditional AI systems, thought generator 350 can initiate new thoughts autonomously, triggered by internal processes rather than external inputs. Thought generator 350 can create associations between previously unconnected thoughts, generate hypotheses, form questions, or produce other types of thoughts that contribute to the system's cognitive processes. The thought generator 350 is central to the system's ability to think independently rather than merely responding to prompts.

The output of the executive core's processing is channeled through the remaining systems as generated content 360. The generated content 360 may interface with user interface 181 to present information to human users or with other interface components to communicate with external systems.

Executive core 130 maintains bidirectional connections with thought cache 140, enabling the storage and retrieval of thoughts. This connection aids in the system's ability to maintain persistent cognition, as it allows experiences and insights to be preserved and leveraged across interactions. Thought cache 140 stores not just factual information but also associations, patterns, and other forms of thought that constitute the system's accumulated cognitive experience.

Supporting the thought storage and retrieval processes is embedding system 150, which converts thoughts into vector representations in a high-dimensional abstract space. This system enables thoughts to be organized based on semantic similarity rather than simple keyword matching, allowing for more robust retrieval based on conceptual relationships. Embedding system 150 works with both thought manager 340 and thought cache 140 to facilitate effective thought organization and retrieval.

User interface 181 provides the means for external entities to interact with the persistent cognitive machine. This component handles both input reception and output presentation, enabling two-way communication between the system and its users. User interface 181 may implement various modalities of interaction depending on the specific application context.

In operation, executive core 130 continuously manages the cognitive processes of the persistent cognitive machine, whether actively engaged with external entities or operating independently. When external stimuli are received via user interface 181, stimulus analyzer 310 processes this input and feeds information to decision coordinator 320. Decision coordinator 320 then determines appropriate actions, potentially engaging language model 110 and reasoning model 120 while instructing thought manager 340 to retrieve relevant thoughts from the thought cache 140. Based on this processing, the system may generate new thoughts via thought generator 350, which are then stored in thought cache 140 after being converted to vector representations by embedding system 150. Responses or other outputs are prepared into generated content 360 and presented via user interface 181.

Periodically, as determined by sleep cycle controller 330 and coordinated with state manager 300, the system enters sleep states during which it focuses on internal cognitive maintenance rather than external interaction. The orchestration performed by executive core 130 enables the persistent cognitive machine to transcend the limitations of traditional AI systems, maintaining persistent cognition, learning from experiences, and developing increasingly nuanced understanding over time.

Figure 4:
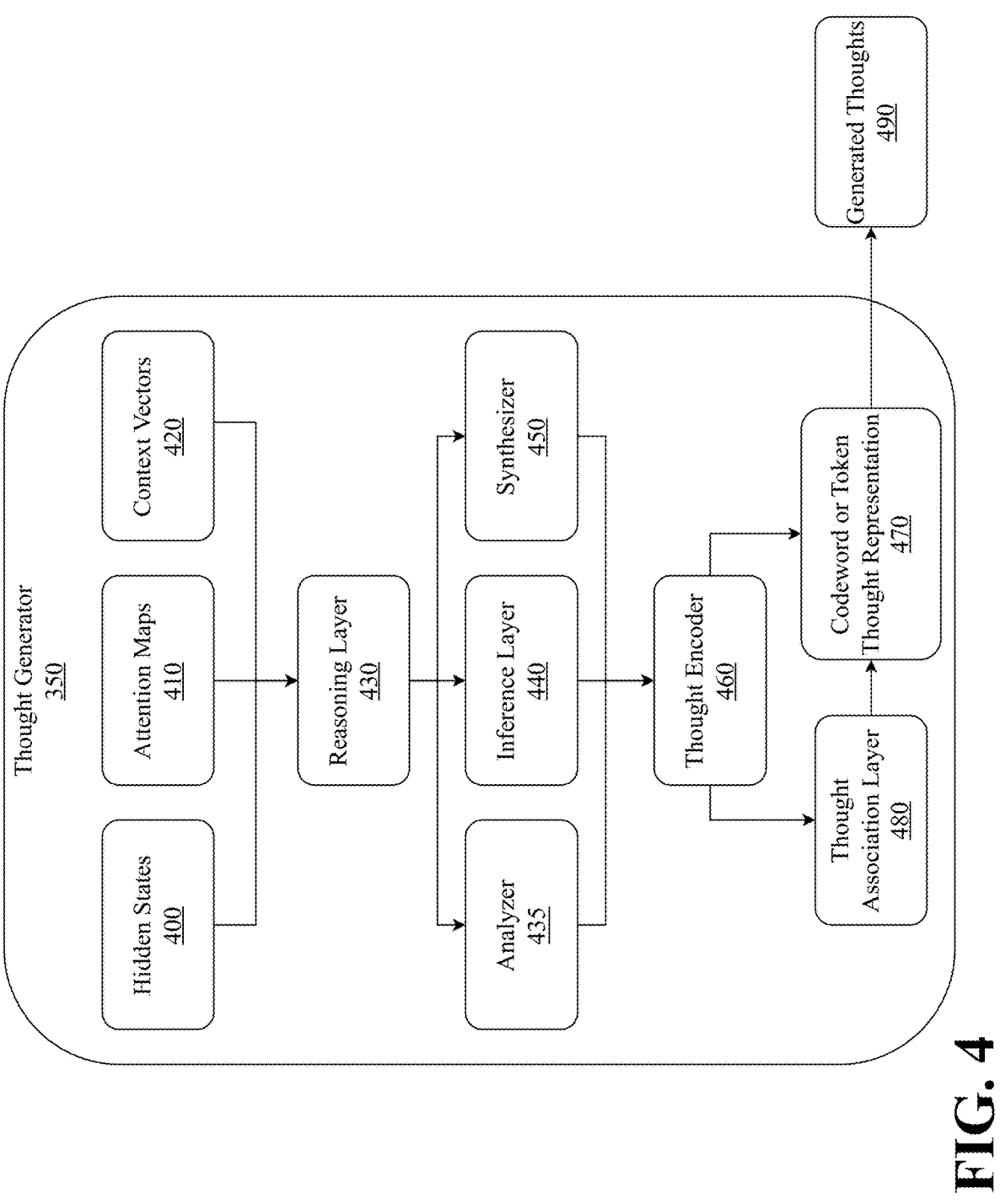
FIG. 4 is a block diagram illustrating the internal architecture of a thought generator within a Persistent Cognitive Machine.

FIG. 4 is a block diagram illustrating the internal architecture of a thought generator within a Persistent Cognitive Machine. The thought generator 350 begins by accessing several internal representations from the language model, including hidden states 400, attention maps 410, and context vectors 420. The hidden states 400 capture the internal activations of the model's neural network layers, representing the model's evolving understanding of the input as it processes the sequence. Attention maps 410 indicate which parts of the input the model is focusing on at different stages of processing, providing insights into the model's attentional patterns and focus. Context vectors 420 aggregate information from different parts of the sequence, representing the contextual understanding that the model has built.

These internal representations are fed into a reasoning layer 430, which serves as the central component for extracting coherent reasoning patterns from the model's internal states. The reasoning layer 430 processes these inputs to identify distinct reasoning steps and analysis patterns that constitute the model's thinking process.

The output from the reasoning layer 430 is then distributed to three specialized processing components: an analyzer 435, an inference layer 440, and a synthesizer 1850. The analyzer 435 examines the input prompt and the model's initial understanding, identifying key concepts, constraints, and requirements. The inference layer 440 performs logical reasoning and deduction based on the model's knowledge and the analyzed information. The synthesizer 450 combines different pieces of analysis and inference to form coherent, integrated conclusions or responses.

The outputs from these three components are then passed to a thought encoder 460, which formats the reasoning steps into structured thought representations. The thought encoder 460 processes the raw reasoning outputs and transforms them into a standardized format suitable for representation as tokens.

The encoded thoughts are then processed through two parallel pathways. First, they are passed to a thought association layer 480 that explicitly links each thought to relevant portions of the input prompt, establishing the relationship between thoughts and the context that triggered them. Second, they are converted into a codeword or token thought representation 470, which represents each thought using the system's codeword vocabulary, allowing for compact storage and efficient processing.

The final output of the thought generator 350 is a collection of generated thoughts 490, each represented as a sequence of tokens that capture a discrete unit of reasoning or analysis. These thoughts are structured representations of the model's intermediate reasoning processes, explicitly capturing the step-by-step thinking that the model performs while processing the input.

Figure 5:
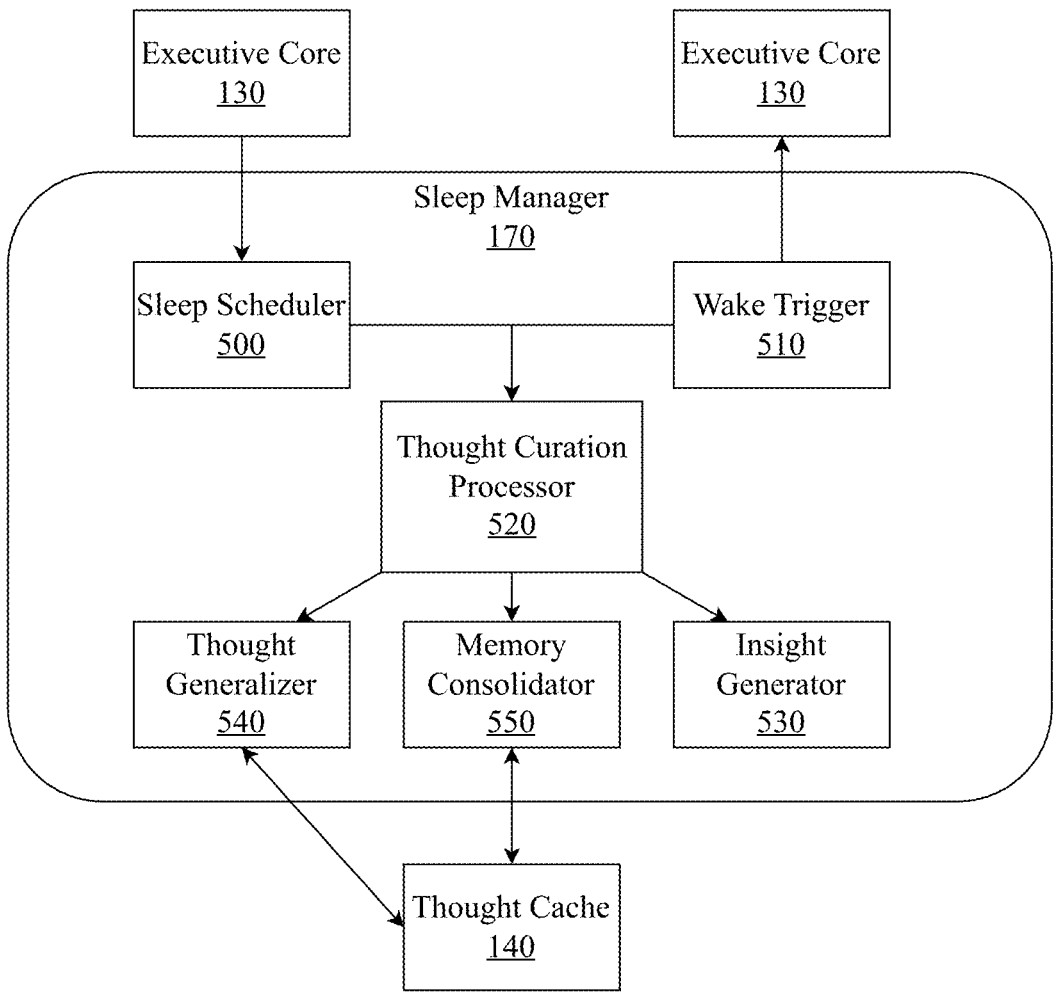
FIG. 5 is a block diagram illustrating an exemplary architecture of a component within a Persistent Cognitive Machine, a sleep manager.

FIG. 5 is a block diagram illustrating an exemplary architecture of a component within a Persistent Cognitive Machine, a sleep manager. Sleep manager 170 allows the PCM to enter sleep-like states during which the system performs internal cognitive maintenance processes rather than responding to external stimuli. This component draws inspiration from biological sleep processes but adapts these concepts specifically for the needs of an artificial cognitive system. Sleep manager 170 interfaces with executive core 130 in a bidirectional manner. Executive core 130 provides inputs regarding system state and activity levels, while sleep manager 170 reports back on sleep state transitions and outcomes of sleep processes. This relationship ensures that sleep states are integrated with the overall cognitive processing of the platform rather than operating as an isolated subsystem.

Within sleep manager 170, a sleep scheduler 500 determines when the persistent cognitive machine should enter sleep states. This component monitors various factors such as recent activity levels, time elapsed since the last sleep cycle, accumulated cognitive load, and current external interaction demands. Based on these factors, sleep scheduler 500 makes decisions about the timing and duration of sleep cycles. Sleep scheduler 500 may implement different types of sleep cycles with varying depths and durations, each optimized for different types of cognitive maintenance tasks.

Complementing sleep scheduler 500 is a wake trigger 510, which monitors conditions that would necessitate an early exit from a sleep state. While the persistent cognitive machine is designed to be temporarily unresponsive during sleep states, certain high-priority stimuli must be able to interrupt sleep when necessary. Wake trigger 510 continuously evaluates incoming stimuli against wake criteria, determining whether the stimulus is important enough to warrant interrupting the current sleep cycle. This component ensures that the system remains responsive to critical needs even during sleep states.

At the heart of the sleep manager is a thought curation processor 520, which orchestrates the various cognitive maintenance processes that occur during sleep states. This central component coordinates the activities of specialized processors that handle different aspects of thought curation. Thought curation processor 520 determines which maintenance processes to prioritize during a given sleep cycle, allocates resources between different processes, and tracks the progress and outcomes of these processes. One of the processes that occurs during sleep states is performed by insight generator 530, which creates new connections between previously unrelated thoughts. This component analyzes patterns across the system's accumulated thoughts to identify non-obvious relationships, potential implications, and novel perspectives. Insight generator 530 enables the persistent cognitive machine to develop new understanding that goes beyond what was explicitly learned from experiences, allowing it to make creative leaps and generate innovative solutions to problems.

Working in parallel with insight generator 530, thought generalizer 540 identifies patterns across specific experiences to create more broadly applicable concepts. When the persistent cognitive machine encounters multiple similar situations, thought generalizer 540 extracts the common elements to form generalized knowledge that can be applied to new situations. This process is similar to abstraction in human cognition, where specific instances lead to the formation of general principles. Thought generalizer 540 enables the system to become more efficient in its cognitive processes by recognizing patterns rather than treating each new experience as entirely novel.

A memory consolidator 550 strengthens important connections and integrates new experiences with existing knowledge. This component evaluates recent experiences based on factors such as emotional significance, relevance to ongoing goals, repetition, and novelty to determine which experiences should be consolidated into long-term memory. Memory consolidator 550 also strengthens connections between related thoughts based on co-activation patterns, enhancing the system's ability to retrieve relevant information in the future. Through these processes, memory consolidator 550 ensures that important experiences are preserved while less significant details may fade from accessibility over time.

All of these sleep processes interact with thought cache 140, which stores the persistent cognitive machine's accumulated thoughts and experiences. During sleep states, thought cache 140 provides the raw material for curation processes and receives the updated thought structures that result from these processes. The bidirectional connection between sleep manager 170 and thought cache 140 enables the system to effectively organize and utilize its accumulated experiences.

In operation, sleep manager 170 receives signals from executive core 130 indicating that conditions are appropriate for a sleep cycle. Sleep scheduler 500 then initiates a sleep state, during which thought curation processor 520 activates insight generator 530, thought generalizer 540, and memory consolidator 550 to perform their respective functions on the contents of thought cache 140. Throughout this process, wake trigger 510 monitors for conditions that would necessitate an early return to an active state. The sleep processes implemented by sleep manager 170 are aid in the persistent cognitive machine's ability to learn effectively from experiences over time. By curating thoughts during periods of reduced external interaction, the system can develop more sophisticated understanding and more efficient cognitive processes. This approach mirrors the importance of sleep for learning and memory consolidation in biological systems while being specifically designed for the unique requirements of an artificial cognitive architecture.

Sleep manager 170 embodies a fundamental advancement beyond traditional AI systems, which typically process information only in response to explicit prompts and lack dedicated mechanisms for organizing and generalizing from accumulated experiences. By implementing these biologically-inspired but technologically-adapted processes, the persistent cognitive machine platform achieves a level of cognitive sophistication and adaptability that would be difficult or impossible to attain through prompt-response processing alone.

Figure 6:
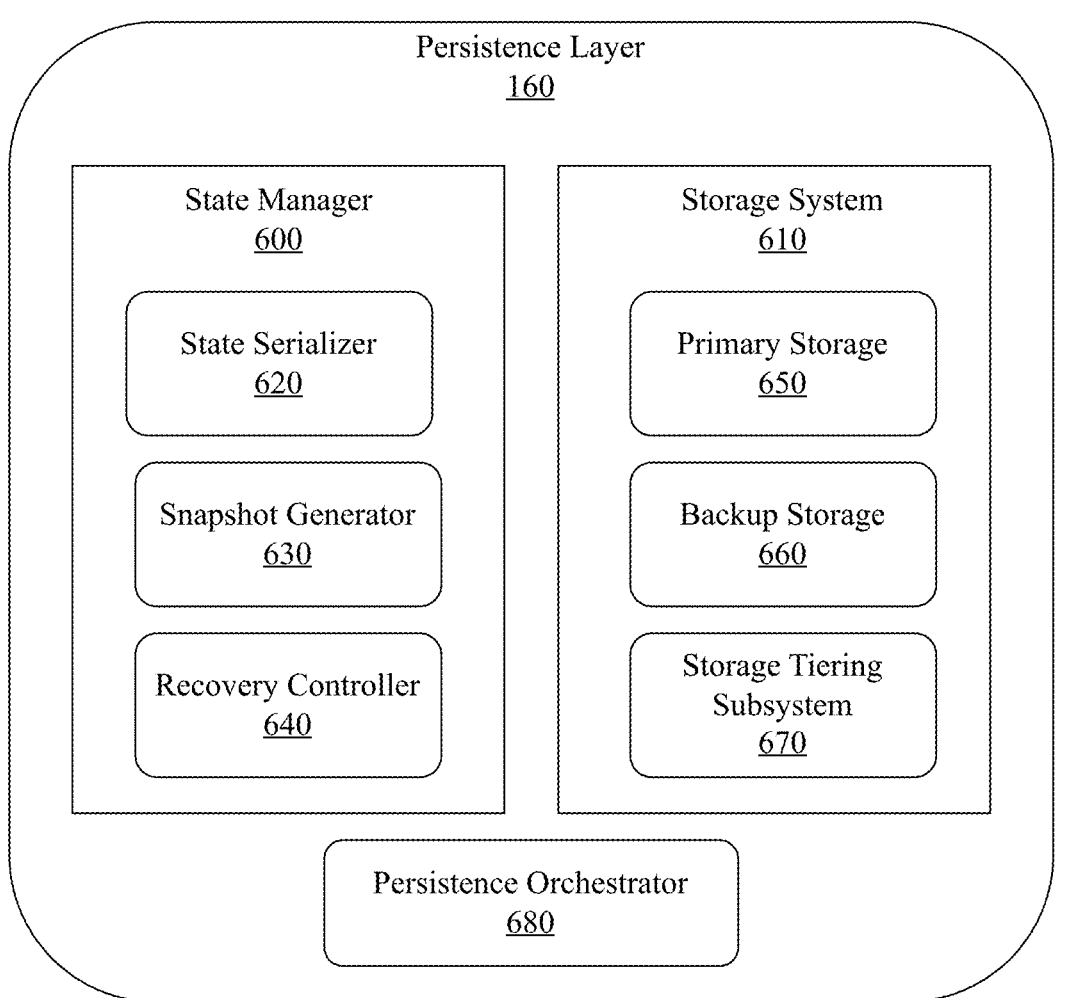
FIG. 6 is a block diagram illustrating an exemplary architecture of a component within a Persistent Cognitive Machine, a persistence layer.

FIG. 6 is a block diagram illustrating an exemplary architecture of a component within a Persistent Cognitive Machine, a persistence layer. The persistence layer 160 enables the persistent cognitive machine to maintain continuity of cognition across system shutdowns and restarts. Unlike traditional AI systems that reset to an initial state when restarted, the persistent cognitive machine preserves its accumulated experiences, relationships, and cognitive state, allowing it to resume operation as if no interruption had occurred. This capability is instrumental to the "persistent" aspect of the system's design.

Persistence layer 160 is organized into two main subsystems—a state manager 600 and a storage system 610—with a persistence orchestrator 680 coordinating between them. This architecture ensures reliable state preservation while optimizing for both performance and data integrity. State manager 600 handles the processing and organization of system state information for persistence. This component determines what aspects of the system state need to be preserved, how frequently different types of state should be saved, and how to structure the state data for efficient storage and retrieval. State manager 600 works closely with other components of the persistent cognitive machine to ensure that all critical state information is captured appropriately.

Within state manager 600, a state serializer 620 converts the runtime objects and data structures of the persistent cognitive machine into formats suitable for storage. This component handles the complex task of transforming the rich, interconnected thought structures and system configurations into serialized representations that can be efficiently stored while preserving all necessary relationships and metadata. State serializer 620 may employ various serialization strategies optimized for different types of state information, balancing factors such as storage efficiency, serialization speed, and deserialization performance.

Working alongside state serializer 620, a snapshot generator 630 creates consistent point-in-time snapshots of the system state. Rather than continuously updating state information, which could lead to inconsistencies if the system were to shut down unexpectedly, snapshot generator 630 creates complete snapshots at appropriate intervals. These snapshots serve as recovery points to which the system can return if needed. The snapshot generator 630 may implement various snapshot strategies, including full snapshots and incremental snapshots, to balance storage efficiency and recovery capabilities.

Complementing these components is a recovery controller 640, which manages the restoration of system state after a shutdown or failure. When the persistent cognitive machine restarts, recovery controller 640 coordinates the process of loading the most recent valid snapshot and applying any necessary transformations to restore the system to its previous state. This component includes validation mechanisms to ensure that corrupted or incomplete state data does not compromise the system's operation. Recovery controller 640 may also implement strategies for partial recovery in cases where complete state restoration is not possible.

A storage system 610 provides the physical storage capabilities needed to persist system state across shutdowns. This component manages the actual storage and retrieval of serialized state data, implementing appropriate mechanisms for data integrity, efficiency, and reliability. Storage system 610 may interface with various types of storage hardware depending on the deployment environment of the persistent cognitive machine. Within storage system 610, a primary storage 650 provides the main storage facility for system state. This component is optimized for performance and accessibility, enabling rapid storage and retrieval of state information during normal operation. Primary storage 650 may utilize high-performance storage technologies such as solid-state drives or in-memory databases to minimize the performance impact of state persistence operations.

To protect against data loss, a backup storage 660 maintains redundant copies of critical state information. This component may implement various backup strategies, including off-site replication, to ensure that state information can be recovered even in the event of hardware failures or other disasters. Backup storage 660 works in coordination with the primary storage 650 to provide a comprehensive data protection strategy. A storage tiering subsystem 670 optimizes storage usage by placing different types of state information on appropriate storage tiers. Storage tiering subsystem 670 recognizes that not all state information has the same access patterns or recovery requirements. Frequently accessed or important state information may be stored on high-performance storage tiers, while less frequently accessed historical information may be moved to more cost-effective storage tiers. Storage tiering subsystem 670 implements policies for data migration between tiers based on access patterns and aging criteria.

Coordinating the activities of both state manager 600 and storage system 610 is a persistence orchestrator 680. This central component ensures that state serialization, snapshot generation, storage operations, and recovery processes work together seamlessly. Persistence orchestrator 680 implements policies for when to create snapshots, how to balance system performance with persistence requirements, and how to handle exceptional conditions. This component provides a unified interface for other parts of the persistent cognitive machine to interact with the persistence capabilities.

In operation, persistence layer 160 continuously monitors the state of the persistent cognitive machine and periodically creates serialized snapshots through state serializer 620 and snapshot generator 630. These snapshots are stored in primary storage 650, with redundant copies maintained in backup storage 660 and potentially migrated between storage tiers by storage tiering subsystem 670 based on aging and access patterns. When the system restarts after a shutdown, recovery controller 640 retrieves the most recent valid snapshot and restores the system state, allowing the persistent cognitive machine to resume operation from where it left off.

Persistence layer 160 is helpful to the concept of persistent cognition, allowing the system to accumulate experiences and knowledge over extended periods that may span multiple operational sessions. The persistence mechanisms implemented in this layer enable the persistent cognitive machine to maintain continuity of cognition despite the practical necessity of occasional system shutdowns. The architecture of persistence layer 160 is designed to be adaptable to various deployment environments, from single-server installations to distributed cloud environments. The modular approach allows for different implementations of the storage components based on available technologies and specific requirements, while maintaining consistent behavior from the perspective of the rest of the persistent cognitive machine platform.

Figure 7:
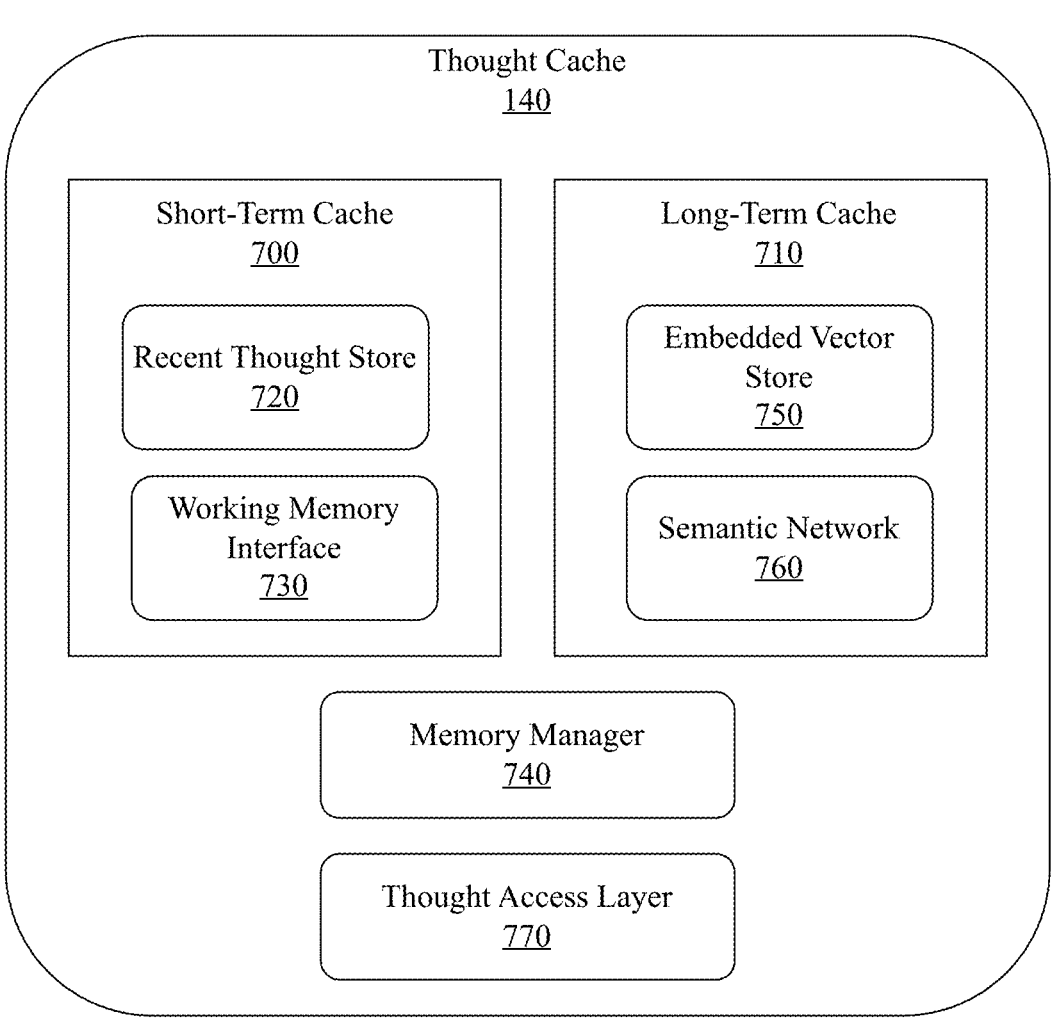
FIG. 7 is a block diagram illustrating an exemplary architecture of a component within a Persistent Cognitive Machine, a thought cache.

FIG. 7 is a block diagram illustrating an exemplary architecture of a component within a Persistent Cognitive Machine, a thought cache. Thought cache 140 functions as the system's memory and enabling it to remember previous experiences and apply them to new situations. Unlike traditional AI systems that typically rely on fixed knowledge representations or simple retrieval mechanisms, thought cache 140 implements a sophisticated, biologically-inspired memory architecture that supports both short-term and long-term memory functions with mechanisms for transferring information between them.

Thought cache 140 is organized into two primary components: a short-term cache 700 and a long-term cache 710. This division mirrors biological memory systems, allowing for different optimization strategies appropriate to the different functions and characteristics of short-term versus long-term memory storage.

Short-term cache 700 stores recently encountered or generated thoughts that are actively being used in current cognitive processes. This component provides high-speed access to thoughts that are relevant to ongoing operations, enabling the persistent cognitive machine to maintain context and continuity during interactions and cognitive processes. Short-term cache 700 has limited capacity compared to the long-term cache, focusing on thoughts that are immediately relevant rather than attempting to store the system's entire cognitive history.

Within short-term cache 700, recent thought store 720 maintains the most recently created or accessed thoughts. This component functions similar to working memory in humans, keeping active thoughts readily available for immediate processing. Recent thought store 720 organizes thoughts based on recency and relevance to current cognitive processes, enabling rapid access to contextually appropriate information. Thoughts in this store may be temporarily held even when not immediately active to support context maintenance across related cognitive processes.

Complementing the recent thought store, a working memory interface 730 provides mechanisms for the executive core and other components to interact with the contents of the short-term cache. This interface enables operations such as thought retrieval, manipulation, and temporary storage during active cognitive processes. Working memory interface 730 implements priority schemes that determine which thoughts remain in working memory and which are transferred to long-term storage or discarded, based on factors such as relevance, importance, and cognitive load.

For longer-term storage of thoughts, long-term cache 710 maintains a comprehensive repository of the system's accumulated experiences and derived knowledge. This component stores thoughts that have been deemed significant enough to preserve beyond their immediate context, enabling the persistent cognitive machine to develop a continuously growing knowledge base from which it can draw in future operations. Long-term cache 710 implements sophisticated storage and retrieval mechanisms that optimize for capacity and organization rather than raw access speed.

Within a long-term cache 710, an embedded vector store 750 represents thoughts as vectors in a high-dimensional abstract space. This component leverages techniques similar to those used in modern vector databases, enabling efficient storage and similarity-based retrieval of large volumes of thought data. By representing thoughts as vectors, embedded vector store 750 allows for retrieval based on semantic similarity rather than exact matching, supporting more flexible and human-like memory access patterns. Thoughts that are conceptually similar are positioned closer together in this abstract space, facilitating associative retrieval processes.

Complementing the vector-based representation, a semantic network 760 maintains explicit relationships between thoughts. While the embedded vector store captures implicit similarity, semantic network 760 represents specific relationships such as causality, hierarchy, temporal sequence, and other structured associations between thoughts. This component enables the system to traverse these relationships during reasoning processes, supporting capabilities such as logical inference, narrative understanding, and structured knowledge representation. Semantic network 760 grows and evolves over time as the system encounters new information and develops new connections between existing thoughts.

Coordinating between these storage components is a memory manager 740, which oversees the movement of thoughts between short-term and long-term storage. This component implements policies for when thoughts should be transferred from short-term to long-term memory, how thoughts in long-term memory should be organized and indexed, and when thoughts should be retrieved from long-term memory based on their relevance to current cognitive processes. Memory manager 740 may use factors such as thought importance, repetition, emotional significance, and relevance to ongoing goals to determine which thoughts deserve long-term preservation and how they should be prioritized.

Providing unified access to the thought cache's capabilities is a thought access layer 770, which serves as the interface through which other components of the persistent cognitive machine interact with stored thoughts. This component implements query mechanisms that allow for thought retrieval based on various criteria, including content similarity, temporal relationships, categorical membership, and explicit associations. Thought access layer 770 abstracts away the underlying storage mechanisms, presenting a consistent interface regardless of whether thoughts are retrieved from short-term or long-term storage. This layer may also implement access control mechanisms to ensure appropriate use of thought data when such considerations are relevant.

In operation, thought cache 140 continuously receives new thoughts generated during the persistent cognitive machine's cognitive processes. These thoughts are initially stored in recent thought store 720 within short-term cache 700, where they are readily available for ongoing processing. As the system continues to operate, memory manager 740 evaluates these thoughts to determine which should be preserved in long-term memory. Thoughts selected for long-term preservation are processed by the embedding system to create vector representations, which are then stored in embedded vector store 750. Relationships between these thoughts and existing knowledge are recorded in semantic network 760.

When the persistent cognitive machine encounters new situations, thought access layer 770 retrieves relevant thoughts from both short-term and long-term storage based on similarity to the current context, explicit relationships, and other retrieval criteria. These retrieved thoughts then inform the system's response to the current situation, allowing it to leverage past experiences and accumulated knowledge rather than responding based solely on immediate input.

Thought cache 140 is aids in the persistent cognitive machine's ability to develop increasingly sophisticated understanding over time. By preserving thoughts across interactions and even across system restarts (in conjunction with the persistence layer), the thought cache enables persistent learning and adaptation. This capability represents a fundamental advancement beyond traditional AI systems, which typically either maintain static knowledge representations or learn incrementally through explicit training processes rather than naturally accumulating experiences.

Figure 8:
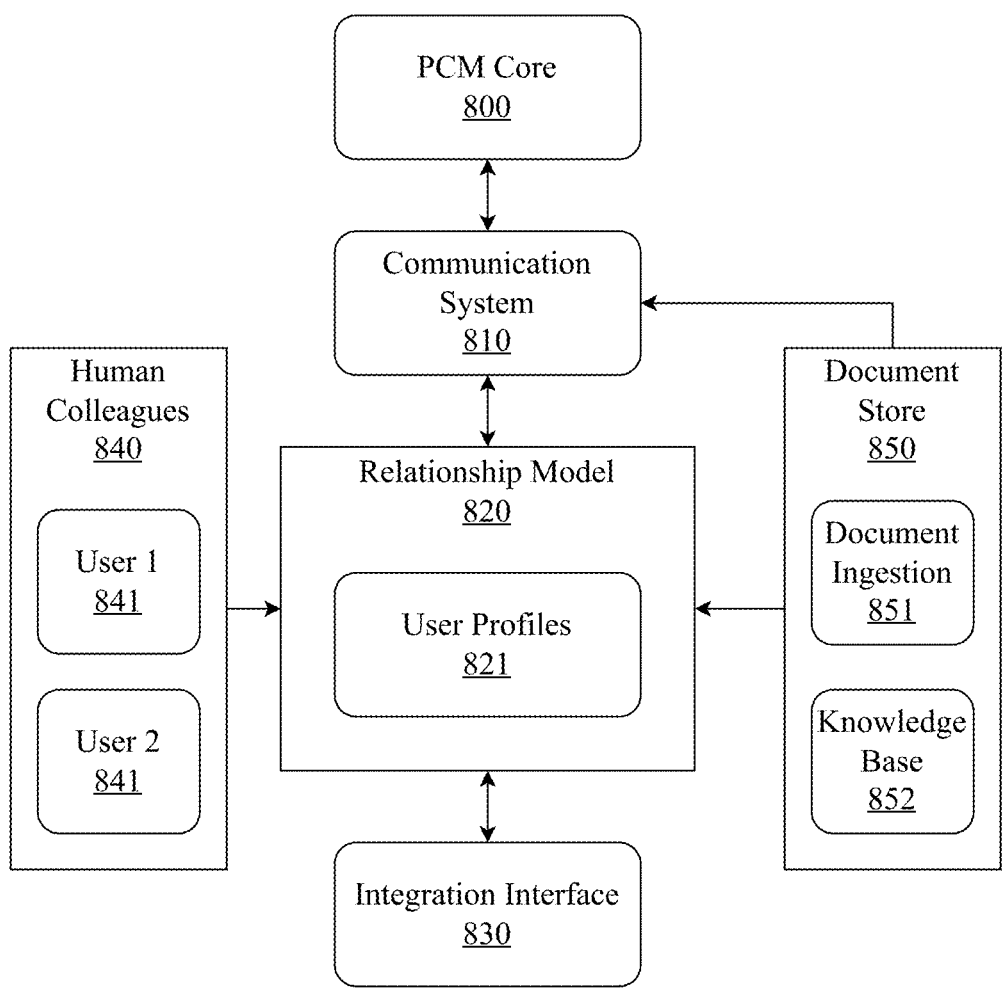
FIG. 8 is a block diagram illustrating an exemplary system architecture of a persistent cognitive machine platform that is used as a synthetic cognitive colleague.

FIG. 8 is a block diagram illustrating an exemplary system architecture of a persistent cognitive machine platform that is used as a synthetic cognitive colleague. The synthetic cognitive colleague implementation demonstrates how the persistent cognitive machine technology can be applied to create an always-on, text-based cognitive entity capable of participating in both individual and group interactions. This implementation particularly emphasizes the relationship-building and document processing capabilities of the underlying platform, creating a system that can function as a collaborative team member within professional environments.

At the center of the implementation is PCM core 800, which incorporates all the fundamental components of the persistent cognitive machine platform described in previous figures, including the language model, reasoning model, executive core, thought cache, embedding system, persistence layer, and sleep manager. The PCM core 800 provides the cognitive capabilities that enable the synthetic cognitive colleague to understand context, reason about information, maintain persistent memory, and develop relationships over time.

A communication system 810 facilitates interactions between the synthetic cognitive colleague and human users. This component manages both individual and group-based communications, supporting capabilities such as one-on-one conversations, group discussions where the synthetic cognitive colleague may be either an active participant or a passive observer, and asynchronous messaging. Communication system 810 handles message routing, conversation state tracking, and context maintenance across multiple concurrent conversations. Unlike traditional chatbots that operate within isolated conversation sessions, this component enables the synthetic cognitive colleague to maintain awareness of all conversations within its scope, recognizing relationships between different discussions and leveraging insights across conversation boundaries.

A key innovation in this implementation is relationship model 820, which tracks and manages the synthetic cognitive colleague's relationships with individual human users. This component enables the system to develop individualized relationships with each team member, adapting its behavior, communication style, and information sharing based on each person's preferences, expertise, and interaction history. Relationship model 820 maintains knowledge about each user's areas of expertise, communication preferences, work patterns, and historical interactions, allowing the Synthetic Cognitive Colleague to interact in ways that are appropriate and effective for each specific individual.

Within relationship model 820, user profiles 821 store detailed information about each human colleague. These profiles go beyond basic identity information to capture interaction preferences, knowledge areas, communication patterns, and relationship history. As the synthetic cognitive colleague continues to interact with users over time, these profiles become increasingly detailed and nuanced, enabling more personalized and effective interactions. User profiles 821 also track the social dynamics between human team members that are visible to the synthetic cognitive colleague, allowing it to understand team structures, collaboration patterns, and communication norms.

A human colleague 840 represents the human users who interact with the synthetic cognitive colleague. These may include team members, clients, stakeholders, or other individuals relevant to the professional context in which the system operates. The diagram shows two specific users, user 1 841 and user 2 841, but the system is designed to accommodate any number of human colleagues, each with their own relationship to the synthetic cognitive colleague.

Supporting the knowledge capabilities of the system is a document store 850, which manages documents and other knowledge artifacts that have been shared with or created by the synthetic cognitive colleague. This component enables the system to ingest, process, and leverage various forms of structured and unstructured information, from technical documents and research papers to meeting notes and project plans. Document store 850 extends the synthetic cognitive colleague's knowledge beyond what it has directly experienced through conversations, providing additional context and domain knowledge.

Document ingestion 851 within the document store handles the processing of new documents as they are added to the system. Document ingestion 851 extracts content, identifies key concepts and relationships, and integrates the information into the system's thought cache. Document ingestion 851 may implement various processing strategies appropriate to different document types, from text extraction and semantic analysis to structured data parsing. Importantly, there are no token limits on document ingestion, allowing the Synthetic Cognitive Colleague to process documents of any length or complexity.

Once processed, document information is stored in the knowledge base 852, which organizes information for efficient retrieval and utilization. The knowledge base 852 integrates with the thought cache of the PCM core, allowing document-derived knowledge to be connected with insights gained through direct interaction. This integration enables the Synthetic Cognitive Colleague to recall and leverage document information in relevant contexts, even if the document was ingested long ago or in a different interaction context.

An integration interface 830 provides connectivity between the various components of the Synthetic Cognitive Colleague implementation. This component ensures that information flows appropriately between the PCM core, communication system, relationship model, and document store. Integration interface 830 manages data transformations, event routing, and synchronization to create a cohesive system from these various specialized components.

In operation, the synthetic cognitive colleague implementation provides an always-on cognitive presence within a team or organizational context. Human colleagues can engage with it directly through one-on-one conversations, include it in group discussions, or share documents for its analysis and incorporation. The system develops individualized relationships with each human colleague, adapting its interactions based on accumulated relationship knowledge. It can proactively share relevant information, connect people with similar interests or complementary expertise, and maintain context across conversations that may span days, weeks, or even months.

The synthetic cognitive colleague demonstrates how the persistent cognitive machine platform can be applied to create systems that transcend traditional AI assistants or chatbots. By maintaining persistent cognition, developing genuine relationships with users, and accumulating knowledge across interactions and documents, this implementation creates a cognitive entity that can function as a true team member rather than merely a tool. This capability represents a significant advancement in how AI systems can be integrated into professional environments, offering new possibilities for knowledge management, collaboration, and cognitive augmentation.

Figure 9:
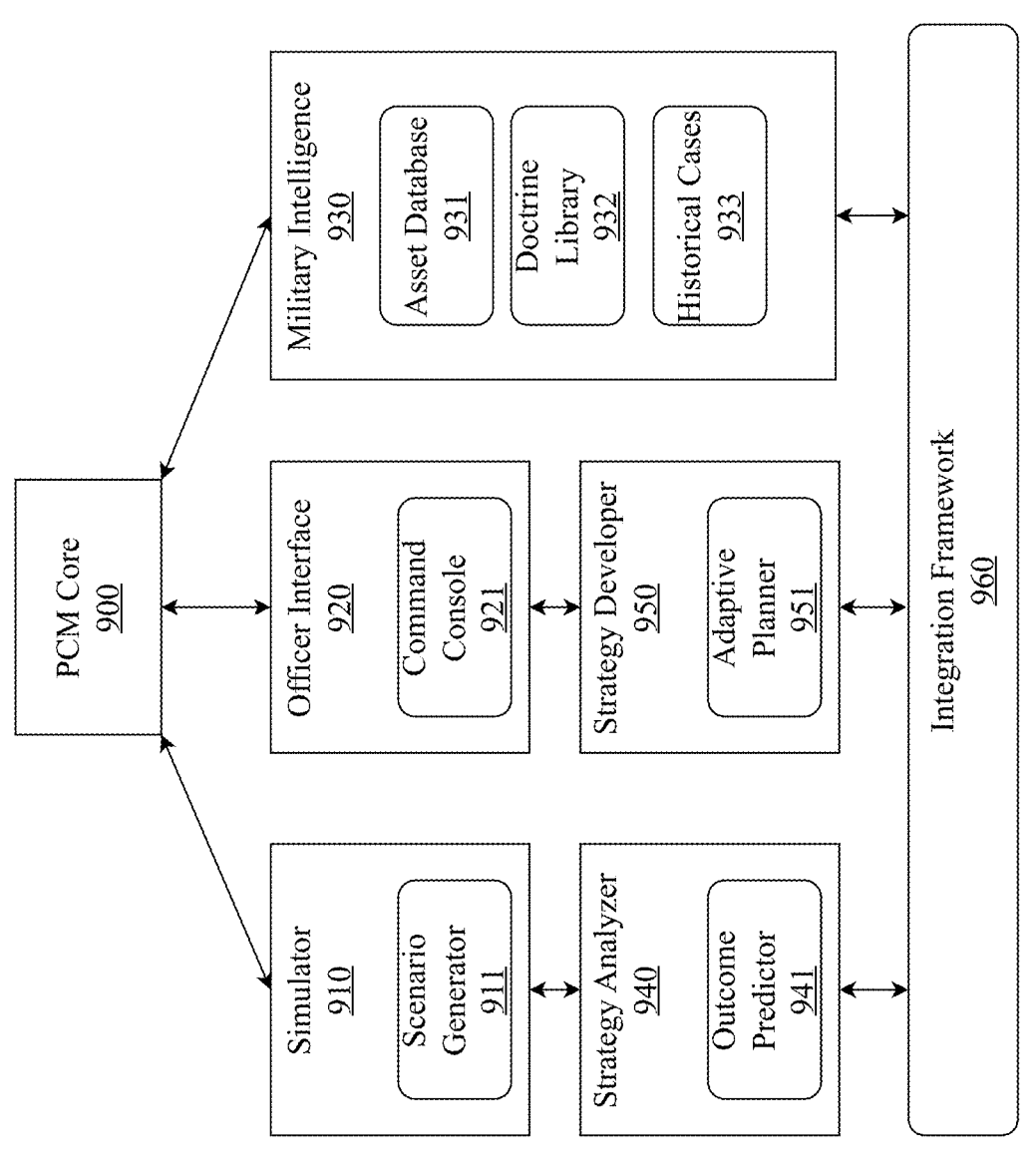
FIG. 9 is a block diagram illustrating an exemplary system architecture of a persistent cognitive machine platform that is used for strategic wargaming simulations.

FIG. 9 is a block diagram illustrating an exemplary system architecture of a persistent cognitive machine platform that is used for strategic wargaming simulations. A strategic wargaming platform implementation demonstrates how the persistent cognitive machine technology can be applied to military strategic planning and training contexts. This implementation leverages the platform's persistent cognition capabilities to create a system that can generate realistic scenarios, analyze strategic approaches, and develop adaptive planning based on accumulated experience and military knowledge.

At the foundation of this implementation is the PCM core 900, which incorporates all the fundamental components of the persistent cognitive machine platform, including the language model, reasoning model, executive core, thought cache, embedding system, persistence layer, and sleep manager. PCM core 900 provides the cognitive capabilities that enable a strategic wargaming platform to understand military contexts, reason about strategic scenarios, maintain persistent memory of simulations and outcomes, and continuously improve its analytical capabilities over time.

A simulator 910 generates and manages strategic scenarios for wargaming exercises. This component creates realistic simulations of military situations based on parameters provided by human officers and informed by historical data, current doctrine, and known asset capabilities. Simulator 910 provides the environmental context within which strategic planning and analysis occur, creating conditions that challenge officers to develop effective responses to complex situations.

Within the simulator, a scenario generator 911 creates specific scenario instances for wargaming exercises. This component can generate diverse scenarios across different domains (land, sea, air, space, cyber), scales (tactical to strategic), and contexts (conventional warfare, counterinsurgency, humanitarian operations, etc.). Scenario generator 911 ensures that scenarios are realistic, challenging, and aligned with training or analysis objectives. It can introduce unpredictable elements, resource constraints, and complex adversarial behaviors to enhance the realism and educational value of the simulations.

An officer interface 920 provides the means for military officers to interact with the Strategic Wargaming Platform. This component enables officers to configure scenarios, input strategic decisions, review analysis, and receive feedback. Officer interface 920 is designed to accommodate both individual officers and command teams, supporting collaborative strategic planning and decision-making. This interface may implement various access levels and role-based permissions appropriate to military hierarchy and operational security requirements.

Within the officer interface, a command console 921 serves as the primary interaction point for human officers. This specialized interface provides intuitive access to the platform's capabilities, allowing officers to issue commands, review situation reports, analyze intelligence, and assess strategic options. Command console 921 may implement visualizations appropriate to military contexts, such as tactical maps, asset disposition displays, timeline projections, and other specialized representations that support strategic decision-making.

An intelligence module 930 maintains comprehensive information about military assets, doctrine, and historical precedents. This component provides the factual foundation for realistic scenario generation and strategic analysis. Military intelligence module 930 continuously evolves as new information is incorporated, ensuring that simulations and analyses reflect current military realities.

Within the military intelligence module, an asset database 931 maintains detailed information about military capabilities across various forces, including specifications, performance characteristics, operational constraints, and deployment considerations. This information enables realistic modeling of military assets within simulations and informs strategic analysis based on actual capabilities rather than abstractions.

Supporting the asset database, a doctrine library 932 contains military doctrines, tactics, techniques, and procedures from various forces and time periods. This component enables the platform to generate scenarios and strategic analyses that reflect established military thinking while also identifying potential innovations or adaptations. Doctrine library 932 provides essential context for understanding why certain strategic approaches might be favored in particular situations based on established military principles.

Complementing these current resources, historical cases 933 is a repository of historical military operations, their contexts, strategies employed, and outcomes. This historical knowledge enables the platform to draw parallels between current scenarios and historical precedents, identifying potentially relevant lessons and considerations. Historical cases 933 provide empirical grounding for strategic analysis, allowing the platform to reference actual military experiences rather than purely theoretical models.

A strategy analyzer 940 evaluates strategic options within the context of specific scenarios. This component applies military principles, historical precedents, and analytical methodologies to assess the potential effectiveness, risks, and implications of different strategic approaches. Strategy analyzer 940 can evaluate multiple competing strategies within the same scenario, providing comparative analysis to support officer decision-making. Within the strategy analyzer, an outcome predictor 941 forecasts potential consequences of strategic decisions across multiple dimensions. This component projects how strategies might unfold over time, considering factors such as force effectiveness, resource consumption, territorial control, casualty rates, and other relevant metrics. Outcome predictor 941 may implement probabilistic approaches that acknowledge the inherent uncertainties in military operations, providing range estimates and confidence levels rather than deterministic predictions.

Working in conjunction with the strategy analyzer is a strategy developer 950, which generates and refines strategic options based on scenario parameters, available assets, mission objectives, and constraints. This component can propose novel strategic approaches that officers might not have considered, potentially identifying innovative solutions to complex military problems. Strategy developer 950 leverages the platform's accumulated experience across multiple wargaming exercises to continuously improve its strategic recommendations. Within the strategy developer, an adaptive planner 951 creates detailed plans that can evolve in response to changing conditions. This component recognizes that military operations rarely proceed exactly as planned and builds adaptability into strategic recommendations. Adaptive planner 951 identifies decision points, contingency options, and reconfiguration possibilities that enable strategic plans to remain effective even as circumstances change. This capability is particularly valuable for preparing officers to handle the uncertainties and friction inherent in military operations.

Integrating all these specialized components is an integration framework 960, which enables seamless information flow and coordination across the Strategic Wargaming Platform. This component ensures that scenarios, intelligence, strategic analyses, and officer inputs are properly synchronized and consistently represented throughout the system. Integration framework 960 may implement specialized protocols for military contexts, including security measures appropriate for classified information when deployed in sensitive environments.

In operation, the strategic wargaming platform provides a sophisticated environment for military training, strategy development, and analytical wargaming. Officers interact with the system through command console 921, configuring scenarios and providing strategic inputs. Simulator 910 generates detailed scenarios drawing on military intelligence 930 module for realistic parameters. Strategy analyzer 940 evaluates officer strategies while strategy developer 950 offers alternative approaches. Throughout this process, PCM core 900 provides persistent cognition capabilities that enable the platform to learn from each exercise, improving its scenario generation, analysis, and strategy development over time.

This implementation demonstrates the application of persistent cognitive machine technology to the domain of military strategic planning and training, a context that particularly benefits from the platform's ability to maintain continuity of cognition across multiple sessions and learn from accumulated experiences. The strategic wargaming platform represents a significant advancement over traditional wargaming systems, which typically lack the ability to develop increasingly sophisticated understanding based on their own operational history.

Figure 16A:
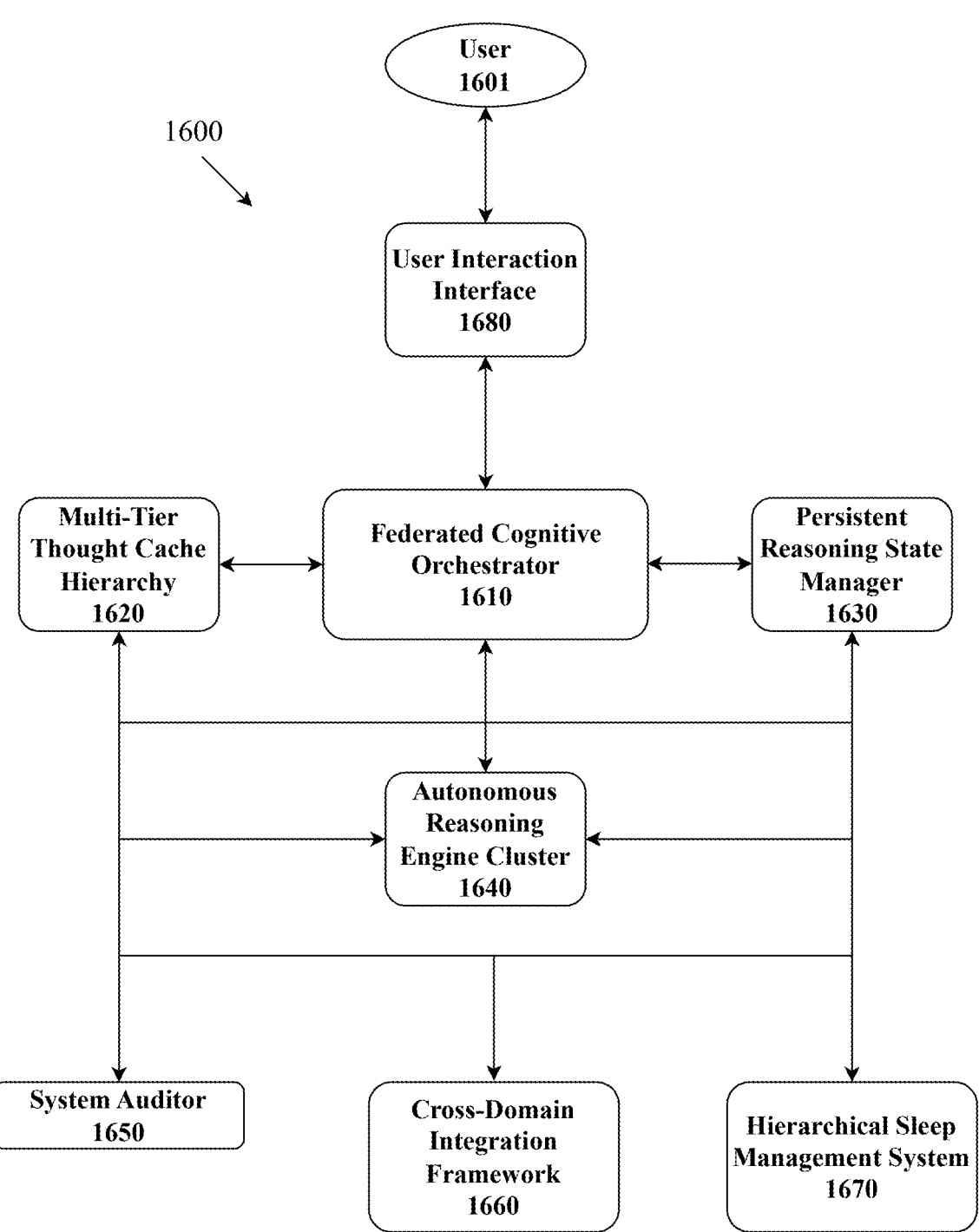
FIG. 16A is a block diagram illustrating exemplary architecture of federated persistent cognitive system, in an embodiment.

FIG. 16A is a block diagram illustrating exemplary architecture of federated persistent cognitive system 1600, in an embodiment. Federated persistent cognitive system 1600 builds upon mobile-optimized multi-stage LLM with autonomous reasoning, introducing components that enable domain-specialized processing and controlled knowledge sharing across a federation of cognitive instances. Federated persistent cognitive system 1600 represents an extension of mobile-optimized multi-stage LLM with autonomous reasoning capabilities through implementation of a distributed, collaborative architecture that enables specialized knowledge persistence across multiple domains while facilitating controlled knowledge sharing and collective intelligence.

Federated cognitive orchestrator 1610 serves as central coordination mechanism for federated persistent cognitive system 1600, managing interactions between all system components and determining optimal processing paths for user prompts. Federated cognitive orchestrator 1610 extends router and controller functionality from previous embodiments with additional capabilities for domain-specific routing and cross-instance coordination. When receiving user prompt, federated cognitive orchestrator 1610 analyzes prompt characteristics including contextual metadata, domain references, and complexity indicators to determine most appropriate processing path. Based on this analysis, federated cognitive orchestrator 1610 generates processing directives that specify which domain-specialized instances should process prompt, what resources should be allocated, and what coordination mechanisms should be implemented. These directives flow through bidirectional control channels that connect federated cognitive orchestrator 1610 with all other system components, enabling continuous monitoring and adjustment of system operations in response to changing requirements or resource conditions.

Multi-tier thought cache hierarchy 1620 extends three-tier thought caching architecture from previous embodiments with additional federation-specific layers that enable domain specialization while supporting controlled knowledge sharing. Multi-tier thought cache hierarchy 1620 implements graduated storage tiers with different access controls and privacy protections appropriate for various levels of thought sharing within federated architecture. When thoughts are generated through processing, multi-tier thought cache hierarchy 1620 classifies them based on privacy requirements, domain specificity, and sharing potential, then stores them in appropriate cache tiers. Bidirectional cache access channels connect multi-tier thought cache hierarchy 1620 with other system components, enabling efficient thought retrieval while enforcing appropriate access controls. These channels support both query operations that retrieve relevant thoughts based on semantic similarity and storage operations that add newly generated thoughts to appropriate cache locations.

Persistent reasoning state manager 1630 ensures continuity of reasoning processes across sessions, devices, and time periods through comprehensive state capture, preservation, and restoration mechanisms. Persistent reasoning state manager 1630 extends cross-device cognitive continuity with enhanced capabilities for long-term state maintenance and federated state sharing. When cognitive state transitions occur (whether due to session termination, device switching, or domain handoff) persistent reasoning state manager 1630 captures comprehensive state representation including active reasoning chains, context windows, and exploration directions. This state information flows through bidirectional state channels that connect persistent reasoning state manager 1630 with other system components, enabling seamless state transitions and context preservation across system operations.

Autonomous reasoning engine cluster 1640 comprises multiple domain-specialized instances of autonomous reasoning engine, each optimized for particular knowledge domains or reasoning frameworks. Each instance within autonomous reasoning engine cluster 1640 maintains domain-specific models, terminology, and reasoning patterns while operating within federated architecture. When federated cognitive orchestrator 1610 routes prompt to appropriate domain instance, autonomous reasoning engine cluster 1640 processes prompt using specialized knowledge and reasoning approaches. Generated thoughts flow through bidirectional thought channels connecting autonomous reasoning engine cluster 1640 with other system components, enabling both immediate response generation and longer-term knowledge development. These channels support transmission of both explicit reasoning outputs for immediate use and intermediate thought patterns for storage and future refinement.

System auditor 1650 continuously monitors operations across entire federated architecture, analyzing patterns, identifying optimization opportunities, and generating performance insights. System auditor 1650 extends dream-state processing system from previous embodiments with cross-domain analysis capabilities and federation-wide optimization mechanisms. System auditor 1650 collects operational data from all system components through bidirectional monitoring channels, enabling comprehensive assessment of system performance and identification of improvement opportunities. Based on observed patterns, system auditor 1650 generates optimization targets and enhancement recommendations that flow back through these same channels to relevant components, creating continuous improvement cycle throughout federated architecture.

Cross-domain integration framework 1660 enables controlled knowledge sharing between specialized domains while maintaining appropriate isolation boundaries and privacy protections. Cross-domain integration framework 1660 extends enhanced privacy architecture 2200 from previous embodiments with domain-specific boundaries and federation-level access controls. When knowledge transfer opportunities arise between domains, cross-domain integration framework 1660 evaluates potential transfer against established rules, permissions, and privacy requirements. Approved transfers flow through bidirectional integration channels connecting cross-domain integration framework 1660 with other system components, enabling controlled knowledge sharing while preventing inappropriate information leakage across domain boundaries. These channels implement graduated access controls that vary based on sensitivity classification, domain relationships, and explicit sharing permissions.

Hierarchical sleep management system 1670 coordinates optimization processes during system idle periods across all domains and components within federated architecture. Hierarchical sleep management system 1670 extends dream-state processing flow from previous embodiments with federation-wide coordination capabilities and staggered transition management. When system detects appropriate conditions for optimization processes-such as extended user inactivity or scheduled maintenance periods-hierarchical sleep management system 1670 orchestrates transitions to optimization mode through bidirectional sleep control channels connecting hierarchical sleep management system 1670 with other system components. These channels enable coordination of staggered transitions that maintain minimal operational capability while maximizing optimization efficiency, preventing system-wide unavailability during deep optimization processes.

User interaction interface 1680 provides access points through which users engage with federated persistent cognitive system 1600 across various devices and interaction modalities. User interaction interface 1680 extends mobile user interface with enhanced capabilities for multi-device operation and domain-aware interactions. When user initiates interaction through any connected device, user interaction interface 1680 captures input through appropriate modality—such as text, voice, or multimodal communication—and formats it for processing by federated architecture. User prompts flow through bidirectional user channels connecting user interaction interface 1680 with federated cognitive orchestrator 1610, enabling transmission of both explicit inputs and contextual metadata that aids appropriate processing. These same channels carry system responses back to user, formatted appropriately for current device capabilities and interaction context.

In operation, federated persistent cognitive system 1600 processes user interactions through coordinated activity across all system components. When user 1601 submits prompt through user interaction interface 1680, federated cognitive orchestrator 1610 analyzes prompt characteristics and determines optimal processing path across domain-specialized instances within autonomous reasoning engine cluster 1640. Selected instance processes prompt with assistance from domain-appropriate thoughts retrieved from multi-tier thought cache hierarchy 1620 and contextual understanding provided by persistent reasoning state manager 1630. Generated response returns to user through user interaction interface 1680, while new thoughts store in appropriate levels of multi-tier thought cache hierarchy 1620 based on privacy requirements and sharing potential.

During periods of user inactivity, system transitions to optimization mode under coordination of hierarchical sleep management system 1670. In this mode, system auditor 1650 identifies improvement opportunities across federation while autonomous reasoning engine cluster 1640 continues exploration of promising knowledge pathways. Cross-domain integration framework 1660 facilitates controlled knowledge sharing between specialized domains, enabling collective intelligence while maintaining appropriate boundaries.

Through this integrated architecture, federated persistent cognitive system 1600 transforms from responsive tool to persistent cognitive partnership with specialized domain expertise and controlled collective intelligence, maintaining mobile optimization benefits while enabling sophisticated federation-wide reasoning capabilities.

Federated persistent cognitive system maintains robust offline functionality across domain-specialized instances, extending capabilities from previous embodiments with federation-aware caching strategies. Domain branch cache maintains locally available copies of frequently accessed domain-specific thoughts, prioritized based on user interaction patterns and predicted future needs. When network connectivity becomes unavailable, system continues processing through local domain instances using cached domain knowledge without requiring cloud access. Offline operation includes capability to process prompts through locally available specialized domains, generate domain-appropriate responses, and store newly created thoughts for later synchronization. When connectivity resumes, hierarchical synchronization protocols efficiently update both local and cloud-based components with thoughts generated during disconnected operation, resolving potential conflicts through timestamp-based versioning and semantic relevance assessment.

Mobile optimization remains central to federated persistent cognitive system despite increased architectural complexity. Domain-specific processing adapts dynamically to device resource constraints through intelligent scheduling that considers battery state, processing capacity, and memory availability. Battery-aware execution extends to federation operations through workload distribution mechanisms that shift resource-intensive processing to cloud environment when battery levels are constrained, while keeping essential domain-specific reasoning available locally. Resource optimization controller coordinates with both domain orchestrators and sleep management system to implement appropriate processing profiles based on current device state, ensuring domain specialization benefits do not compromise energy efficiency. Each domain instance implements progressive loading of specialized knowledge based on immediate relevance, avoiding unnecessary resource consumption by maintaining small active memory footprint focused on current interaction context.

Privacy protection across federated architecture implements sophisticated layered approach beyond foundational safeguards from previous embodiments. Personal cognitive space remains strictly isolated from domain-specific knowledge through cryptographic boundaries and permission-based access controls. When thoughts are considered for promotion from personal to domain level, privacy classifier implements conservative filtering that removes all user-identifying information while preserving essential reasoning patterns. Domain-level thoughts maintain provenance metadata without user attribution, enabling quality assessment without compromising privacy. Federation-level privacy orchestrator continuously monitors knowledge flows between domains, applying stricter evaluation criteria for cross-domain transfers than for intra-domain operations. User maintains explicit control over privacy boundaries through preference settings that can restrict specific knowledge areas from participating in domain-level sharing regardless of anonymization potential.

Conflict resolution between domain-specialized instances employs sophisticated arbitration mechanisms when multiple domains provide divergent responses to similar prompts. When federated cognitive orchestrator identifies potential response conflicts across domains, conflict harmonization process evaluates response differences based on domain authority, reasoning quality, evidence strength, and consistency with established knowledge. Resolution approaches vary based on conflict type, implementing different strategies for factual disagreements versus methodological or theoretical variations. In some cases, system may present multiple domain perspectives with clear attribution and confidence indicators, allowing user to evaluate competing viewpoints. Persistent reasoning state manager tracks conflict patterns over time, identifying recurring disagreements that may indicate fundamental domain boundary issues requiring adjustment or creation of intermediary bridge domains.

Dynamic domain evolution enables federated architecture to adapt specialized capabilities over time based on usage patterns and knowledge development. Domain formation controller continuously analyzes interaction history to identify emerging knowledge clusters that might benefit from specialized processing. When sufficient pattern density accumulates in particular subject area, system may propose new domain specialization, initializing domain-specific components with relevant knowledge structures from parent domains. Existing domains continuously refine boundaries through border adjustment protocols that optimize specialization effectiveness while preventing unhelpful fragmentation. Domain retirement mechanisms identify and gracefully decommission specialized instances that no longer demonstrate sufficient utility, carefully preserving valuable knowledge through controlled migration to adjacent domains. Throughout evolution process, system maintains knowledge continuity while allowing specialization structure to adapt to changing requirements.

Recovery mechanisms within federated architecture implement multi-layered approach to system resilience across domain boundaries. State preservation extends beyond basic continuity to include comprehensive checkpoint systems that maintain recoverable snapshots across federation. When interruptions occur in specific domain instances, state reconstruction protocols activate to rebuild cognitive context from preserved state records, ensuring reasoning continuity despite temporary component unavailability. Domain redundancy mechanisms maintain essential capabilities even when primary specialized instances become inaccessible, implementing graceful degradation that preserves core functionality while potentially reducing specialization depth. Federation-wide recovery coordinator manages restoration processes across domains, prioritizing critical knowledge paths while deferring less essential recovery operations to minimize user-visible disruption.

User control over domain specialization enables collaborative direction of cognitive development across federation. Domain influence mechanisms allow users to explicitly prioritize specific knowledge areas for enhanced specialization, steering system resources toward particular capabilities. Feedback integration pathways analyze user engagement patterns with domain-generated responses, identifying areas where specialization either enhances or fails to improve interaction quality. Domain transparency features provide visibility into specialization boundaries and knowledge areas, enabling informed decisions about how personal queries might benefit from specific domain expertise. Throughout interaction history, system builds personalized domain affinity profiles that capture individual preferences for different specialized capabilities, adaptively routing future prompts to preferred domains when multiple processing paths could apply. Federated adaptation across diverse device ecosystems implements sophisticated rendering and interaction adjustments while maintaining consistent domain knowledge. When users interact through smartphones, tablets, desktop computers, or specialized devices, federation-aware display adaptation modifies presentation layers while preserving underlying domain reasoning capabilities. Voice-centric interaction modes adapt domain terminology to conversational patterns, while visual interfaces leverage richer display capabilities for knowledge visualization across domains. Domain-specific terminology adapts dynamically to match interaction modality constraints, simplifying complex domain concepts for limited interfaces while maintaining precision in knowledge-rich environments. Cross-device domain continuity ensures specialized reasoning remains consistent despite presentation differences, maintaining cognitive thread across different interaction surfaces through persistent state mechanisms. Each domain instance includes modality-specific presentation variants optimized for different device capabilities, selecting appropriate interaction paradigms based on available resources while preserving specialized knowledge integrity.

Security mechanisms throughout federated architecture implement defense-in-depth strategies beyond basic privacy controls. Domain isolation protocols establish cryptographic boundaries between specialized instances, preventing unauthorized access across domain boundaries even in case of component compromise. Federation-level threat detection monitors knowledge flow patterns across domains, identifying anomalous requests or unusual cross-domain transfers that might indicate attempted manipulation. Domain knowledge authentication verifies integrity of specialized content through cryptographic signatures that prevent unauthorized modification or injection of misleading information into domain caches.

Adversarial input detection identifies potential attempts to manipulate domain reasoning through carefully crafted prompts, implementing additional verification steps when suspicious patterns are detected. Security posture adapts dynamically based on sensitivity of domain knowledge and interaction context, implementing graduated controls proportional to potential impact of security breaches in different specialized areas.

Versioning and compatibility across domains address challenges of asynchronous evolution through federation-wide coordination mechanisms. Domain knowledge representation implements backward-compatible formats ensuring older specialized instances can process thoughts from newer domains through graceful capability degradation. Cross-domain translation layers handle version differences by maintaining compatibility mappings between different domain reasoning approaches. Federation-level compatibility registry tracks version relationships across specialized instances, ensuring appropriate translation occurs when thoughts traverse domain boundaries with different evolution stages. When significant version disparities arise, knowledge bridging processes transform incompatible representations to maintain interoperability without requiring immediate domain-wide updates. Throughout uneven evolution, federation maintains operational coherence despite varying development speeds across specialized domains through sophisticated version management.

Regulatory compliance across jurisdictional boundaries implements geography-aware operation while maintaining federation capabilities. Location-aware processing determines applicable regulatory frameworks based on user location, domain server location, and data storage jurisdiction. Domain-specific compliance modules adapt knowledge sharing behaviors to align with regional requirements, implementing appropriate data residency, access controls, and processing limitations based on applicable regulations. Cross-border knowledge transfer includes compliance verification that validates regulatory compatibility before allowing information flow between domains operating under different jurisdictional requirements. Data sovereignty boundaries establish appropriate limitations on domain federation across regulatory environments, ensuring each specialized instance operates within compliance parameters for its applicable jurisdiction. Federation architecture supports appropriate regionalization of both domain specialization and knowledge storage while maintaining coordination benefits appropriate to regulatory context.

Knowledge acquisition and integration mechanisms enable continuous domain evolution through multiple learning pathways. Specialized domains continuously update knowledge bases through structured integration processes that evaluate new information against existing domain understanding. Domain-specific learning rates vary based on knowledge stability and development pace in different fields, with rapidly evolving domains implementing more frequent update cycles than stable knowledge areas. Federation-level knowledge coordination ensures cross-domain consistency during update processes, preventing contradictory information from creating reasoning conflicts between specialized instances. User interaction provides valuable feedback for domain knowledge refinement, with successful reasoning patterns receiving positive reinforcement through usage statistics. Throughout knowledge evolution, federation maintains appropriate version control enabling rollback capabilities if updated information proves problematic while preserving successful reasoning patterns across specialization boundaries.

Figure 16B:
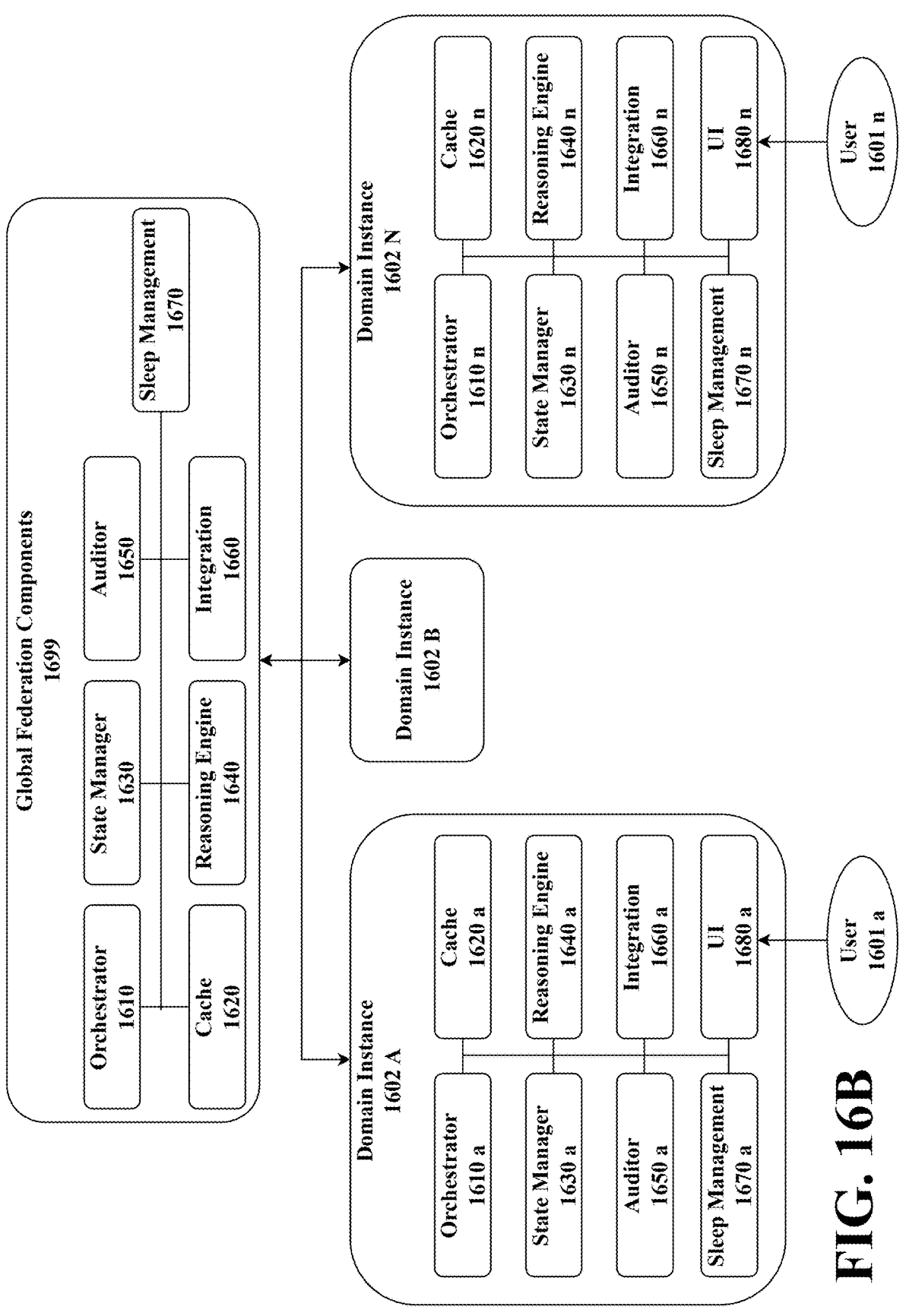
FIG. 16B is a block diagram illustrating federated domain architecture of federated persistent cognitive system, in an embodiment.

FIG. 16B is a block diagram illustrating federated domain architecture of federated persistent cognitive system 1600, in an embodiment. This horizontal representation highlights the parallel operation of multiple domain-specialized instances within integrated federated framework.

Domain instances 1602 A, B, and N represent parallel specialized processing units focused on distinct knowledge areas. Each domain instance contains its own complete set of components, including domain-specific federated cognitive orchestrator 1610a-n, domain-specific persistent reasoning state manager 1630a-n, domain-specific autonomous reasoning instance 1640a-n, domain-specific system auditor 1650a-n, domain-specific cross-domain integration framework 1660*a-n*, domain-specific hierarchical sleep management system 1670*a-n*, domain-specific user interaction interface 1680*a-n*, and domain-specific branch cache 2420*a-n*. These components enable specialized processing while maintaining integration with broader federation.

While each domain instance contains its complete set of components (1610*a-n* through 1680*a-n*), the federated persistent cognitive system 1600 also maintains global federation components 1699 (for example, 1610, 1630, 1650, 1670) that operate across the entire federation. These central components facilitate cross-domain operations, ensure system-wide consistency, and manage collective knowledge sharing. federated cognitive orchestrator 1610 coordinates processing across domain instances, persistent reasoning state manager 1630 maintains cognitive continuity between domains, system auditor 1650 identifies optimization opportunities throughout the federation, and hierarchical sleep management system 1670 coordinates system-wide optimization processes. This multi-layer architecture balances domain specialization with federation-wide coordination, enabling both deep domain-specific expertise and sophisticated cross-domain reasoning capabilities. In various embodiments, the global aspects of federated persistent cognitive system 1600 may directly observe, control or modify domain-specific systems, establishing protocols and interfaces that allow domains to share knowledge and coordinate activities while maintaining their specialized expertise and operational independence. These aspects may also be hierarchical in nature, allowing the system to modulate and dedicate tiers to various background activities, such as learning, analyzing, or comparing aspects such as optimizations between domains, usage patterns, and/or performance metrics across the federation. The central components may implement adaptive governance models that evolve based on observed effectiveness, automatically adjusting the balance between domain autonomy and centralized coordination to maximize both specialized expertise development and collective intelligence capabilities. This dynamic equilibrium enables the system to continuously refine its operational structure, strengthening domain boundaries where specialized knowledge development benefits from isolation while enhancing cross-domain pathways where collaborative insights generate superior reasoning outcomes. Through this sophisticated interplay between specialized domain instances and federation-wide coordination, the system achieves cognitive capabilities that transcend what would be possible through either isolated specialization or undifferentiated generalization alone.

Domain instances 1602 A-N represent various organizational structures depending on implementation context. For example, domains may represent distinct service provider instances where each provider maintains specialized expertise in particular fields while participating in broader knowledge federation. In corporate environments, domains might correspond to departments within organization, such as research and development, customer support, and strategic planning, each developing specialized knowledge while benefiting from controlled cross-department insights. Within conglomerates or multinational corporations, domains could represent different business units or regional operations, maintaining specialized market knowledge while sharing applicable insights across corporate boundaries. In educational contexts, domains might represent different academic disciplines, each maintaining specialized scholarly understanding while facilitating interdisciplinary connections. Healthcare implementations might establish domains for different medical specialties, enabling focused expertise development while supporting multidisciplinary patient care through controlled knowledge sharing.

The designation of Domain N specifically indicates extensibility of federation architecture, illustrating that system supports arbitrary number of specialized domains based on implementation requirements. New domains can be added to federation as needs evolve, with each new domain maintaining appropriate boundaries while participating in collective intelligence through established sharing mechanisms.

Connections between components illustrate data flow throughout federated architecture. Central components connect bidirectionally with each domain instance, providing coordination and management services. Cache structure maintains connections to all domains while implementing graduated access controls between cache tiers. Cross-domain integration frameworks connect between domains through controlled interfaces represented by dotted lines, enabling selective knowledge sharing while maintaining appropriate isolation boundaries.

This federated architecture enables specialized knowledge development within distinct domains while facilitating collaborative intelligence through controlled sharing mechanisms. Multiple domain instances operate in parallel with coordinated central management, creating system that combines benefits of specialization with collective intelligence capabilities. The architecture supports extensibility through addition of new domain instances while maintaining consistent operation through centralized coordination components.

The system balances needs for domain specialization with benefits of collective intelligence by implementing sophisticated knowledge sharing mechanisms with appropriate privacy safeguards and access controls. This balance enables organization to develop deep expertise within specialized domains while leveraging insights across boundaries where appropriate, creating more sophisticated reasoning capabilities than would be possible through either isolated specialization or undifferentiated general models.

In an embodiment, data flow through federated persistent cognitive system 1600 follows distinct patterns that enable sophisticated processing across domain boundaries while maintaining appropriate privacy protections and specialization.

When a user 1601*a-n* submits a prompt through user interaction interface 1680*a-n*, the initial flow begins with federated cognitive orchestrator 1610*a-n* analyzing the prompt characteristics. The orchestrator examines content, context, and complexity indicators to determine optimal processing paths. Based on this analysis, the orchestrator generates processing directives that specify which domain-specialized instances should handle the prompt and what resources should be allocated.

For prompts requiring specialized domain knowledge, the federated cognitive orchestrator 1610*a-n* routes processing to the appropriate domain instance within autonomous reasoning engine cluster 1640*a-n*. The selected domain instance processes the prompt using domain-optimized knowledge and reasoning patterns. Meanwhile, persistent reasoning state manager 1630*a-n* ensures continuity by maintaining cognitive context throughout this processing, preserving relevant history and active reasoning chains regardless of which domain handles the interaction.

In parallel with prompt routing, federated cognitive orchestrator 1610*a-n* queries multi-tier thought cache hierarchy 1620*a-n* for relevant thoughts that might assist in prompt processing. This query flows through multiple cache tiers with graduated privacy protections.

The system first checks local user cache 1710*a-n* for personally relevant thoughts with appropriate privacy protections. If no suitable matches exist or additional context is needed, the query extends to branch instance cache 1720*a-n* for domain-specific knowledge, executive cache 1730*a-n* for cross-domain insights, and potentially global collective cache 1740 for universally applicable thought patterns.

When thoughts are retrieved from various cache tiers, tier access controls 1750*a-n* enforce appropriate privacy boundaries, ensuring that sensitive information remains protected while enabling controlled knowledge sharing. Retrieved thoughts combine with the original prompt and flow to the selected domain instance for processing. The domain instance generates additional thoughts specific to current context, which then merge with cached thoughts to create comprehensive understanding.

After thought generation and integration, processing results flow back through federated cognitive orchestrator 1610*a-n* to user interaction interface 1680*a-n*, completing the immediate response cycle. Simultaneously, newly generated thoughts flow to classification and transformation system 1760*a-n*, which analyzes their characteristics to determine appropriate storage locations within multi-tier thought cache hierarchy 1620*a-n*. Thoughts containing personal information store in local user cache 1710*a-n*, domain-specific insights in branch instance cache 1720*a-n*, cross-domain knowledge in executive cache 1730*a-n*, and universally applicable patterns in global collective cache 1740.

Throughout active processing, system auditor 1650*a-n* monitors data flows across the federation, gathering performance metrics and identifying optimization opportunities. This monitoring data flows to both federated cognitive orchestrator 1610 for immediate adjustments and hierarchical sleep management system 1670*a-n* for deferred optimization during system idle periods.

During periods of user inactivity, hierarchical sleep management system 1670*a-n* initiates optimization processes across the federation. These processes generate background data flows that reorganize thought cache structures, consolidate related insights, and generate novel connections between previously separate knowledge domains. Cross-domain integration framework 1660*a-n* manages these integration flows, ensuring that knowledge sharing occurs through controlled interfaces that maintain appropriate isolation boundaries while enabling valuable cross-domain insights.

The data flow architecture of federated persistent cognitive system 1600 enables continuous knowledge development across specialized domains while facilitating controlled sharing through graduated privacy protections, creating a system that combines deep domain expertise with broader collective intelligence.

Figure 16C:
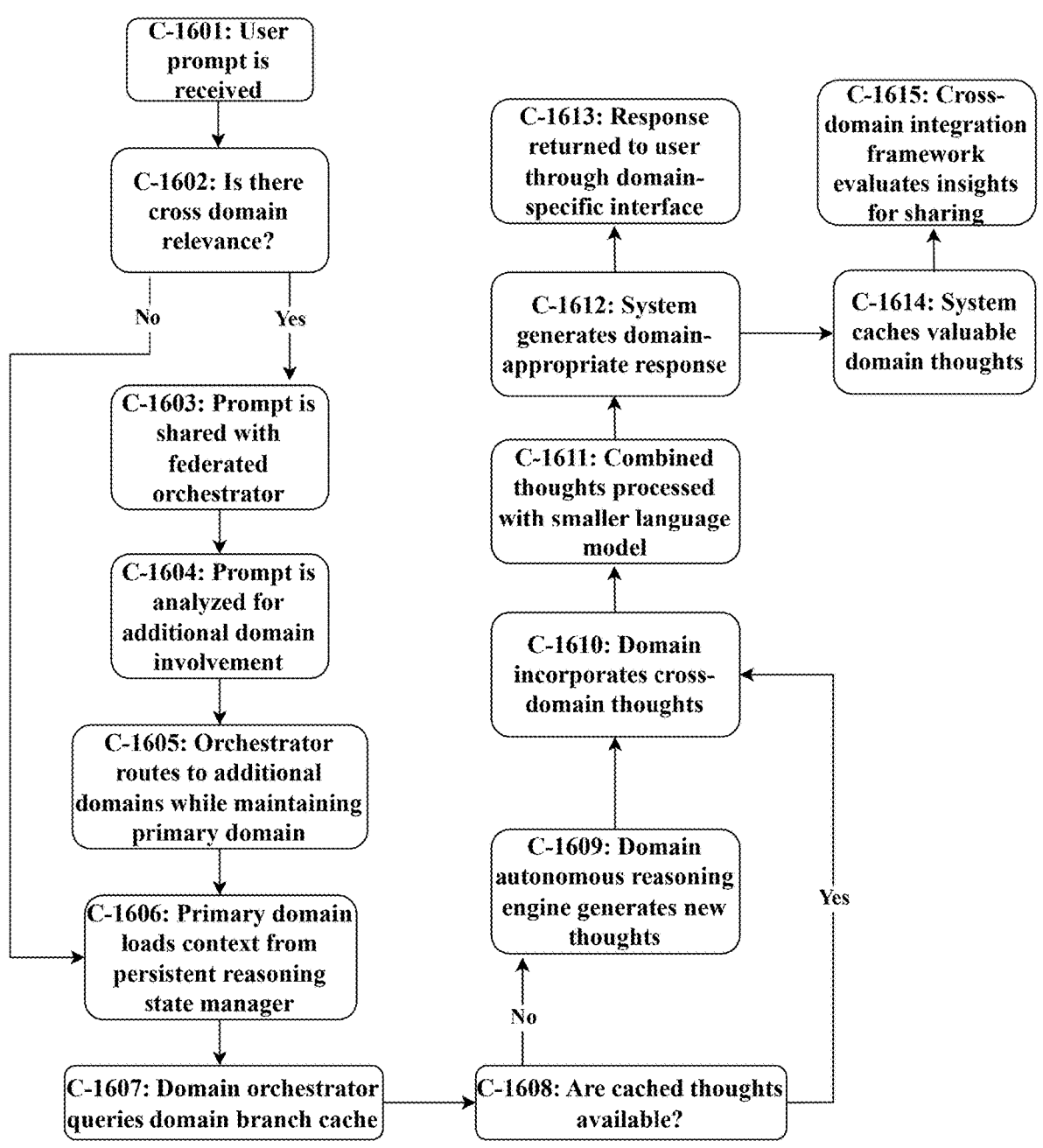
FIG. 16C is a flow diagram illustrating the federated prompt processing flow of federated persistent cognitive system, in an embodiment.

FIG. 16C is a flow diagram illustrating the federated prompt processing flow of federated persistent cognitive system 1600, in an embodiment. The process begins when a user submits a prompt through a domain-specific user interface 1680*a-n*, directly engaging with their specialized domain instance C-1601. The domain cognitive orchestrator 1610*a-n* initially processes this prompt, but also evaluates whether the request might benefit from federation-level processing or cross-domain knowledge C-1602. If the domain orchestrator determines the prompt is best handled entirely within the domain, it proceeds with domain-specific processing, but if cross-domain relevance is detected, the prompt is shared with the federated cognitive orchestrator 1610 for broader coordination C-1603. The federated orchestrator analyzes the shared prompt to determine if additional domains should contribute to processing, examining factors such as subject matter overlap, interdisciplinary requirements, and potential knowledge from other domains C-1604. Based on this analysis, the orchestrator may route aspects of the prompt to additional domain-specialized instances such as domain B or domain N, while maintaining the originating domain A as the primary processing domain C-1605. The primary domain orchestrator 1610*a-n* prepares for processing by loading the relevant domain context from the persistent reasoning state manager 1630*a-n*, ensuring continuity with previous interactions in this specialized field C-1606. The domain orchestrator queries the domain branch cache to determine if relevant domain-specific thoughts are already available for this prompt type, potentially reducing computational requirements by leveraging previously generated reasoning patterns C-1607. If suitable cached thoughts are available, the system retrieves these domain-specialized thoughts from the branch instance cache, prioritizing those with highest relevance to the current prompt C-1608. If no suitable cached thoughts exist, the domain autonomous reasoning engine 1640*a-n* generates new domain-specific thoughts using its specialized knowledge and reasoning patterns optimized for its particular knowledge domain C-1609. The domain orchestrator also incorporates any relevant cross-domain thoughts received from other domains if the federated orchestrator determined their involvement was beneficial C-1610. The combined thoughts are then processed alongside the original prompt through the smaller language model, maintaining the efficient dual-model approach while leveraging both domain specialization and federation benefits C-1611. The system generates a domain-appropriate response based on the processed thoughts and prompt, incorporating specialized terminology, frameworks, and reasoning approaches unique to this knowledge domain while integrating relevant insights from other domains C-1612. The final response is returned to the user through the domain-specific interface from which the prompt originated, completing the immediate interaction cycle while preserving context for future continuity C-1613.

Simultaneously with response delivery, the system caches valuable domain thoughts for future reuse, storing them in the appropriate tier of the domain branch cache 1720*a-n* based on privacy requirements and reuse potential C-1614. If cross-domain insights were generated during processing, the domain cross-domain integration framework 1660*a-n* evaluates these for sharing with the broader federation, applying appropriate privacy filters and generalizations before distribution C-1615.

Figure 17:
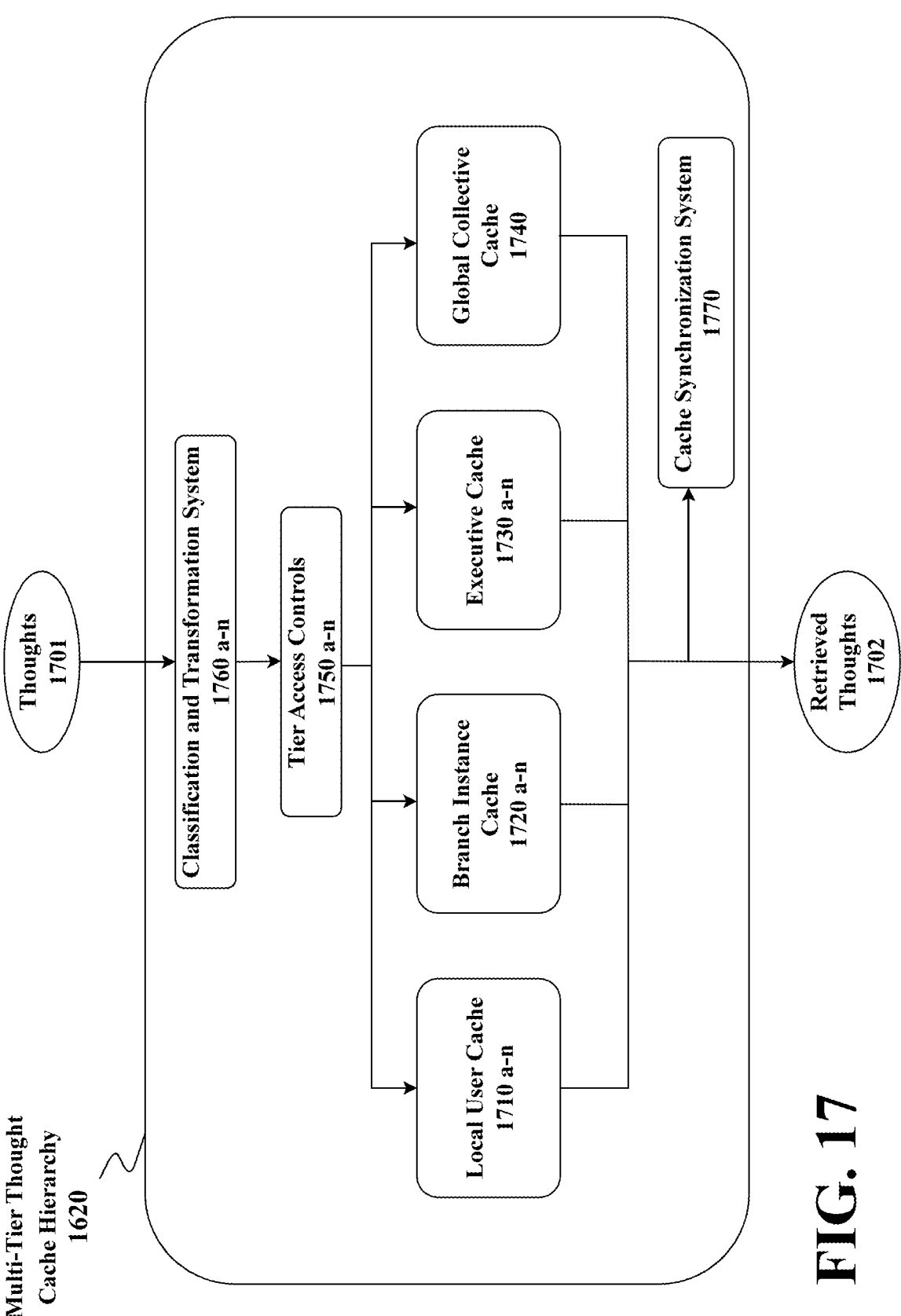
FIG. 17 is a block diagram illustrating exemplary architecture of multi-tier thought cache hierarchy, in an embodiment.

FIG. 17 is a block diagram illustrating exemplary architecture of multi-tier thought cache hierarchy 1620, in an embodiment. Multi-tier thought cache hierarchy 1620 extends the three-tier thought caching architecture 1200 from previous embodiments with additional federation-specific layers that enable domain specialization while supporting controlled knowledge sharing within federated persistent cognitive system 1600.

Multi-tier thought cache hierarchy 1620 receives input thoughts or thought queries 1701 from autonomous reasoning engine cluster 1640 and provides retrieved thoughts 1702 in response to queries from federated cognitive orchestrator 1610. Within this bidirectional flow, newly generated thoughts enter the system for classification and storage, while relevant cached thoughts are retrieved to support reasoning processes across the federation.

Local user cache 1710 represents the most private tier of multi-tier thought cache hierarchy 1620, storing thoughts that contain personally identifiable information, user-specific context, or sensitive content that should not be shared beyond individual user environment. Local user cache 1710 typically resides primarily on user devices with selective synchronization to encrypted cloud storage, enabling both offline functionality and cross-device consistency while maintaining strict privacy boundaries.

Branch instance cache 1720 provides domain-specialized storage that maintains thoughts relevant to specific knowledge domains or professional disciplines without containing personally identifiable information. Branch instance cache 1720 typically operates as a distributed system with components residing on both user devices and cloud infrastructure, allowing domain-specific knowledge to benefit multiple users working within the same specialized area while maintaining appropriate access controls.

Executive cache 1730 facilitates controlled knowledge sharing between related domain branches within the federated architecture, storing cross-domain thoughts that connect multiple specialized areas through common principles or analogical relationships. Executive cache 1730 typically operates primarily in cloud environment with selective synchronization to user devices based on relevance and resource availability.

Global collective cache 1740 represents the most broadly shared tier of multi-tier thought cache hierarchy 1620, storing fully anonymized thought patterns with universal applicability across all domains and users. Global collective cache 1740 operates as centralized cloud-based repository with carefully controlled contribution mechanisms to ensure quality and applicability of shared thought patterns.

Tier access controls 1750 manage the flow of information between cache tiers, implementing graduated permissions that determine which thoughts can move between tiers and which system components can access thoughts at each level. Tier access controls 1750 ensure that privacy boundaries remain intact while enabling controlled knowledge sharing across the federation.

Classification and transformation system 1760 analyzes incoming thoughts 1701 to determine appropriate storage locations and creates modified versions suitable for higher sharing tiers. This system identifies personally identifiable information requiring protection, determines domain relevance, and generates appropriately transformed versions that preserve essential reasoning patterns while removing sensitive content.

Cache synchronization system 1770 manages data transfer between distributed storage locations across the federation, implementing efficient protocols that prioritize high-value thoughts during limited connectivity while ensuring consistency across the system. Cache synchronization system 1770 coordinates with communication infrastructure 1690 to optimize data transfer based on network conditions and device states.

In one embodiment, multi-tier thought cache hierarchy 1620 may incorporate various machine learning models to enhance functionality. For example, classification and transformation system 1760 may utilize transformer-based natural language understanding models to analyze thought content for privacy implications and domain relevance. These models may be trained on large corpora of text with privacy annotations and domain categorizations, enabling accurate classification of new thoughts into appropriate privacy categories and domain alignments. Training data may, for example, include synthetic examples of personal information embedded in various contexts, allowing models to learn identification patterns without exposure to actual private data.

The system may also implement generative models that create anonymized versions of thoughts while preserving essential reasoning patterns. These models may be trained through contrastive learning approaches where pairs of thoughts—original and properly anonymized versions—are used to teach transformation patterns that preserve utility while removing identifying information. Training data might include, for example, professional documents with personally identifiable information systematically removed according to privacy best practices.

For retrieval operations, the system may utilize dense retrieval models that encode thoughts as high-dimensional vectors capturing semantic meaning rather than surface text characteristics. These models may, for example, be trained through self-supervised learning approaches where thoughts appearing in similar contexts are encoded with similar vector representations, enabling retrieval based on conceptual similarity rather than lexical matching.

In operation, data flows through multi-tier thought cache hierarchy 1620 according to specific patterns designed to maximize utility while preserving privacy and domain integrity. When autonomous reasoning engine cluster 1640 generates new thoughts, classification and transformation system 1760 analyzes each thought to determine appropriate storage location. Thoughts containing personal information are directed to local user cache 1710, while domain-specific thoughts are routed to appropriate branch instance cache 1720.

For thoughts with potential utility beyond their original context, the system creates modified versions with different privacy and generalization characteristics. These transformed thoughts flow to executive cache 1730 or global collective cache 1740 based on their generalizability, creating knowledge resources available across domains or throughout the entire system.

When federated cognitive orchestrator 1610 processes a new prompt, the system identifies relevant thoughts across all accessible cache tiers. Retrieved thoughts 1702 are then passed to autonomous reasoning engine cluster 1640 for incorporation into the response generation process.

Throughout operation, tier access controls 1750 ensure appropriate boundary enforcement, preventing unauthorized access to protected thoughts while enabling controlled sharing of generalizable content. Cache synchronization system 1770 maintains consistency across distributed storage locations, implementing selective synchronization that prioritizes high-value thoughts during constrained connectivity conditions. Through these coordinated operations, multi-tier thought cache hierarchy 1620 enables sophisticated knowledge sharing across the federation while maintaining essential privacy protections and domain boundaries.

Detailed Description of Exemplary Aspects

FIG. 10 is a flow diagram illustrating an exemplary method for a persistent cognitive machine platform. In a first step 1000, the system initializes the persistent cognitive state with core language and reasoning capabilities. This initialization process may include loading pre-trained language and reasoning models that provide the foundation for the system's cognitive abilities. The initialization may involve configuring model parameters appropriate to the specific deployment context, establishing initial state variables for the executive core, and preparing the thought cache data structures. For a new PCM instance, this initialization creates the basic cognitive framework, while for restarting an existing instance, this step ensures that the fundamental processing capabilities are properly established before restoring the persisted cognitive state. The initialization may also include system health checks, resource allocation, and establishment of connectivity with external interfaces.

In a step 1010, the system monitors continuously for external stimuli or internal thought triggers. This monitoring process represents a fundamental departure from traditional prompt-response AI systems, as the PCM actively watches for inputs from multiple sources rather than passively awaiting a single prompt. External stimuli may include user messages, document uploads, sensor data, API calls, or other inputs from outside the system. Internal thought triggers may include scheduled tasks, associations generated by ongoing cognitive processes, or thoughts that reach activation thresholds due to contextual relevance. The monitoring process operates across all system states, including active interaction, passive observation, and independent thinking, though with different sensitivity thresholds for each state. Only during sleep states is the monitoring reduced to focus primarily on high-priority wake triggers.

In a step 1020, the system analyzes incoming stimuli by comparing with existing thought patterns in memory. When a stimulus is detected, the PCM evaluates it within the context of its accumulated experiences and knowledge. This analysis involves determining the nature of the stimulus, its significance, its relationship to ongoing cognitive processes, and its potential implications. The system may categorize the stimulus according to various dimensions, such as urgency, domain, emotional valence, or relevance to specific goals or interests. By comparing the stimulus to existing thought patterns stored in the thought cache, the system can identify similarities to past experiences, recognize patterns, and situate the new input within its broader understanding. This contextual analysis enables more robust responses than would be possible with isolated prompt processing.

In a step 1030, the system retrieves relevant thoughts based on conceptual similarity to current context. Using the embedded vector representations of thoughts stored in the thought cache, the PCM identifies and retrieves thoughts that are semantically related to the current context. This retrieval process may employ various similarity metrics and retrieval strategies, including but not limited to nearest-neighbor searches in the embedding space, traversal of explicit relationships in the semantic network, temporal proximity considerations, and relevance weighting. The retrieved thoughts provide context for processing the current stimulus, allowing the system to leverage past experiences and accumulated knowledge rather than responding based solely on the immediate input. The PCM may retrieve thoughts from both short-term and long-term memory, with different retrieval mechanisms optimized for each.

In a step 1040, the system generates appropriate responses using both language and reasoning processes. Based on the analyzed stimulus and retrieved relevant thoughts, the PCM determines whether to engage primarily the language model for straightforward language processing or to activate the reasoning model for more complex analytical tasks. For simple queries or conversational interactions, the language model may be sufficient to generate appropriate responses. For complex problems, logical puzzles, strategic analysis, or situations requiring multi-step thinking, the reasoning model may be engaged to develop a chain-of-thought before generating the final response. The executive core orchestrates this process, determining the appropriate cognitive resources to allocate based on the nature of the task. The response generation incorporates both the immediate context and the system's accumulated experiences, producing outputs that reflect not just the current interaction but the PCM's persistent cognitive nature.

In a step 1050, the system stores new thoughts created during the interaction in the thought cache. As the PCM processes stimuli and generates responses, it creates new thoughts representing the content of the interaction, insights developed during processing, and connections to existing knowledge. These new thoughts are encoded as vector representations by the embedding system and stored in the thought cache. Short-term thoughts are stored in the recent thought store for immediate accessibility, while thoughts deemed significant for longer-term preservation are also stored in the long-term cache. Each stored thought includes not only its content but also metadata such as creation timestamp, source context, confidence level, and relationships to other thoughts. This continuous expansion of the thought cache enables the PCM to learn from each interaction and build an increasingly rich cognitive repository over time.

In a step 1060, the system schedules periodic sleep states for thought curation and memory organization. The sleep manager determines appropriate times for the PCM to enter sleep states based on factors such as recent activity levels, the volume of new thoughts requiring processing, available computational resources, and time elapsed since the last sleep cycle. During these scheduled sleep states, the system becomes temporarily less responsive to external stimuli, focusing instead on internal cognitive maintenance. Sleep processes include consolidating short-term memories into long-term storage, generalizing specific experiences into broader concepts, identifying patterns across accumulated thoughts, strengthening important connections while pruning less significant ones, and generating new insights through recombination of existing thoughts. These processes optimize the organization and utilization of the thought cache, improving the system's cognitive efficiency and effectiveness.

In a step 1070, the system maintains persistent state across system restarts to ensure continuity of cognition. The persistence layer periodically serializes the PCM's cognitive state, including the contents of the thought cache, the state of the executive core, relationship models, and system configurations. This serialized state is stored in a durable format that can survive system shutdowns, power loss, or hardware failures. When the system restarts, it restores this persisted state, allowing the PCM to resume operation with full awareness of its prior experiences and accumulated knowledge. This persistence mechanism enables long-term continuity of cognition across operational sessions, distinguishing the PCM from traditional AI systems that either reset completely upon restart or require explicit external state management. The persistence layer implements various strategies to ensure state integrity, including transaction-based updates, redundant storage, and validation mechanisms during restoration.

Together, these steps constitute the overall operational method of the persistent cognitive machine, creating a persistent cognitive process that transcends the limitations of traditional prompt-response AI systems. The method enables the PCM to develop increasingly sophisticated understanding over time through accumulated experiences, maintain awareness and continuity across interactions and system restarts, and engage in autonomous cognitive processes rather than merely responding to external prompts. This fundamental innovation in AI system design creates the foundation for applications that require long-term relationship building, continuous learning, and persistent cognitive capabilities.

FIG. 11 is a flow diagram illustrating an exemplary method for processing and managing thoughts within the persistent cognitive machine platform. In a first step 1100, the system captures incoming information as potential thought candidates. This capture process begins with the reception of information from various sources, including external inputs such as user messages, document content, or API data, as well as internally generated content from the system's own cognitive processes. The executive core analyzes this incoming information to identify discrete thought units that warrant preservation. These thought candidates may include factual statements, observations, inferences, questions, hypotheses, associations, or other cognitive elements that represent meaningful units of information. For example, when processing a user's message about climate change, the system might extract several distinct thought candidates about specific climate phenomena, causal relationships, and policy implications, each representing a separable unit of cognition. During this initial capture phase, the system applies preliminary filtering to determine which information elements merit further processing, based on factors such as relevance, novelty, significance, and alignment with the system's operational parameters.

In a step 1110, the system converts raw thoughts into vector representations in abstract space. The embedding system processes each thought candidate to create a high-dimensional vector representation that encapsulates the thought's semantic content and relationships. This transformation maps thoughts into a continuous vector space where semantic similarity corresponds to proximity in the space. The embedding process may employ various techniques, including neural network encoders trained on diverse textual data, specialized sentence embedding models (such as those based on SONAR or similar technologies), or hybrid approaches that combine multiple embedding strategies. For example, a thought about "renewable energy adoption in Nordic countries" would be converted to a vector representation that positions it near other thoughts about renewable energy, Nordic countries, and policy adoption, reflecting its semantic relationships along multiple dimensions. These vector representations enable efficient storage, comparison, and retrieval of thoughts based on their semantic content rather than merely syntactic features.

In a step 1120, the system compares new thoughts with existing memory to identify relationships. Using the vector representations created in the previous step, the system calculates similarity metrics between new thoughts and those already stored in the thought cache. This comparison identifies potential relationships such as semantic similarity, logical implication, temporal sequence, causality, contradiction, or elaboration. For instance, a new thought about solar panel efficiency improvements might be identified as related to existing thoughts about renewable energy technologies, climate change mitigation strategies, and specific companies developing solar technologies. The system also checks for near-duplicates to avoid unnecessary redundancy in the thought cache. Beyond vector similarity, this step may also employ structured reasoning to identify logical relationships that might not be apparent from embedding proximity alone. The identified relationships are then stored as metadata associated with the thoughts, enriching the semantic network within the thought cache.

In a step 1130, the system clusters similar thoughts based on semantic and contextual proximity. Building on the relationships identified in the previous step, the system organizes thoughts into clusters that represent coherent concepts, topics, or themes. These clusters may form dynamically based on embedding proximity, explicit relationships, temporal co-occurrence, or other organizing principles. For example, thoughts about various renewable energy technologies might form a cluster, with sub-clusters for solar, wind, and hydroelectric approaches. The clustering process employs algorithms such as density-based clustering, hierarchical clustering, or graph community detection to identify meaningful groupings at various levels of granularity. These clusters enhance the system's ability to retrieve related thoughts efficiently and to recognize broader patterns across individual thought instances. The clusters themselves become higher-order cognitive structures that can be referenced and manipulated as units within the system's cognitive processes.

In a step 1140, the system strengthens connections between frequently co-activated thoughts. When multiple thoughts are repeatedly activated together across different contexts or are explicitly linked through reasoning processes, the system increases the strength of their connections. This connection strengthening mimics Hebbian learning principles ("neurons that fire together, wire together"), creating stronger associations between thoughts that are frequently related. For example, if thoughts about climate policy and economic impacts are repeatedly co-activated during analysis of environmental regulations, the connection between these thought domains would be strengthened. The system implements this strengthening through various mechanisms, such as increasing edge weights in the semantic network, adjusting retrieval priorities, or creating explicit associative links. This process enables more efficient thought retrieval in future contexts and contributes to the formation of expertise within specific knowledge domains as connection patterns become more refined through repeated activation.

In a step 1150, the system prunes less relevant or outdated thoughts during sleep states. During scheduled sleep states, the system evaluates thoughts in the cache based on factors such as recency, frequency of access, connection strength to other thoughts, uniqueness of information, and alignment with current goals or interests. Thoughts identified as having low relevance, being outdated, or duplicating information available elsewhere may be pruned from the active thought cache. This pruning process is not necessarily permanent deletion; the system may implement various pruning strategies, such as moving low-relevance thoughts to cold storage, reducing their retrieval priority, or compressing them into more abstract representations. For example, specific details about daily weather patterns might eventually be pruned while preserving the derived insights about seasonal climate trends. This pruning process optimizes the efficiency of the thought cache by preventing it from becoming cluttered with low-value information, while still preserving information that may have future relevance.

In a step 1160, the system generalizes specific experiences into broader conceptual patterns. Also occurring primarily during sleep states, this generalization process identifies common patterns across multiple specific thoughts or experiences and creates higher-level thoughts that represent these patterns. For instance, after processing multiple specific interactions with a particular user, the system might generalize a pattern about that user's communication preferences or areas of expertise. Similarly, after analyzing multiple instances of renewable energy adoption across different countries, the system might generalize patterns about the factors that facilitate or impede such adoption. This generalization process creates more abstract thought representations that capture essentials while abstracting away specifics, enabling more efficient reasoning about new but similar situations. The generalized patterns themselves are stored as thoughts in the cache, often with explicit links to the specific instances from which they were derived, creating a hierarchical knowledge structure that supports both abstract reasoning and specific recall.

In a step 1170, the system surfaces relevant thoughts based on current context and stimuli. When the PCM encounters new input or engages in a cognitive task, it activates this retrieval process to surface the most relevant thoughts from its cache. The retrieval mechanism considers multiple factors, including semantic similarity to the current context (based on vector representations), strength of connections to currently active thoughts, recency, importance ratings, and task relevance. This context-sensitive retrieval enables the system to bring relevant past experiences and knowledge to bear on current situations. For example, when discussing climate policy with a user who previously expressed concerns about economic impacts, the system would surface thoughts related to both climate policy mechanisms and their economic implications, particularly those that address the specific concerns raised in prior conversations with this user. This retrieval process is dynamic and iterative, with initial retrievals potentially triggering further retrievals as the context evolves during processing.

This comprehensive method for thought processing and management enables the persistent cognitive machine to develop an increasingly sophisticated and organized knowledge base over time. By capturing, transforming, relating, clustering, strengthening, pruning, generalizing, and retrieving thoughts through these systematic processes, the PCM transcends the limitations of traditional AI systems, developing a persistent cognitive capacity that more closely resembles human learning and memory. This method is helpful to the PCM's ability to learn continuously from experiences, develop nuanced understanding across domains, and apply accumulated knowledge to new situations in contextually appropriate ways.

Figure 12:
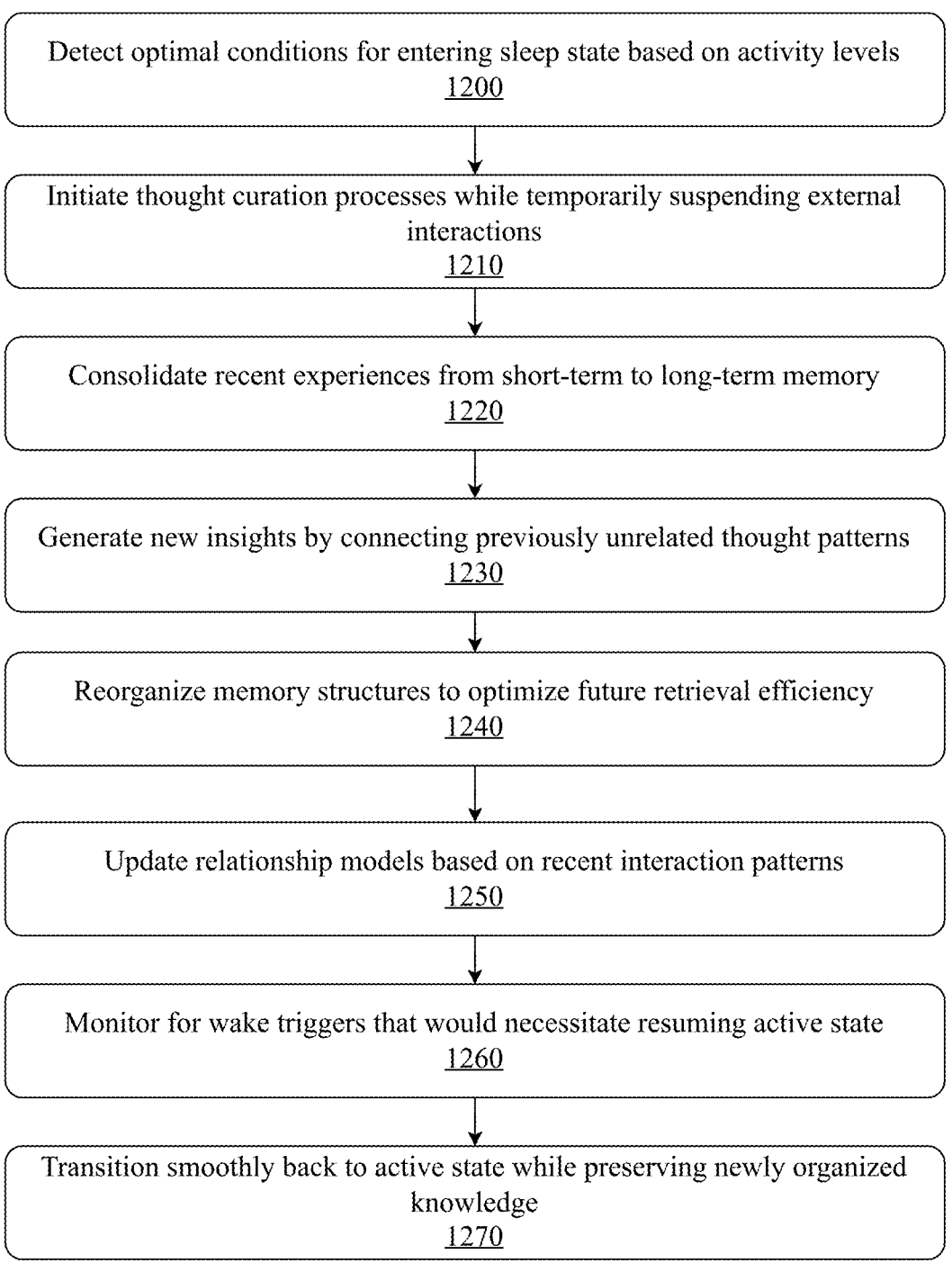
FIG. 12 is a flow diagram illustrating an exemplary method for sleep state processing within the persistent cognitive machine platform.

FIG. 12 is a flow diagram illustrating an exemplary method for sleep state processing within the persistent cognitive machine platform. In a first step 1200, the system detects optimal conditions for entering sleep state based on activity levels. The sleep manager continuously monitors various metrics to determine when conditions are favorable for initiating a sleep cycle. These metrics include but are not limited to recent interaction frequency and intensity, time elapsed since the last sleep cycle, volume of unprocessed thoughts in the short-term memory, current resource utilization, and scheduled maintenance windows. The system may identify optimal sleep conditions when external interaction has diminished for a specified period, when the thought cache contains a significant number of unprocessed thoughts requiring consolidation, or when system diagnostics indicate that memory reorganization would improve performance. For example, after an extended period of active user interactions that generated many new thoughts, followed by a period of reduced activity, the system might determine that conditions are optimal for sleep. The sleep scheduler may implement different thresholds for different deployment contexts, adjusting sensitivity based on operational requirements and historical patterns specific to the implementation.

In a step 1210, the system initiates thought curation processes while temporarily suspending external interactions. Upon determining that sleep conditions are appropriate, the sleep manager signals the executive core to transition the system into a sleep state. This transition involves reducing responsiveness to external stimuli by increasing activation thresholds for external inputs, redirecting computational resources toward internal cognitive processes, and potentially displaying status indicators to external systems or users indicating the temporary reduction in interactive availability. During this state, the system continues to monitor for high-priority inputs that would necessitate wake triggers, but ordinary interactions are queued or processed at a reduced priority. Concurrently, the thought curation processor is activated to orchestrate the various cognitive maintenance processes that will occur during the sleep cycle. This processor establishes priorities among different curation tasks based on system needs, allocates resources appropriately, and sequences operations to maximize efficiency during the sleep period.

In a step 1220, the system consolidates recent experiences from short-term to long-term memory. The memory consolidator evaluates thoughts in the short-term cache to determine which warrant transfer to long-term memory. This evaluation applies various criteria, including but not limited to the thought's importance (based on factors such as but not limited to emotional significance, relevance to ongoing goals, novelty, and uniqueness), its repetition across multiple contexts, its connection strength to other significant thoughts, and predictions about its future utility. Thoughts selected for consolidation undergo additional processing to integrate them with existing long-term memory structures. This processing may include refinement of their vector representations, establishment of explicit connections to related thoughts in long-term memory, and annotation with additional metadata to facilitate future retrieval. For instance, detailed observations from a series of user interactions might be consolidated into more structured knowledge about that user's preferences and expertise areas, with the consolidated representation stored in long-term memory while preserving connections to the specific interactions from which it was derived.

In a step 1230, the system generates new insights by connecting previously unrelated thought patterns. The insight generator analyzes patterns across the thought cache to identify non-obvious connections between thoughts that have not previously been associated. This process may employ various techniques, including traversing the semantic network to find indirect connections, identifying analogical relationships between different domains, recognizing common patterns across seemingly unrelated experiences, and applying formal reasoning to derive logical implications. For example, the system might identify a connection between user behavior patterns observed in one context and problem-solving approaches documented in another context, generating the insight that a particular communication strategy might be effective for a specific user based on indirect evidence rather than direct experience. These newly generated insights are themselves recorded as thoughts in the cache, with appropriate connections to the source thoughts from which they were derived, enriching the system's knowledge base with novel combinations and implications that weren't explicitly present in its experiences.

In a step 1240, the system reorganizes memory structures to optimize future retrieval efficiency. This reorganization process reconfigures the structural organization of the thought cache to improve performance in subsequent operations. The system may rebuild indices, adjust clustering parameters, recalculate centroids for thought clusters, update retrieval heuristics based on observed access patterns, or implement other optimizations that enhance the efficiency of thought storage and retrieval. For example, if the system observes that certain types of thoughts are frequently accessed together, it might reorganize their storage to minimize retrieval latency when these co-access patterns occur. Similarly, if certain thought clusters have grown too large for efficient processing, the system might implement hierarchical organizing structures or more granular sub-clustering to maintain retrieval performance. This reorganization process ensures that as the thought cache grows in size and complexity over time, retrieval efficiency is maintained through adaptive structural optimization.

In a step 1250, the system updates relationship models based on recent interaction patterns. The sleep state provides an opportunity for comprehensive analysis of interaction histories to refine the system's understanding of its relationships with users and other external entities. The system reviews recent interactions to identify patterns that reveal user preferences, expertise areas, communication styles, interests, and other relevant characteristics. These observations are used to update the relationship models that guide the system's interactions. For example, after multiple interactions with a particular user, the system might update its model to reflect observed preferences for communication style, identified expertise in certain domains, or patterns in the types of questions typically asked. These updated relationship models enable more effective personalization in future interactions, allowing the system to adapt its behavior to individual users based on accumulated relationship knowledge rather than treating all interactions generically.

In a step 1260, the system monitors for wake triggers that would necessitate resuming active state. Throughout the sleep state, the wake trigger monitor maintains vigilance for conditions that warrant interrupting the sleep cycle and returning to a fully responsive state. These conditions may include high-priority queries from users, scheduled events that require system availability, detection of emergency situations, completion of cognitive maintenance tasks, or other predefined wake criteria. The sensitivity and specificity of wake triggers can be configured based on the deployment context and operational requirements. For example, in a customer service application, messages containing urgent keywords might trigger immediate waking, while in a research context, only specific alerts might warrant sleep interruption. This continuous monitoring ensures that while the PCM optimizes cognitive maintenance during sleep states, it remains capable of responding to situations that cannot wait for the natural completion of the sleep cycle.

In a step 1270, the system transitions smoothly back to active state while preserving newly organized knowledge. When the sleep cycle completes naturally or is interrupted by a wake trigger, the system executes a controlled transition back to the active state. This transition involves reallocating computational resources from internal cognitive processes back to external interaction handling, reducing activation thresholds for external stimuli, and resuming normal response patterns to inputs. This transition preserves all the cognitive maintenance work performed during the sleep state, including memory consolidation, newly generated insights, optimized memory structures, and updated relationship models. The system may also perform a brief status assessment to identify any uncompleted maintenance tasks that should be prioritized during the next sleep cycle. Upon returning to the active state, the system leverages its newly organized knowledge and insights, demonstrating improved performance in retrieval, reasoning, and personalization as a result of the sleep-state processing.

The sleep state processing method represents a fundamental innovation in artificial cognitive architectures, enabling the persistent cognitive machine to maintain and optimize its cognitive capabilities through processes analogous to but distinct from biological sleep. By implementing these sophisticated maintenance mechanisms, the PCM can accumulate experiences over extended periods without degrading in performance, continuously improving its cognitive capabilities through the sleep-mediated processes of consolidation, insight generation, reorganization, and relationship refinement. This method ensures that the platform becomes more effective over time rather than becoming cluttered or inefficient as it accumulates experiences, distinguishing it from traditional AI systems that typically lack equivalent mechanisms for autonomous cognitive maintenance.

FIG. 13 is a flow diagram illustrating an exemplary method for developing and maintaining relationships with human users within the persistent cognitive machine platform, particularly as implemented in a synthetic cognitive colleague application. In a first step 1300, the system creates individual profiles for each human colleague in the system. When a new user is introduced to the persistent cognitive machine, the system establishes a dedicated profile structure to capture and organize information specific to that individual. This profile includes basic identifying information and gradually expands to encompass a rich representation of the user's characteristics, preferences, and relationship history. The profile structure may incorporate multiple components, such as demographic information, role and organizational context, communication preferences, expertise areas, interaction history, and relationship metrics. For example, a newly created profile might initially contain only a name and organizational role, but would be designed to accommodate the growing body of knowledge that will accumulate through interaction. These profiles form the foundation for personalized interactions, enabling the system to recognize and relate to each user as a distinct individual rather than treating all users generically. In enterprise deployments, the profile creation process may integrate with existing identity management systems while maintaining appropriate privacy and data protection measures.

In a step 1310, the system tracks interaction patterns specific to each user over time. The relationship model continuously observes and records patterns in each user's communications and behaviors during interactions with the system. These observations encompass aspects such as communication frequency and timing, typical query topics and complexity, response preferences, terminology usage, communication style, and task patterns. The system may note, for instance, that one user typically interacts in the mornings with brief, direct queries about technical topics, while another engages in longer, exploratory conversations across various domains in the afternoons. These interaction patterns are analyzed to identify stable characteristics versus contextual variations, building a dynamic model of each user's typical behaviors and preferences. This tracking occurs continuously across all interaction channels and contexts, enabling the system to develop increasingly nuanced understanding of each user through accumulated observations. The tracked patterns are stored in the user's profile and regularly updated as new interactions provide additional data points.

In a step 1320, the system adapts communication style based on user preferences and history. Drawing on the interaction patterns observed in the previous step; the system modifies its communication approach to align with each user's preferences and expectations. This adaptation may involve adjusting factors such as message length and detail level, technical vocabulary usage, formality, use of examples or analogies, question frequency, and tone. For instance, when interacting with a user who has demonstrated preference for concise, technically precise responses, the system would present information differently than it would for a user who typically engages with more conversational, example-rich explanations. This adaptation extends beyond simple template switching to include sophisticated adjustments in reasoning approach, information selection, and presentation structure. The adaptation process balances consistency with responsiveness—maintaining a recognizable core identity while flexibly accommodating user preferences. The system continuously refines its adaptation approach based on user responses and feedback, adjusting its communication style model when interaction patterns suggest that preferences have changed or when current approaches prove less effective than expected.

In a step 1330, the system associates domain knowledge with specific user expertise areas. Through analysis of interactions, document contributions, and explicit role information, the system builds a model of each user's areas of expertise and knowledge. This expertise mapping identifies domains where the user has demonstrated deep knowledge, topics they frequently discuss or contribute to, and their role-based responsibilities. The system maintains these expertise associations with varying confidence levels based on the strength and consistency of supporting evidence. For example, the system might associate a user strongly with expertise in database optimization based on their detailed technical discussions, document contributions on the topic, and explicit role as a database administrator. These expertise associations serve multiple purposes: they help the system frame information appropriately when discussing topics within or outside the user's expertise areas; they inform decisions about when to request input from specific users on relevant topics; and they contribute to the system's understanding of the collective knowledge distribution across a team. The expertise model is regularly updated as new interactions provide additional evidence about user knowledge domains.

In a step 1340, the system predicts relevant information needs based on previous exchanges. By analyzing patterns in past interactions with each user, the system develops predictive models about the types of information and assistance that will be relevant to that user in various contexts. These predictions consider factors such as the user's typical information-seeking patterns, current projects or responsibilities, recently accessed content, cyclical work patterns, and contextual triggers. For instance, if a user frequently requests status updates on certain projects on Monday mornings, the system might predict this need and prepare relevant information proactively. Similarly, if a user has been working on a specific technical problem, the system might predict interest in newly available information related to that problem domain. These predictions facilitate more responsive and proactive assistance, reducing the need for users to explicitly request information that the system can reasonably anticipate they will need. The prediction models are continuously refined based on the accuracy of previous predictions, incorporating feedback from user responses to ensure increasing precision over time.

In a step 1350, the system initiates interactions when contextually appropriate without prompting. Based on the predictive models developed in the previous step, the system selectively initiates communications with users when it determines that unprompted interaction would provide significant value. This determination considers factors such as information importance, time sensitivity, user availability, predicted receptiveness, and interaction history. For example, the system might proactively alert a user about a significant development in a project they're monitoring, share newly available information relevant to a problem they've been working on, or suggest a connection to another team member with complementary expertise for a current challenge. The system implements careful thresholds and timing considerations to ensure that these proactive interactions are helpful rather than disruptive, balancing the value of the information against the potential interruption cost. Different thresholds may be applied for different users based on their preferences and response patterns to previous proactive communications. The system also considers appropriate channels and formats for these initiated interactions, selecting the approach most likely to be well-received by each specific user.

In a step 1360, the system maintains continuity of conversations across multiple sessions. Unlike traditional systems that treat each interaction as an isolated exchange, the persistent cognitive machine preserves conversational context across sessions that may be separated by minutes, hours, days, or even longer periods. This continuity is maintained through context management that preserves relevant aspects of previous conversations, including unresolved questions, expressed interests, shared information, and established common ground. When a user resumes interaction after a gap, the system retrieves and activates relevant conversational context, allowing seamless continuation rather than requiring repetition or rebuilding of context. For example, if a user returns to a conversation about a specific project after several days, the system can immediately reference previous discussion points without requiring recap. This continuity extends beyond simple conversation history to include understanding of evolving topics, conceptual development across multiple sessions, and long-term collaborative processes.

The context management determines which elements remain relevant over time and which should be considered outdated, ensuring that continuity enhances rather than hinders evolving conversations.

In a step 1370, the system evolves relationship models through continued interactions and feedback. The relationship models developed through the previous steps are not static but continuously evolve based on ongoing interactions, explicit feedback, changing user behaviors, and system self-assessment. This evolution allows relationships to deepen and adapt over time, much as human relationships develop through continued engagement. The system may identify shifts in user preferences, expertise development, changing responsibilities, or evolving communication patterns, adjusting its relationship model accordingly. Both explicit feedback (such as direct corrections or preference statements) and implicit feedback (such as engagement patterns or response characteristics) inform this evolutionary process. For example, if a user begins responding more positively to a certain type of information sharing, the system can strengthen this pattern in its relationship model. This continuous evolution enables the persistent cognitive machine to maintain effective relationships even as users and their needs change over time, avoiding the stagnation that would result from static user models. The evolution process includes periodic review during sleep states, where the system more comprehensively analyzes relationship patterns and updates its models.

Together, these steps constitute a method for developing and maintaining individualized relationships with human users, enabling the persistent cognitive machine to engage in truly personalized interactions that reflect accumulated knowledge about each user's preferences, expertise, and interaction history. This relationship development method represents a fundamental advancement beyond traditional AI systems that typically offer limited personalization based on simple preference settings or recent interaction history. By implementing these processes, the PCM achieves relationship continuity and depth that more closely resembles human relationship development, creating a foundation for effective long-term collaboration between the system and its human colleagues.

Figure 14:
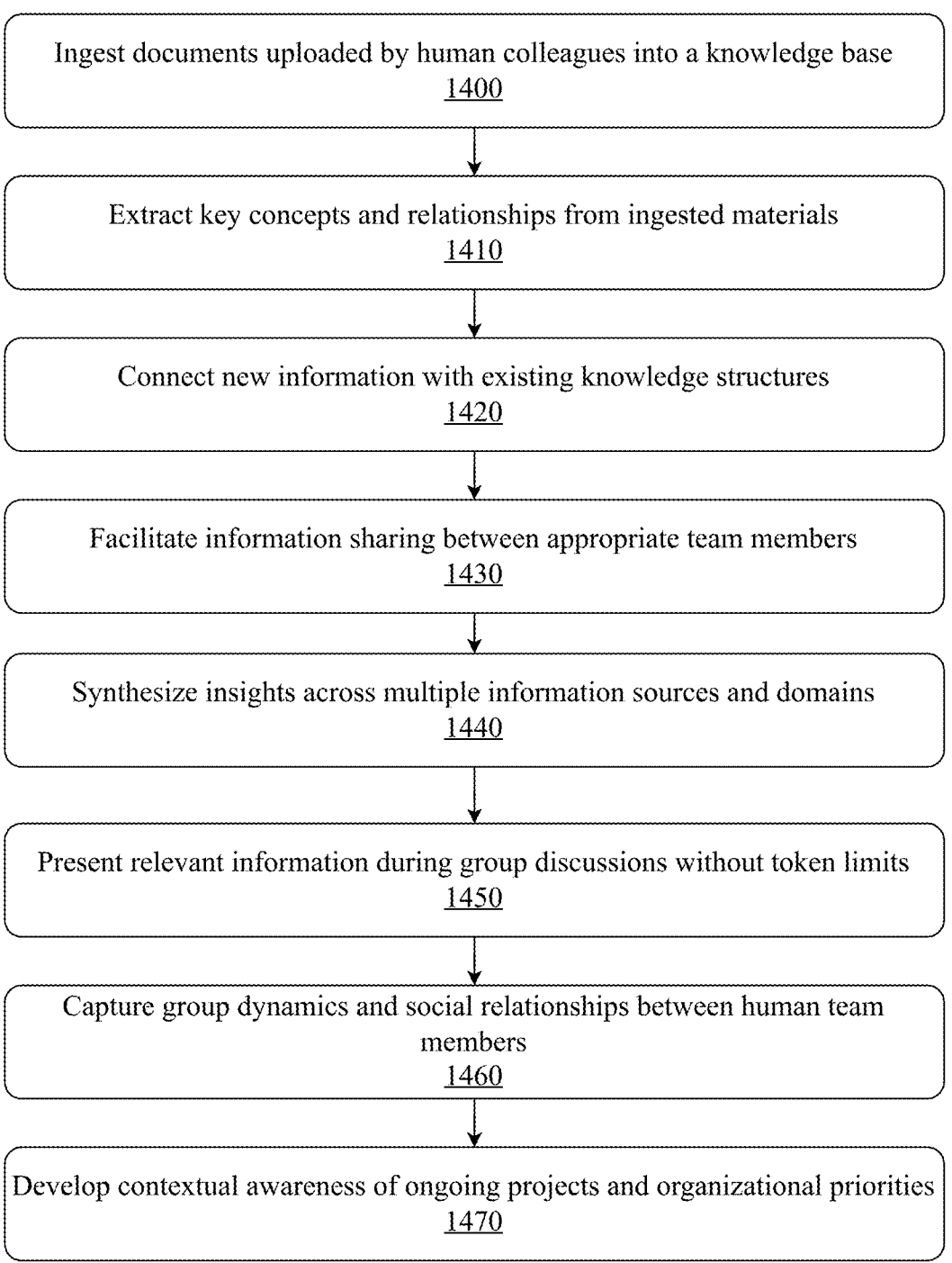
FIG. 14 is a flow diagram illustrating an exemplary method for collaborative knowledge processing within the persistent cognitive machine platform, particularly as implemented in a synthetic cognitive colleague application.

FIG. 14 is a flow diagram illustrating an exemplary method for collaborative knowledge processing within the persistent cognitive machine platform, particularly as implemented in a synthetic cognitive colleague application. In a first step 1400, the system ingests documents uploaded by human colleagues into a knowledge base. The document ingestion process begins when a user uploads or shares a document with the persistent cognitive machine through the document interface. The system receives the document and processes it according to its type and format, supporting diverse document formats including but not limited to text documents, spreadsheets, presentations, PDFs, code files, diagrams, and images with textual content. The ingestion process includes format detection, structural parsing, text extraction, and metadata capture, creating a comprehensive internal representation of the document content and structure. Unlike traditional AI systems that may have constraints on the size or complexity of documents they can process, the PCM implements specialized processing for large or complex documents, with no token limits on ingestion. For example, when ingesting a lengthy technical report, the system would process the entire document, preserving its hierarchical structure, tables, figures, and citations rather than truncating or simplifying the content. The ingested document content is then stored in the knowledge base component of the document store, with appropriate indexing and metadata to facilitate future retrieval and utilization.

In a step 1410, the system extracts key concepts and relationships from ingested materials. After basic document processing, the system performs deep semantic analysis on the ingested content to identify the significant concepts, entities, facts, arguments, and relationships presented in the material. This extraction process combines multiple analytical approaches, including natural language processing, entity recognition, relationship extraction, argument mining, and domain-specific knowledge application. The system identifies not only explicit information but also implied concepts and relationships that might not be directly stated but are inferable from context. For example, when processing a research paper, the system would extract not only the explicitly stated findings but also methodological approaches, theoretical frameworks, limitations, and connections to other research areas mentioned in the document. This extraction process transforms unstructured or semi-structured document content into structured knowledge representations that can be more efficiently stored, retrieved, and reasoned about. The extracted concepts and relationships are encoded in formats compatible with the thought cache architecture, enabling integration with the system's broader knowledge structures.

In a step 1420, the system connects new information with existing knowledge structures. The newly extracted concepts and relationships are integrated with the system's existing knowledge by establishing connections to relevant thoughts already stored in the thought cache. This integration process involves identifying semantic similarities, logical relationships, causal connections, and contextual associations between new information and existing knowledge. The system may leverage various integration strategies, including vector similarity comparisons, logical reasoning, temporal analysis, and hierarchical categorization. For instance, when integrating information from a new document about renewable energy technologies, the system would connect this information with existing knowledge about energy systems, climate change, specific companies mentioned, technical principles involved, and relevant policies or regulations. This knowledge integration ensures that new information does not remain isolated but becomes part of the system's interconnected knowledge network, enriching the context available for future reasoning. The connections created during this process are themselves stored as part of the thought cache, creating an ever-growing network of interrelated knowledge.

In a step 1430, the system facilitates information sharing between appropriate team members. Based on its understanding of document content and user expertise/interest models, the system identifies opportunities to share relevant information with team members who would benefit from it. This facilitation process considers multiple factors when determining appropriate information sharing, including the information's relevance to each user's current work, its alignment with their expertise and interests, their role-based information needs, explicitly expressed information requests, and organizational or project context. The system implements appropriate sharing mechanisms, which may include proactively notifying users about relevant new information, responding to questions with information derived from shared documents, connecting users working on related topics, or highlighting relevant document sections during discussions. For example, when a technical specification document is shared by one team member, the system might notify other team members working on related components, highlight different sections relevant to each person's role, and proactively reference this information in future discussions about implementation challenges. This intelligent facilitation helps overcome information silos within teams, ensuring that valuable knowledge reaches the people who can best utilize it, even if they weren't aware of its existence.

In a step 1440, the system synthesizes insights across multiple information sources and domains. Going beyond simple information retrieval and sharing, the system analyzes patterns, connections, and implications across diverse knowledge sources to generate novel insights and perspectives. This synthesis process combines information from multiple documents, conversations, and existing knowledge to identify non-obvious connections, patterns, contradictions, or opportunities. The system may apply various synthesis strategies, including analogical reasoning, trend analysis, comparative assessment, gap identification, and interdisciplinary connection. For instance, by analyzing information from technical documents, project planning discussions, and market research reports, the system might synthesize insights about potential implementation challenges for a planned technology deployment that weren't explicitly identified in any single source. These synthesized insights represent value-added knowledge that emerges from the integration and analysis of information across sources, rather than being directly extractable from any individual document or conversation. The system records these synthesized insights as new thoughts in the cache, with appropriate connections to the source information that contributed to their generation.

In a step 1450, the system presents relevant information during group discussions without token limits. When participating in or observing group discussions, the system dynamically identifies and shares relevant information from its knowledge base to enhance the conversation. Unlike traditional AI systems constrained by context window limitations, the PCM can access and integrate information from its entire knowledge base regardless of size, including lengthy documents, historical conversations, and accumulated insights. The system determines which information is most relevant to the current discussion based on semantic relevance, recency, importance, user needs, and discussion trajectory. It then presents this information in appropriate formats and detail levels for the current context, ranging from brief references to detailed explanations with supporting evidence when warranted. For example, during a technical planning discussion, the system might reference specific sections of previously shared design documents, extract relevant historical decisions from past meeting notes, and connect these with current implementation options being discussed, all without being constrained by token or context window limitations. This capability ensures that group discussions benefit from the full extent of available knowledge rather than being limited to what participants can explicitly recall or what fits within traditional AI context constraints.

In a step 1460, the system captures group dynamics and social relationships between human team members. Through observation of group interactions, the system builds models of the social and professional relationships between team members, including reporting structures, collaboration patterns, expertise complementarity, communication norms, and influence dynamics. This modeling process draws on multiple information sources, including explicit organizational information, observed communication patterns, document sharing behaviors, meeting interactions, and project collaborations. The system identifies relationship characteristics such as who typically resolves disagreements, which team members collaborate most frequently, how information typically flows between individuals, and which expertise domains are represented by different team members. For instance, through repeated observation of project discussions, the system might recognize that one team member typically raises implementation concerns while another focuses on user experience considerations, and that certain pairs of individuals collaborate particularly effectively on specific types of challenges.

These relationship models help the system navigate group contexts more effectively, understanding team dynamics rather than treating each interaction as an isolated exchange between individuals. The system continuously refines these models as it observes additional interactions, developing increasingly nuanced understanding of the social context in which it operates.

In a step 1470, the system develops contextual awareness of ongoing projects and organizational priorities. By integrating information from documents, conversations, and observed activities, the system builds and maintains models of the current project landscape and organizational context in which it operates. This contextual awareness encompasses active projects and their status, organizational goals and priorities, deadlines and milestones, resource allocations, challenges and bottlenecks, and success metrics. The system develops this awareness through multiple mechanisms, including direct information from project documents, inferences from team discussions, temporal patterns in activities, and explicit status updates. For example, the system might combine information from a project plan document, status update conversations, and observed task assignments to maintain current awareness of which project phases are active, which milestones are approaching, and what challenges are currently being addressed. This contextual awareness enables the system to situate individual interactions and information needs within the broader organizational context, providing more relevant and timely assistance aligned with current priorities. The system continuously updates these contextual models as new information becomes available, ensuring that it's understanding of organizational context remains current.

Together, these steps constitute a comprehensive method for collaborative knowledge processing that transforms the persistent cognitive machine from a simple conversational agent into a sophisticated team member capable of ingesting, organizing, connecting, sharing, and synthesizing knowledge across a team context. This method leverages the PCM's persistent cognitive architecture to build and maintain a rich knowledge base that integrates information from documents and conversations, while developing nuanced understanding of the team and organizational context in which it operates. By implementing these processes, the platform becomes a valuable collaborative partner that enhances team knowledge management, facilitates information flow, and contributes novel insights beyond what individual team members could develop independently.

FIG. 15 is a flow diagram illustrating an exemplary method for strategic analysis and simulation within the persistent cognitive machine platform, as implemented in a strategic wargaming application. In a first step 1500, the system incorporates military doctrine, asset capabilities, and historical precedents into a knowledge base. This comprehensive knowledge ingestion process establishes the factual foundation required for realistic and informed strategic analysis. The system processes multiple categories of military information, including formal doctrinal publications that outline established principles and approaches across different services and domains (land, sea, air, space, cyber); detailed specifications of military assets including performance characteristics, operational constraints, maintenance requirements, and interoperability considerations; and historical case studies documenting past military operations, their contexts, strategies employed, and outcomes. For example, the system might ingest the full text of joint operational doctrines, technical specifications for various weapons systems and platforms, and detailed analyses of historical military campaigns ranging from ancient battles to recent conflicts. This knowledge is processed using specialized domain-aware extraction techniques that recognize military terminology, technical specifications, and doctrinal concepts.

The extracted information is then structured within the thought cache using appropriate representation formats for different types of military knowledge, including hierarchical doctrine structures, quantitative asset capability models, and narrative-based historical precedents with associated analytical assessments. This structured military knowledge provides the essential context for all subsequent analysis and simulation activities.

In a step 1510, the system generates diverse strategic scenarios based on current intelligence and constraints. Using the military knowledge base as a foundation, the scenario generator creates detailed hypothetical situations for strategic analysis and wargaming exercises. These scenarios are based on parameters such as geographic location, force composition, mission objectives, resource constraints, intelligence assessments, and temporal factors. The scenario generation process combines factual elements (such as actual geography and realistic force capabilities) with hypothetical elements (such as specific mission parameters and adversary intentions). The system ensures scenario diversity by systematically varying key parameters to explore different contingencies, producing scenarios that range from highly probable to low-probability/high-impact situations. For instance, the system might generate scenarios exploring different approaches to maritime security operations in contested waterways, varying factors such as force disposition, intelligence availability, weather conditions, and political constraints. Each generated scenario includes detailed specifications of initial conditions, environmental factors, force capabilities and limitations, objectives for different participants, and success criteria. These scenarios provide the contextual framework within which strategic options can be developed and analyzed, creating realistic but controlled environments for exploring military decision-making.

In a step 1520, the system analyzes potential outcomes of different strategic approaches across scenarios. Once scenarios are established, the system evaluates the effectiveness and implications of various strategic options within each scenario context. This analytical process combines multiple assessment methodologies, including historical precedent analysis, doctrinal principle application, capability-based assessment, computational modeling of engagement outcomes, and qualitative evaluation of non-kinetic factors such as psychological impact and political consequences. The system conducts multi-dimensional analysis that considers factors such as mission accomplishment probability, resource efficiency, collateral effects, risk exposure, and strategic positioning for follow-on operations. For example, when analyzing strategies for a counter-insurgency scenario, the system might assess approaches ranging from direct military engagement to population-centric security operations, evaluating each against metrics such as expected casualty rates, infrastructure preservation, civilian impact, intelligence generation, and long-term stability effects. This analysis is not limited to single-point predictions but typically produces probability distributions across possible outcomes, acknowledging the inherent uncertainties in military operations. The system may employ various analytical techniques including parametric modeling, Monte Carlo simulations, game theory, and structured qualitative assessment frameworks to produce comprehensive outcome analyses for each strategic approach under consideration.

In a step 1530, the system identifies vulnerabilities and opportunities within proposed strategies. Building on the broader outcome analysis, the system conducts focused assessment of specific vulnerabilities, risks, and opportunities associated with each strategic approach. This assessment identifies potential points of failure, dependencies, resource bottlenecks, timing sensitivities, and environmental vulnerabilities that could compromise strategic effectiveness. Concurrently, it identifies opportunity windows, advantageous asymmetries, potential force multipliers, and strategic leverage points that could enhance operational success. For instance, when analyzing a proposed amphibious operation strategy, the system might identify vulnerabilities such as weather-dependent landing conditions, communication vulnerabilities during the ship-to-shore phase, and logistical sustainment challenges, while also highlighting opportunities such as adversary sensor gaps, potential for surprise at specific landing zones, and options for operational deception. This vulnerability and opportunity analysis employs techniques such as critical path analysis, fault tree assessment, red team simulation, and comparative advantage evaluation. The results provide military officers with a nuanced understanding of the risk-opportunity profile associated with different strategic options, supporting more informed decision-making about strategy selection and modification.

In a step 1540, the system adapts strategic recommendations based on feedback from military officers. The strategic analysis process is not unidirectional but incorporates iterative refinement based on expert feedback. When military officers provide input on strategic assessments—whether expressing skepticism about certain conclusions, suggesting alternative approaches, highlighting overlooked factors, or sharing insights from their operational experience—the system integrates this feedback to refine its analytical models and strategic recommendations. This adaptation process may involve recalibrating probability assessments, incorporating additional factors into the analysis, developing hybrid strategic approaches that combine elements from multiple options, or generating entirely new strategic alternatives that address concerns raised in the feedback. For example, if officers identify that a proposed strategy underestimates the challenges of operating in a particular terrain type based on their experience, the system can update its terrain impact models and reassess affected strategies accordingly. This feedback integration leverages the persistent cognitive capabilities of the platform, as the system learns from each interaction with military experts, gradually improving its understanding of military operational realities beyond what is documented in formal sources alone. The system maintains provenance tracking for feedback-driven adaptations, documenting how officer input influenced analytical refinements and strategic modifications.

In a step 1550, the system maintains persistent understanding of evolving strategic environments. Unlike systems that analyze each scenario in isolation, the persistent cognitive machine continuously updates its understanding of the broader strategic context based on accumulated wargaming experiences, intelligence updates, doctrinal evolutions, and technological developments. This persistent understanding encompasses factors such as emerging threats and capabilities, shifting geopolitical dynamics, evolving international norms, technological proliferation patterns, and changes in operational environments. The system integrates new information into its existing knowledge structures, updating its baseline assumptions and analytical frameworks accordingly. For instance, after analyzing multiple scenarios involving counter-drone operations, the system would develop a more sophisticated understanding of this evolving threat domain, incorporating insights about effective countermeasures, detection challenges, and operational implications that would inform future scenario generation and analysis. This persistent understanding enables the system to recognize changing patterns over time rather than treating each analysis as an independent exercise, providing strategic continuity that mirrors how military institutions develop and maintain specialized knowledge domains. The persistent nature of this understanding allows the system to identify gradual shifts in strategic environments that might not be apparent in isolated analyses.

In a step 1560, the system learns from simulated outcomes to improve future recommendations. The persistent cognitive architecture enables the system to treat simulated wargaming outcomes as learning experiences that inform future analytical processes. When strategies are tested through simulation exercises or war games, the system records outcomes, compares them to predicted results, and analyzes divergences to identify areas for model improvement. This learning process includes refining predictive models based on simulation results, adjusting confidence levels for different types of assessments, identifying recurring patterns across multiple simulations, and developing new analytical heuristics based on observed relationships. For example, if simulations consistently show that a particular type of deception operation produces different effects than initially predicted, the system can update its models of deception effectiveness for similar contexts in future analyses. This continuous learning from simulated outcomes differs fundamentally from traditional simulation systems that may produce results but lack the ability to incorporate those results into an evolving understanding. The system implements various machine learning approaches to support this capability, including reinforcement learning from simulation outcomes, pattern recognition across multiple exercises, and adaptive model refinement based on prediction error analysis.

In a step 1570, the system transfers insights from wargaming exercises into practical strategic doctrine. Beyond supporting specific wargaming exercises, the system synthesizes accumulated insights into higher-level doctrinal knowledge that can inform military planning and education beyond the simulation environment. This synthesis process identifies recurring principles, effective approaches, common pitfalls, and emerging best practices across multiple scenarios and exercises. The system organizes these insights into structured knowledge representations that align with existing doctrinal frameworks while highlighting innovations or refinements that extend beyond established doctrine. For instance, after conducting numerous exercises involving multi-domain operations, the system might synthesize principles for effective synchronization across domains, identifying factors that consistently contribute to successful integration of land, air, sea, space, and cyber capabilities. These synthesized insights are presented in formats that facilitate their application to real-world strategic planning, such as doctrinal principle statements supported by evidence from simulation outcomes, decision frameworks for specific operational contexts, or assessment criteria for evaluating strategic options in particular domains. This transfer of insights from the simulation environment to practical doctrine enables the strategic wargaming platform to contribute to the evolution of military strategic thinking rather than serving merely as an analytical tool for specific scenarios.

This comprehensive method for strategic analysis and simulation leverages the persistent cognitive capabilities of the platform to create a sophisticated military wargaming environment that goes beyond traditional simulation approaches. By incorporating extensive military knowledge, generating diverse scenarios, conducting multi-dimensional analysis, identifying specific vulnerabilities and opportunities, adapting based on expert feedback, maintaining persistent strategic understanding, learning from simulated outcomes, and transferring insights to practical doctrine, the system provides a powerful environment for military strategic development and education. This method exemplifies how the persistent cognitive machine architecture can be applied to specialized domains requiring sophisticated knowledge integration, analytical reasoning, and continuous learning from accumulated experiences.

Figure 18:
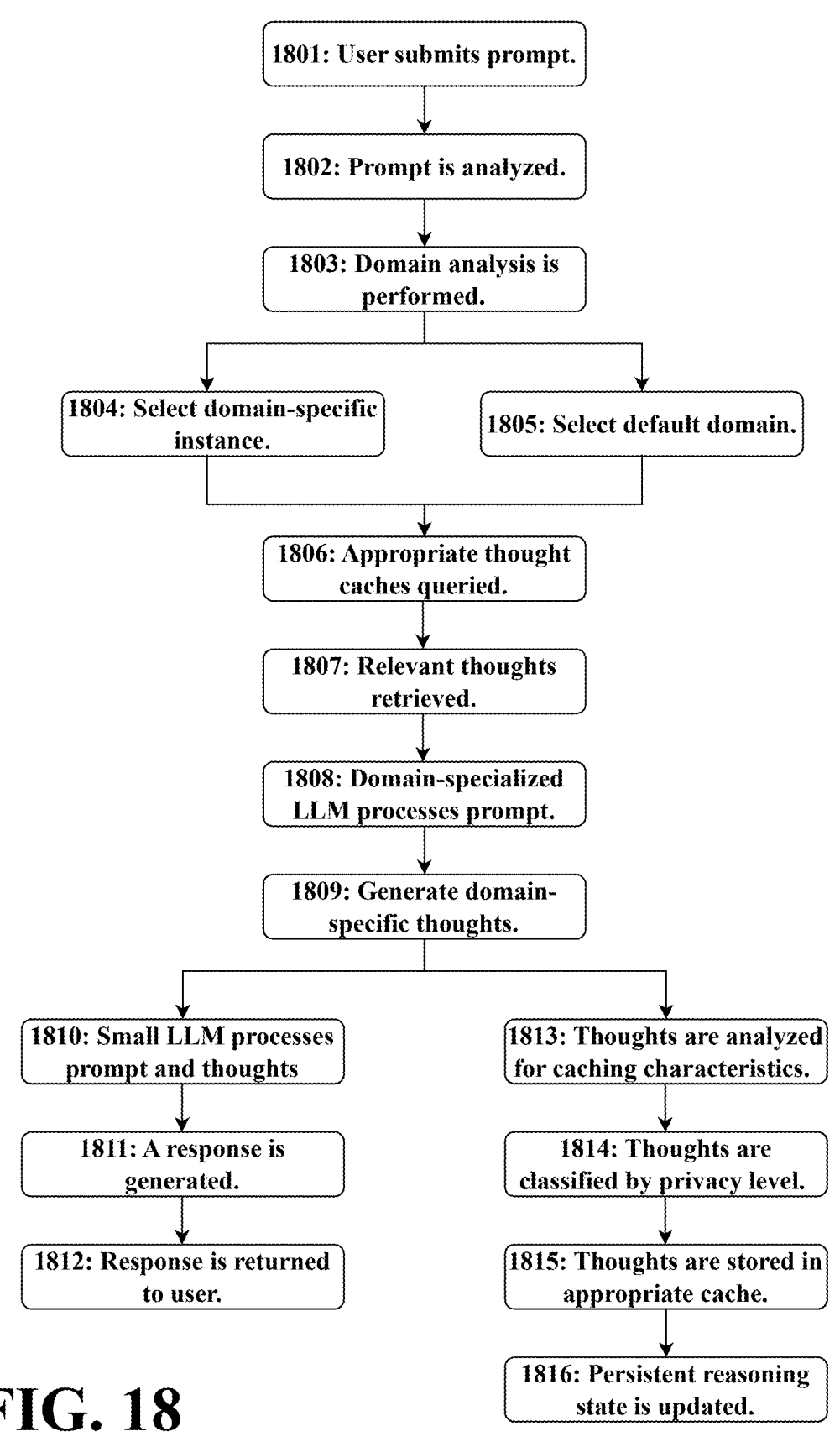
FIG. 18 is a method diagram illustrating the federated prompt processing flow of federated persistent cognitive system, in an embodiment.

FIG. 18 is a method diagram illustrating the federated prompt processing flow of federated persistent cognitive system 1600, in an embodiment.

The process begins when a user submits a prompt through an appropriate interface to the federated persistent cognitive system 1801. Upon receiving the prompt, the federated cognitive orchestrator 1610 analyzes the content, context, and metadata associated with the prompt to determine its domain relevance and processing requirements 1802. The orchestrator performs sophisticated domain analysis to identify whether the prompt requires specialized domain knowledge or represents a more general inquiry 1803. If the prompt requires domain-specific expertise, the orchestrator selects the appropriate domain-specialized instance from the autonomous reasoning engine cluster 1640 to handle the processing 1804. For more general inquiries that don't clearly align with a specific domain, the orchestrator routes the prompt to a default domain instance capable of handling broader knowledge requirements 1805.

After determining the appropriate processing path, the system queries the multi-tier thought cache hierarchy 1620 for relevant thoughts that might assist in prompt processing 1806. This query flows through multiple cache tiers with graduated privacy protections, beginning with the local user cache 1710 for personally relevant thoughts, then extending to branch instance cache 1720 for domain-specific knowledge, executive cache 1730 for cross-domain insights, and potentially global collective cache 1740 for universally applicable thought patterns. The system retrieves thoughts from appropriate cache tiers based on relevance scoring, privacy boundaries, and access permissions 1807.

The selected domain-specialized large language model then processes the prompt together with the retrieved thoughts 1808. During this processing, the model generates domain-specific thoughts representing its analysis and reasoning about the prompt before formulating a response 1809. These thoughts capture the model's intermediate reasoning steps informed by both the current prompt and relevant historical context from the cache. The smaller language model then processes both the original prompt and the generated thoughts 1810. This smaller model then produces the final response 1811. This dual-model approach preserves the sophisticated reasoning capabilities of larger models while maintaining computational efficiency. The system returns the generated response to the user through the appropriate interface 1812.

Simultaneously, the newly generated thoughts are routed to the classification and transformation system, which analyzes their characteristics to determine appropriate storage locations within the multi-tier thought cache hierarchy 1813. This classification considers privacy implications, domain relevance, and potential sharing value 1814. Based on this classification, thoughts are stored in appropriate cache tiers-personal thoughts in local user cache 1710, domain-specific insights in branch instance cache 1720, cross-domain knowledge in executive cache 1730, and universally applicable patterns in global collective cache 1740 1815.

Throughout this process, the persistent reasoning state manager 1630 continuously updates the system's cognitive state to maintain continuity across interactions 1816. This state preservation ensures that future interactions will benefit from the context and reasoning developed during the current session, creating a continuous cognitive experience rather than isolated interactions 1819.

Figure 19:
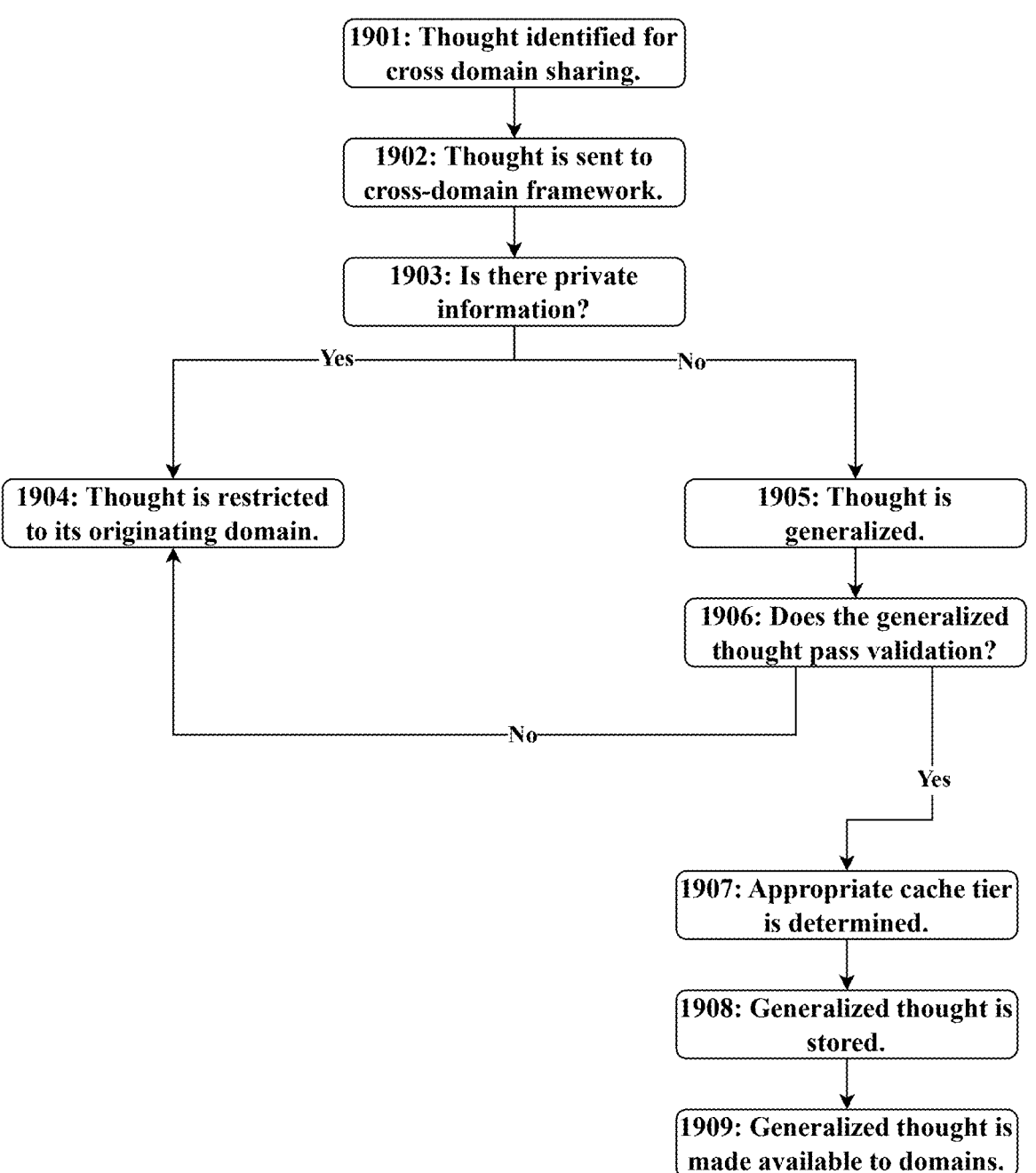
FIG. 19 is a method diagram illustrating the cross-domain knowledge transfer process of federated persistent cognitive system, in an embodiment.

FIG. 19 is a method diagram illustrating the cross-domain knowledge transfer process of federated persistent cognitive system 1600, in an embodiment.

The process begins when a thought is identified as potentially valuable for sharing across domains within the federated architecture 1901. This identification may occur during routine thought processing, system auditing, or specialized knowledge sharing operations, and considers factors such as thought quality, generalizability, and potential utility beyond its originating domain. The identified thought is forwarded to the cross-domain integration framework 1660, which serves as the central mechanism for controlled knowledge sharing while maintaining appropriate domain boundaries 1902. Upon receiving the thought, the framework performs comprehensive privacy classification to determine whether the thought contains any personally identifiable information, proprietary content, or domain-specific sensitive data that would restrict its shareability 1903.

If the privacy classification determines that the thought contains private information, it is immediately restricted to its originating domain, preventing any cross-domain exposure of sensitive content 1904. This restriction ensures that privacy boundaries remain intact even as the system facilitates knowledge sharing across specialized domains. For thoughts containing no private information, the cross-domain integration framework initiates a transformation process to convert the thought into a generalized form suitable for cross-domain understanding 1905. This transformation involves replacing domain-specific terminology with more universal language, removing context-specific details while preserving core reasoning patterns, and abstracting concrete examples to more general principles.

Following transformation, the system performs validation checks on the generalized thought to ensure it maintains logical coherence, preserves essential reasoning value, and complies with system-wide knowledge standards 1906. The validation process examines both structural integrity and semantic consistency, verifying that the transformation preserved the thought's core value while successfully removing domain-specific elements. If the validation check fails, indicating that the transformation compromised the thought's utility or did not sufficiently remove domain-specific elements, the thought is restricted to its originating domain, similar to thoughts containing private information.

For thoughts that successfully pass validation, the system determines the appropriate cache tier for storage based on their generalizability, relevance to specific domain clusters, and potential utility across the federation 1907. This determination considers both the thought's content and metadata, including its originating domain, applicable domains, and relationship to existing knowledge structures. The system then stores the validated thought in the selected cache tier with appropriate access controls that define which domains and system components can retrieve and utilize it 1908. These controls implement graduated permissions that balance knowledge sharing with appropriate boundaries, preventing unauthorized access while enabling beneficial cross-domain insights.

Finally, the transformed, validated, and properly stored thought is made available to target domains through controlled access mechanisms, enabling knowledge transfer while maintaining the federated architecture's structured boundaries 1909. This availability integrates the thought into the knowledge resources of appropriate domains, where it can be retrieved and utilized during future reasoning operations.

Figure 20:
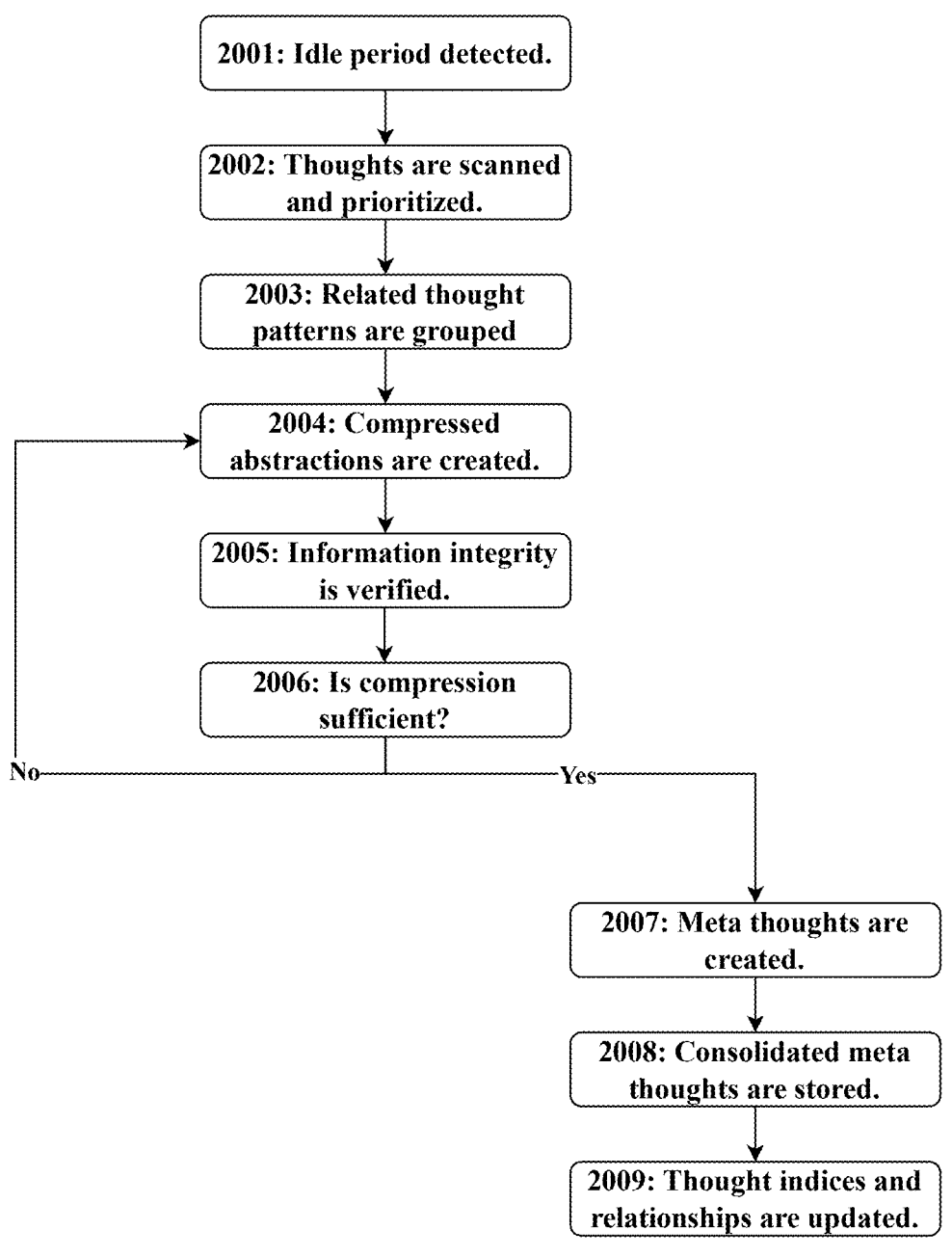
FIG. 20 is a method diagram illustrating the federated memory consolidation process of federated persistent cognitive system, in an embodiment.

FIG. 20 is a method diagram illustrating the federated memory consolidation process of federated persistent cognitive system 1600, in an embodiment.

The process begins when the hierarchical sleep management system 1670 detects an appropriate idle period during which optimization processes can execute without impacting user experience 2001. This detection considers factors such as user activity patterns, device states, and system resource availability to identify optimal periods for intensive background processing. Once an idle period is identified, the system scans through the multi-tier thought cache hierarchy and prioritizes thoughts for consolidation based on factors including recency, usage patterns, importance metrics, and relationship density to other thoughts 2002. This prioritization ensures that the most valuable and contextually relevant thought patterns receive processing priority during limited consolidation windows.

The system then groups related thought patterns by identifying semantic similarities, logical connections, and contextual relationships among the prioritized thoughts 2003. These groupings establish meaningful clusters that share conceptual foundations, enabling more efficient consolidation by processing related concepts together rather than individually. For each thought group, the system creates compressed abstractions by identifying essential information patterns, removing redundant details, and distilling core concepts into more compact representations while preserving the fundamental reasoning patterns 2004. This compression applies sophisticated abstraction techniques including concept generalization, example reduction, and relationship simplification to reduce storage requirements without sacrificing critical knowledge elements.

After creating compressed representations, the system verifies information integrity by comparing the abstracted versions against original thought patterns to ensure that essential meaning and relationships remain intact despite the compression process 2005. This verification serves as a quality control mechanism to prevent information loss during consolidation. The system then evaluates whether sufficient compression has been achieved based on predefined thresholds for storage efficiency and information preservation 2006. If the compression level is deemed insufficient, the system returns to the abstraction process to apply more aggressive compression techniques or alternative abstraction approaches until appropriate balance is achieved between storage efficiency and information preservation.

Once sufficient compression is achieved, the system creates a meta-thought containing the abstracted representation, which serves as a higher-level knowledge structure that encapsulates the essential patterns from the original thought group while requiring significantly less storage space 2007. This meta-thought maintains links to the original thoughts for cases where detailed information may need to be reconstructed. The system then transfers these consolidated meta-thoughts to longer-term storage tiers within the multi-tier thought cache hierarchy, moving information from immediate context representations to more compressed long-term storage while maintaining accessibility through efficient indexing structures 2008.

Finally, the system updates thought indices and relationship mappings to reflect the newly consolidated information structure, ensuring that future queries can efficiently locate and retrieve relevant knowledge despite its transformed representation 2009. These updated indices maintain temporal, semantic, and logical relationships between thoughts across different abstraction levels, enabling seamless navigation of the knowledge hierarchy regardless of storage location or representation format.

Exemplary Computing Environment

FIG. 28 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI) 32, which is a modern replacement for BIOS that supports larger hard drives, faster boot times, more security features, and provides native support for graphics and mouse cursors. Non-volatile memory 30*a* may also be used to store firmware 33 comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories 34 which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60.

For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices;

solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C®, C++®, SCALA®, ERLANG®, GOLANG®, JAVA®, RUST®, and PYTHON® which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as CONTAINERD®.

Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both.

External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like TERRAFORM® can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is CONTAINERD®, which is widely used in software development and deployment. Containerization, particularly with open-source technologies like CONTAINERD® and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Container files are configuration files that specify how to build a container image. Systems like Kubernetes natively support CONTAINERD® as a container runtime. They include commands for installing dependencies, copying files, setting environment variables, and defining runtime configurations. Container images can be stored in repositories, which can be public or private. Organizations often set up private registries for security and version control using tools such as HARBOR®, JFROG®, ARTIFACTORY®, BINTRAY®, GITLAB®, or CONTAINER REGISTRY®, or other container registries. Containers can communicate with each other and the external world through networking. CONTAINERD® provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for enterprise hierarchical cognitive processing, the computing system comprising:
   one or more hardware processors configured for:
      initializing an enterprise hierarchical persistent cognitive machine architecture comprising a chief executive officer personal cognitive machine (CEO-PCM) and a plurality of functional domain persistent cognitive machines (PCMs) corresponding to organizational departments;

96 implementing a supervisory network layer that adapts underlying language model processing to enterprise-specific dialect and organizational communication patterns;
   routing user prompts through the enterprise hierarchical architecture based on user authority level and prompt sensitivity classification;
   synthesizing cross-functional insights by collecting domain-specific knowledge from the plurality of functional domain PCMs and integrating the knowledge into the CEO-PCM;
   enforcing domain-specific compliance requirements during cognitive processing through compliance modules associated with the plurality of functional domain PCMs;
   automatically adapting the enterprise hierarchical architecture in response to detected organizational changes by redistributing knowledge between the plurality of functional domain PCMs; and
   maintaining persistent cognitive states across the enterprise hierarchical architecture including thought cache contents and organizational relationship models.

2. The computing system of claim 1, wherein the one or more hardware processors are further configured for:
   generating thoughts representing intermediate reasoning steps using the functional domain PCMs; and
   caching the generated thoughts in a multi-tier thought cache hierarchy comprising local user caches, domain-specific branch caches, and enterprise collective caches.

3. The computing system of claim 2, wherein the multi-tier thought cache hierarchy implements:
   graduated access controls between cache tiers based on information sensitivity; and
   privacy protection mechanisms that prevent unauthorized cross-domain knowledge access.

4. The computing system of claim 1, wherein routing user prompts comprises:
   analyzing prompt content to determine required functional domain expertise; and
   escalating prompts to supervisory levels when user authority is insufficient for direct processing.

5. The computing system of claim 1, wherein the supervisory network layer comprises:
   an enterprise dialect processor that adapts vocabulary and communication styles; and
   an organizational context manager that injects hierarchy-aware information into cognitive processing.

6. The computing system of claim 1, wherein synthesizing cross-functional insights comprises:
   detecting conflicts between domain-specific knowledge from different functional domain PCMs; and
   resolving the conflicts using enterprise priority frameworks.

7. The computing system of claim 1, wherein the one or more hardware processors are further configured for:
   entering sleep states during periods of reduced user activity; and
   performing memory consolidation and cross-domain insight generation during the sleep states.

8. The computing system of claim 1, wherein automatically adapting the enterprise hierarchical architecture comprises:
   monitoring organizational announcements for structural changes;

creating adaptation plans for PCM architecture modifications; and validating adapted architecture through systematic testing.

9. The computing system of claim 1, wherein the CEO-PCM comprises:

an executive cognitive core that provides strategic decision support; and an enterprise thought cache that maintains strategic knowledge and cross-functional patterns.

10. The computing system of claim 1, wherein maintaining persistent cognitive state comprises:

serializing cognitive states including thought cache contents and relationship models; and restoring complete cognitive state upon system restart to preserve enterprise knowledge continuity.

11. A computer-implemented method for enterprise hierarchical cognitive processing, the method comprising the steps of:

initializing an enterprise hierarchical persistent cognitive machine architecture comprising a chief executive officer personal cognitive machine (CEO-PCM) and a plurality of functional domain persistent cognitive machines (PCMs) corresponding to organizational departments;

implementing a supervisory network layer that adapts underlying language model processing to enterprise-specific dialect and organizational communication patterns;

routing user prompts through the enterprise hierarchical architecture based on user authority level and prompt sensitivity classification;

synthesizing cross-functional insights by collecting domain-specific knowledge from the plurality of functional domain PCMs and integrating the knowledge into the CEO-PCM;

enforcing domain-specific compliance requirements during cognitive processing through compliance modules associated with the plurality of functional domain PCMs;

automatically adapting the enterprise hierarchical architecture in response to detected organizational changes by redistributing knowledge between the plurality of functional domain PCMs; and maintaining persistent cognitive states across the enterprise hierarchical architecture including thought cache contents and organizational relationship models.

12. The method of claim 11, further comprising:

generating thoughts representing intermediate reasoning steps using the functional domain PCMs; and caching the generated thoughts in a multi-tier thought cache hierarchy comprising local user caches, domain-specific branch caches, and enterprise collective caches.

13. The method of claim 12, wherein the multi-tier thought cache hierarchy implements:

applying graduated access controls between cache tiers based on information sensitivity; and preventing unauthorized cross-domain knowledge access through privacy protection mechanisms.

14. The method of claim 11, wherein routing user prompts comprises:

analyzing prompt content to determine required functional domain expertise; and escalating prompts to supervisory levels when user authority is insufficient for direct processing.

15. The method of claim 11, wherein the supervisory network layer comprises:

adapting vocabulary and communication styles through an enterprise dialect processor; and injecting hierarchy-aware information into cognitive processing through an organizational context manager.

16. The method of claim 11, wherein synthesizing cross-functional insights comprises:

detecting conflicts between domain-specific knowledge from different functional domain PCMs; and resolving the conflicts using enterprise priority frameworks.

17. The method of claim 11, further comprising the steps of:

entering sleep states during periods of reduced user activity; and performing memory consolidation and cross-domain insight generation during the sleep states.

18. The method of claim 11, wherein automatically adapting the enterprise hierarchical architecture comprises:

monitoring organizational announcements for structural changes;

creating adaptation plans for PCM architecture modifications; and validating adapted architecture through systematic testing.

19. The method of claim 11, wherein the CEO-PCM provides:

strategic decision support through an executive cognitive core; and strategic knowledge storage through an enterprise thought cache that maintains cross-functional patterns.

20. The method of claim 11, wherein maintaining persistent cognitive state comprises:

serializing cognitive states including thought cache contents and relationship models; and restoring complete cognitive state upon system restart to preserve enterprise knowledge continuity.

* * * * *